(12) United States Patent  (10) Patent No.: US 8,406,162 B2
Haupt et al.  (45) Date of Patent: Mar. 26, 2013

(54) METHOD AND APPARATUS OF TRANSMITTING, RECEIVING, DISPLAYING AND PLAYING WEATHER DATA

(75) Inventors: Rolf Haupt, Chaiwan (HK); Allan McCormick, La Crescent, MN (US)

(73) Assignee: La Crosse Technology, Ltd., La Crosse, WI (US)

( * ) Notice: Subject to any disclaimer, the term of this patent is extended or adjusted under 35 U.S.C. 154(b) by 486 days.

(21) Appl. No.: 12/466,521

(22) Filed: May 15, 2009

(65) Prior Publication Data

US 2009/0316671 A1  Dec. 24, 2009

Related U.S. Application Data

(60) Provisional application No. 61/054,054, filed on May 16, 2008.

(51) Int. Cl.
  *H04W 4/02* (2009.01)
(52) U.S. Cl. .......................... 370/311; 370/324; 370/350
(58) Field of Classification Search ........................ None
  See application file for complete search history.

(56) References Cited

U.S. PATENT DOCUMENTS

| | | | |
|---|---|---|---|
| 4,839,645 A * | 6/1989 | Lill | 340/870.17 |
| 6,297,766 B1 * | 10/2001 | Koeller | 342/357.31 |
| 6,882,274 B2 * | 4/2005 | Richardson et al. | 340/539.13 |
| 7,406,382 B2 * | 7/2008 | Brulle-Drews | 702/3 |
| 7,450,627 B2 * | 11/2008 | Couch et al. | 375/132 |
| 7,525,448 B1 * | 4/2009 | Wilson et al. | 340/971 |
| 7,804,528 B2 * | 9/2010 | Bando | 348/231.5 |
| 2008/0055154 A1 * | 3/2008 | Martucci et al. | 342/357.1 |
| 2008/0247313 A1 * | 10/2008 | Nath et al. | 370/231 |
| 2009/0224974 A1 * | 9/2009 | Lorenz | 342/357.12 |
| 2010/0082776 A1 * | 4/2010 | Marshall et al. | 709/219 |
| 2011/0280301 A1 * | 11/2011 | Lee et al. | 375/240.02 |

* cited by examiner

*Primary Examiner* — Hassan Kizou
*Assistant Examiner* — Roberta A Shand
(74) *Attorney, Agent, or Firm* — Banner & Witcoff, Ltd.

(57) ABSTRACT

A transmitter transmits time synchronized data via a pager/WiMax/802.x access to a receiver system, wherein the receiver system is programmed to receive data for specific geographic locations. The geographic locations may be specified by the user or by the receiver system, and includes state, zip codes, towns, counties, towns, or cardinal regions. The receiver is able to find its location when outside its cell region and is able to synchronize to the data transmitted in the new cell region. Further, the receiver system is able to remotely monitor weather data and other information at a different location via wireless Internet or voice over IP. A transceiver may also be used to receive weather or alert data. In response to receiving data, the transceiver transmits the data to low powered devices in a house using a different frequency band than the frequency band it received the data.

15 Claims, 50 Drawing Sheets

METHOD AND APPARATUS OF TRANSMITTING, RECEIVING, DISPLAYING AND PLAYING WEATHER DATA

RELATED APPLICATIONS

This application is a continuation of U.S. Provisional Application 61/054,054, entitled "Method and Apparatus of Transmitting, Receiving, Displaying and Playing Weather Data," to Allan McCormick and Rolf Haupt, filed on May 16, 2008, which is herein incorporated by reference in its entirety for all purposes.

FIELD OF INVENTION

The present invention is generally related to electronic systems such as wide area network based weather communication systems with integration of localized data. More particularly the invention provides methods of transmitting and receiving weather, time, music, and alert information via, for example, a wide area network such as WiMax or more localized networks such as wireless LANs.

BACKGROUND OF THE INVENTION

Current prior art weather station devices suffer from poor specificity as to geographic regions, poor reception in remote areas or in buildings, high cost and high power drain making battery operation impractical for many applications. Additionally, local weather stations only provide data pertaining to the immediate area surrounding the home and have no provision for data sharing with wide area networks and sensors at other remote locations such as other homes. A device and apparatus is needed for collecting information from a variety of sources and presenting this to the user in a meaningful manner. Often, the data from only one source is not nearly as reliable as the data from a number of sources. This invention utilizes data from a variety of sources to provide the user with a more robust user environment.

BRIEF SUMMARY OF THE INVENTION

In accordance with one or more aspects of the invention a device may receive data through any number of receivers, including a receiver and a wide area network receiver, and Internet broadcasting resources. For example, data may be data sent from NOAA (National Oceanic and Atmospheric Administration) transmitter. The data may be utilized in a suitable display format such as a wall clock and/or alarm clock display. The electronic device may be configured to receive time synchronized data from a transmitter through a transmitter and/or receiver network and displayed on a suitable display. The data received at the receiver system may be based on the geographic location of the receiver system. For example, as the receiver travels from Washington D.C. to Los Angles, the receiver is reconfigured to receive weather data for the user's home location (e.g., Washington D.C.) and weather data for the user's current location, e.g., Los Angles. This weather data may be variously supplemented by data received from data ports disposed about the user's home and/or vacation home. For example, the user could simply press a button while on travel or at the office to see a web cam image of the user's home or vacation home, together with environmental information such as inside/outside temperature, thermostat settings, water flow meter readings (alarms for broken pipes), door and/or window sensors, sprinkler settings, and other suitable local information.

For a battery operated application, it is often not possible to have sufficient specificity in the coverage areas to make a weather device practical for nation wide and/or international sales. For example, often the weather will vary over a fairly narrow geographic area and/or over a specific time interval. Making weather data useful often requires sending large amounts of weather information to the receivers. However, this large amount of data can reduce battery life dramatically. Accordingly, systems and methods are included for providing adequate battery life while providing a fine granularity of coverage of weather data. In exemplary embodiments, a coding is provided to code the weather data to a transmission scheme where data for a specific region is sent in a time synchronized manner. A microprocessor monitors the data stream to determine a time stamp from the data stream. By utilizing a zip code or other geographic specification, the system then can set an internal "watch dog" timer or similar low power interrupt device and "wake up" at an appropriate time to then download the data for that particular geographic region.

Current weather technology uses roughly sixty pager cells covering an area the size of the United States. Cell areas of this size are far too large in order to effectively provide useful weather data to the particular users within the cell. For example, in the United States there are roughly 3,200 counties. Sixty cells equates to roughly 50 counties per cell. Such a vast area results in little or no useful information for an individual user. Increasing the number of cells vastly increases the amount of data that must be transmitted and negatively impacts battery life. Accordingly, at least fifty different weather data points must be transmitted for each cell within the pager network in order to provide adequate coverage for particular users. Even this coverage may not be specific enough and it may be required to transmit 100, 200, 300 or more specific locations within the cells in order to provide point specific weather data to each of the receivers based on more specific location information. Where about 10,000 to 100,000 regions are utilized for an area the size of the United States, the user is provided with a sufficiently specific user experience to make the data useful. For example, there are roughly 42,000 ZIP Codes in the United States and many more ZIP plus four codes. The ZIP plus four codes may be limited to a group of apartments, a suburban street, a building or business, or a city block. Systems and methods are presented to generate this type of specific data (e.g., weather related data), to transmit this specific data to one or more processing centers, to process the data into useful information in conjunction with data from other sources, and to transmit the data to individual users in a manner that is compatible with battery powered devices.

In one or more aspects of the invention, the receiver and/or transmitter is configured to operate in a mode to designed to prolong battery life. For example, the weather data may be time synchronized based on time codes sent in the transmission data. These time codes may be utilized on conjunction with a low power "watch dog" timer or other similar low power timing device to allow the receiver to "wakeup" at an appropriate time when its weather data for a particular geographic region, e.g., one tied to a particular zip code, is being broadcast. In an exemplary embodiment the pager/WiMax/802.x can locate particular header information in a transmission, wherein the header information includes time coded information based on the pager/WiMax/802.x's location.

In further aspects of the invention, a pager/WiMax/802.x system includes a time code. The time code stamp for the pager/WiMax/802.x system is pre-configured such that the pager/WiMax/802.x can calculate an offset for the weather data from a particular time code. For example, weather data for a particular location would be offset from the time code and/or actually transmitted a time certain for any particular weather device. This configuration substantially reduces power consumption for the weather device and allows it to "wakeup" at particular intervals. The "wakeup" can be further segmented into alerts which can force a mandatory wakeup and less time sensitive data which arrives much less frequently.

In aspects of the invention, the pager/WiMax/802.x system automatically turns on at a preset time, and looks for a location code from a pager/WiMax/802.x cell. Based on this location code, the pager/WiMax/802.x system re-synchronizes and downloads new weather data if the receiver has moved to a different location.

In another aspect of the invention, the receiver accesses available zip codes from a particular cell, aggregate them in its memory and provide the user with a choice from its selection of zip codes. The user-interface is simplified to choose from the selection. This allows a weather device to be deployed (e.g., on a watch) where there is no room for numeric data input for zip codes. It also allows the user to reconfigure the watch or other receiver device automatically depending on his or her current location. For example, if the user travels from the United States to Canada, assuming the pager/WiMax/802.x system is configured for cross boarder operation, the device will present the user with an option for selecting the closest geographic region from a subset of regions based on the data supplied by the particular cell.

In one or more aspects of the invention, the user can select a multiple number of zip codes in which the user is interested. Alternatively, the user can select an area within a large zip code. Often the user will use the ZIP+4 code to select areas within a larger zip code.

In an embodiment of the invention, a GPS (global positioning system) module, in addition to a pager/WiMax/802.x system is located on the weather station or the weather receiver. The GPS module automatically pulls weather data based on the coordinates of the GPS system. A translation system which translates position information (e.g., longitude and latitude) into ZIP or ZIP+4 codes are utilized to precisely gather weather data for the current position of the user.

In one or more aspects of the invention, weather data are beamed from a satellite to a GPS antenna similar to how GPS data currently transmits to GPS antenna.

In one or more aspects of the invention, weather data is received and optionally displayed in a vehicle such as motor vehicle, driving past pager/WiMax/802.x towers and/or cell phone towers and/or FM radio stations.

In further embodiments of the invention, a method is provided whereby as vehicle or other weather-receiving device passes a Wi-Fi/WiMax hot spot, receives updated weather information through broadband, and stores this information for later use. For example, a cellular phone passing through a Wi-Fi/WiMax hot spot would download updated ZIP code information and any recent changes to the ZIP codes. This data would then be available to save battery power when the device was not located in a Wi-Fi/WiMax hotspot. Not only is the weather data for the current location received, but also for all locations proximate to the current location. In this manner, the user can simply scroll from his current location on a visually displayed map and hit the weather button at any time to see a pop-up display with the current weather conditions at the selected location.

In alternate embodiments, the device is WiMax enabled and received weather data regardless of the current location of the device.

In one or more aspects of the invention, a router is configured to transmit data including weather map, weather data and other data to Wi-Fi/WiMax receiver integrated to, for example, a display screen, a user's vehicle, iPod, cell phone and other portable devices. In an embodiment of the invention, the user's vehicle data or portable device would be updated as the user progressed along the user's route.

Further aspects of the invention include a distribution method for distributing data to and receiving data from various appliances in a home. Many homes (most in affluent areas) are already configured with 802.11 a-g, or n wireless networks. Alternatively, there are also nationwide WiMax networks being deployed. These networks, may for example, employ 802.16e-2005. A control center may use this network to collect and transmit data to/from various devices within the home. For example, the furnace, water heater, bathroom heater, electric meter, gas meter, television devices, window controls, thermostat, garage door opener, home security systems, home cameras, home weather stations, and other similar devices may be wireless connected. The central controller may collect information from these devices and forward the information to remote locations. This data may be aggregated by a central controller and used, often in conjunction with other weather information gathered from different sources, to more accurately predict weather information for very specific areas such a ZIP plus four codes.

In an embodiment of the invention, a receiver unit is integrated into a home automation so that upon detecting or predicting the whether condition would perform some functions in response. For example, upon predicting a high probability of rain or detecting rain the unit would close the house windows.

In one or more aspects of the invention, a weather sensor and/or Wi-Fi/WiMax may be used to remotely monitor a home to assess for example, the current status information of the home. Such status information includes for example, temperature alerts, water intrusion alerts, camera feeds, sound feeds, intruder alerts, and NOAA weather alerts provided to the location of the home. This information may be provided to the user on his local phone or remote terminal. A hot key is included to access the status information immediately. The user may then use a thumb wheel to scroll through the interface.

In aspects of the invention, a user on a mobile platform such as cell phone, a boat or other GPS device may alternatively have an emergency alert that would be sent in a reversed path on the pager/WiMax/802.x network or similar wireless device.

In one or more aspects of the invention, a user is provided with a user-interface, where the user may select a particular alert. Certain alerts may be pre-selected based on the particular cell tower of the user's geographic location. For example, where the user is located in an area of frequent forest fires or tornadoes, these alerts would be automatically selected. Other areas such as costal regions may automatically have hurricane warnings selected. Further, the user is able to select or deselect any number of alert messages. In addition, the user-interface may provide categories of the alerts that would allow the user to more easily setup the user's receiver system. In some embodiments of the invention, in response to receiving alerts, a home automation system may take certain actions. For example, if the home system received an Amber alert, a child abduction alert, or a criminal escape alert the home automation system could automatically close doors, close windows and turn on an alarm system.

In further embodiments of the invention, a receiver is integrated to devices such as a watch and/or a cell phone to receive NOAA weather warnings. The device is provided with an audible and/or visual alert in response to certain severe weather or other national emergency situations. The present invention provides an improvement to the NOAA system by periodically sending a preamble or other header information that would precede any alert. The receiver may include an input filter that is on a separate very low power circuit. This circuit is either turned on for very short period of time periodically to look for the preamble to detect if there were a particular advisory alert incoming to the device. This has the advantage of saving substantial power. In an alternative embodiment the preamble is coded such that a different preamble would come down (is transmitted) based on the category of alert.

In one or more aspects of the invention, a receiver is configured to receive, with minimal amount of power, certain NOAA or Wi-Fi information transmission that would normally require extensive amounts of power, leaving them impractical for most battery operated devices.

In a further embodiment of the invention, a projection weather receiving station is adopted such that the receiver unit turns on and projects an alert on the ceiling or out into the room.

In one or more aspects of the invention, a transmitter is incorporated into a bedside alarm system such that certain items in the house are keyed to the alarm system, such that the devices are automatically controlled when the alarm is activated.

In a further embodiment of the invention, an incoming NOAA alert turns on a television, and automatically switches the television channel to the emergency alert channel. In still further embodiments of the invention, a computer is automatically set to an alert web page where geographic specific emergency information is provided to the user along with links and instructions for reacting. For example, the individual user may be presented with a web page constructed by the Federal Emergency Management Agency giving the user instructions for how to react to a biological, nuclear, or conventional terrorist attack.

In aspects of the invention, a low cost user console is provided by using a plug-in device, for example a USB (universal serial bus) stick plugged into a user terminal. A programmable and pluggable memory card is also plugged into the user terminal using a standard interface of the memory card interface in the terminal. This enables the user to configure a device using his home computer or laptop terminal and then take that device to his watch, cell phone, settop box, or VCR and download the configuration information.

In aspects of the present invention, a transceiver receives and transmits a time signal to all devices in a house providing a unified and accurate time for all alarm clocks, clocks, watches and other devices within the house. An alarm clock which loses power will automatically look for an 802.11 signal or similar such signal. The clock will synchronize with the time provided by the signal. In this manner all of the clocks in the home will display the same time. The 802.11 signal may also be modified to broadcast a time signal as part of the connection standard. This avoids some of the reception problems associated with using the WWVB time signal from the atomic clock in Colorado.

A VBI slicer and/or HDTV data receiver could be utilized under certain applications. However, with the current technology, the utilization of a VBI Slicer and/or HDTV television data receiver may entail higher cost and power consumption levels than are generally desirable for many applications. However, as the cost of power consumption is reduced in subsequent years, a VBI slicer and/or HDTV data receiver will become practical in many applications.

In further aspects of the invention, a receiver is configured such that when in proximity to an atomic clock it is able receive the atomic clock's synchronized signal, the clock will synchronize to that signal. When it is not able to receive the atomic clock signal, the receiver will reconfigure to look for other nearby clocks and attempt to synchronize with a nearby clock or 802.11 or similar such signal.

In still further aspects of the invention, a user with a IRD port or blue tooth port may perform a data exchange with one of the weather devices and download data directly. For example, a user with a TREO may download the weekly weather data from the weather device by simply "synchronizing" with the weather data device periodically. For example, while eating breakfast, the user may choose to synchronize with is weather or home automation device and will be update with the most current information from the device.

These and other inventions will become more apparent from the below drawings and detailed description of the invention provided below.

BRIEF DESCRIPTION OF THE DRAWINGS

A more complete understanding of the features described herein and the advantages thereof may be acquired by referring to the following description by way of example in view of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Aspects of the invention provide a method and apparatus for transmitting and receiving data, integrating data from various sources, and presenting the data to a user in a user friendly usable format. For example, weather data, alert/emergency data, and traffic data may be integrated to provide the user with current information in a mobile environment to assist the user in making real time decisions. The data may sent from a transmitter such as the NOAA transmitter and/or a WWVB type transmitter and received by devices such as cell phones, a pagers, wide area network receivers, and/or other type of display device.

In one exemplary embodiment, a NOAA transmitter network utilizes about 900 transmitters, each having a roughly a forty mile radius, covering the entire United States. Although these transmitters currently do not provide sufficient specificity for many practical applications, embodiments of the present invention include encoding the data from these transmitters to transmit specific location information along with alerts to users within specific geographic regions such as certain zip codes or zip plus four codes. Similarly, there are also certain pager/WiMax/802.x type networks covering the United States. Again, the present invention includes including data to provide sufficient specificity for many practical applications including data for specific geographic regions such as zip codes or even more specific regions such as zip plus four codes. Cell phone towers are arranged in close enough spacing to provide useful weather information for many applications, but the network associated with these towers currently does not provide for individualized weather date transmitted from the tower. Additionally, the data provided by the towers may be further segmented into specific areas such as zip codes and/or zip plus four codes. In embodiments, the weather data may be filtered either at a central location or at the cell tower to only provide data associated with areas serviced by the particular cell tower. For example, the cell tower may provide data for a particular zip code, portions of more than one zip code, and/or one or more zip plus four codes.

Figure 1A:
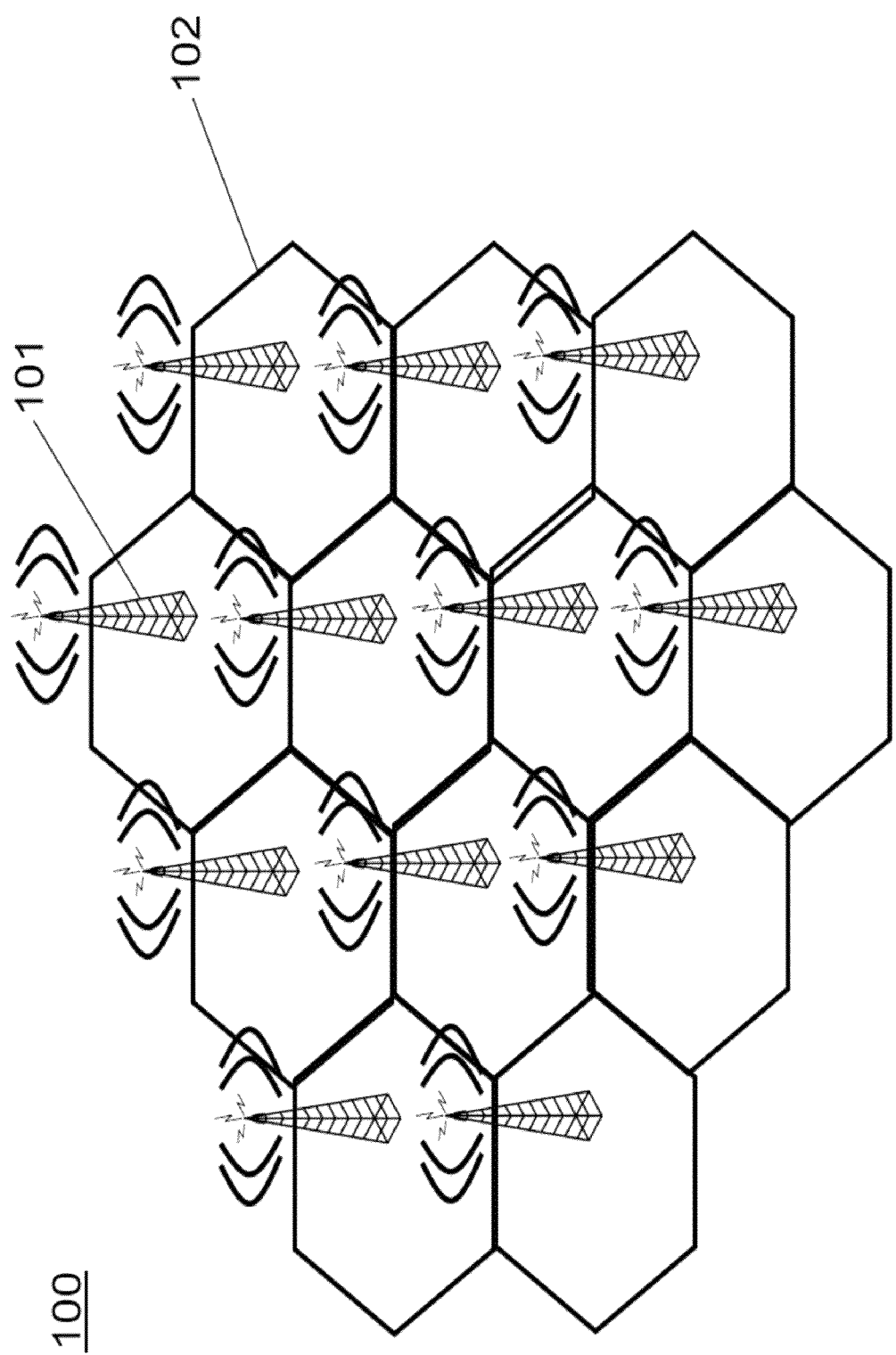
FIG. 1a shows an exemplary pager/WiMax/802.x cell network comprising a plurality of cells and a plurality of transmitters, with one transmitter per cell.

With reference to FIG. 1a, cellular/pager and/or other network 100 comprises a plurality of cell/pager/base station towers 101, with each tower providing transmission and/or reception to a number of cells 102. The cell coverage may have any number of cell towers within a particular geographic region. These cell towers may or may not overlap with each other. In most cases, the cell towers will have overlapping coverage. This is particularly true in areas of dense population. The cell towers typically do not correspond to zip code areas or zip plus four areas.

Figure 1B:
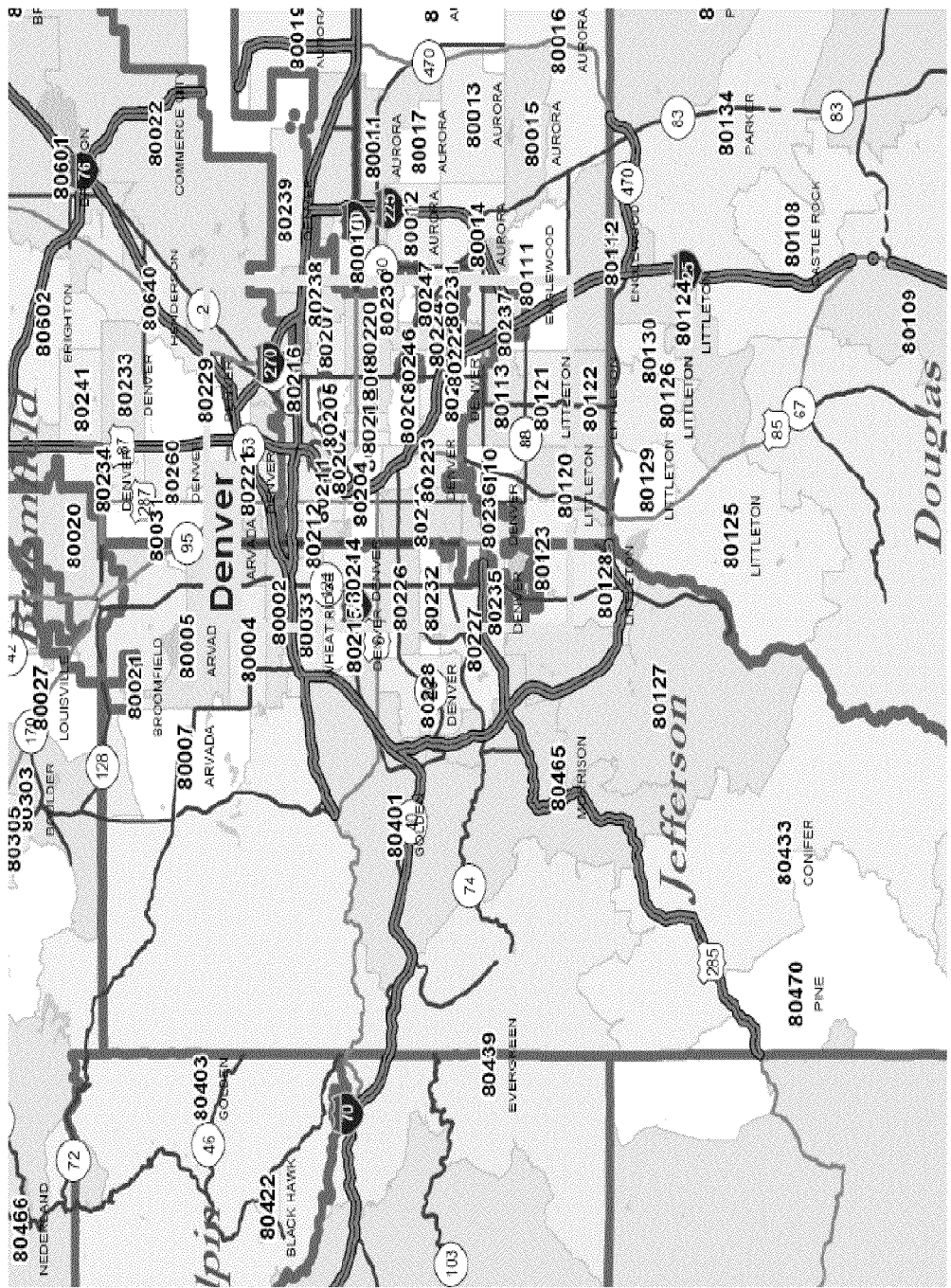
FIG. 1b shows an exemplary zip code map.

For example, FIG. 1b shows an exemplary map with zip code coverage. The zip codes typically correspond to particular boundaries (e.g., municipalities) and not to cell tower locations. Further, the zip codes are much denser in populated areas than in more rural locations. Thus, the zip code may serve fine for the weather geographic location in dense areas, whereas the zip plus four code is desirable for providing specific weather location information in less dense areas.

Figure 2:
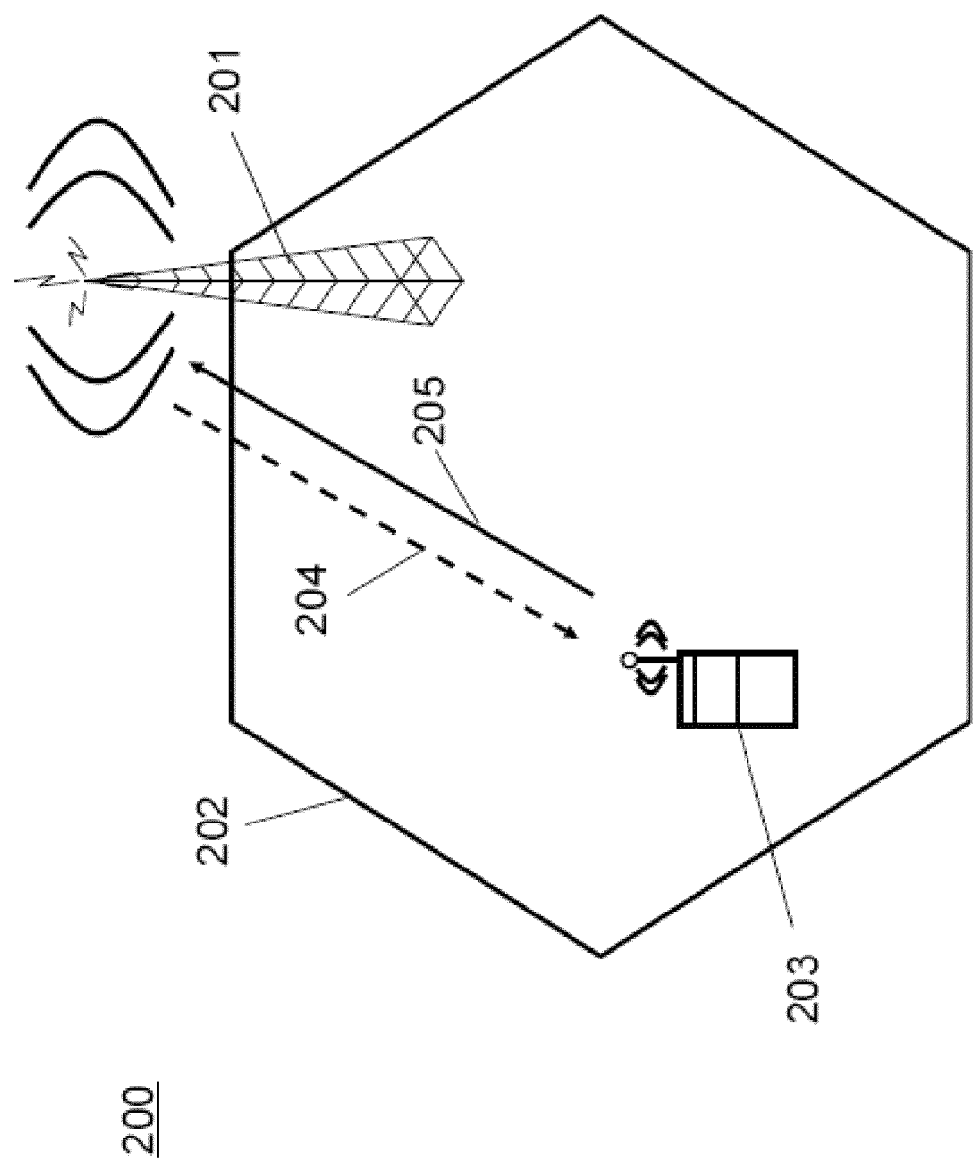
FIG. 2 shows an exemplary pager/WiMax/802.x cell comprising a transmitter serving the cell and a receiver for receiving transmitted information from the transmitter.

FIG. 2 shows an exemplary cell 202 and transmitter 201, where data is transmitted by the transmitter 201 and received by the receiver 203.

Figure 3A:
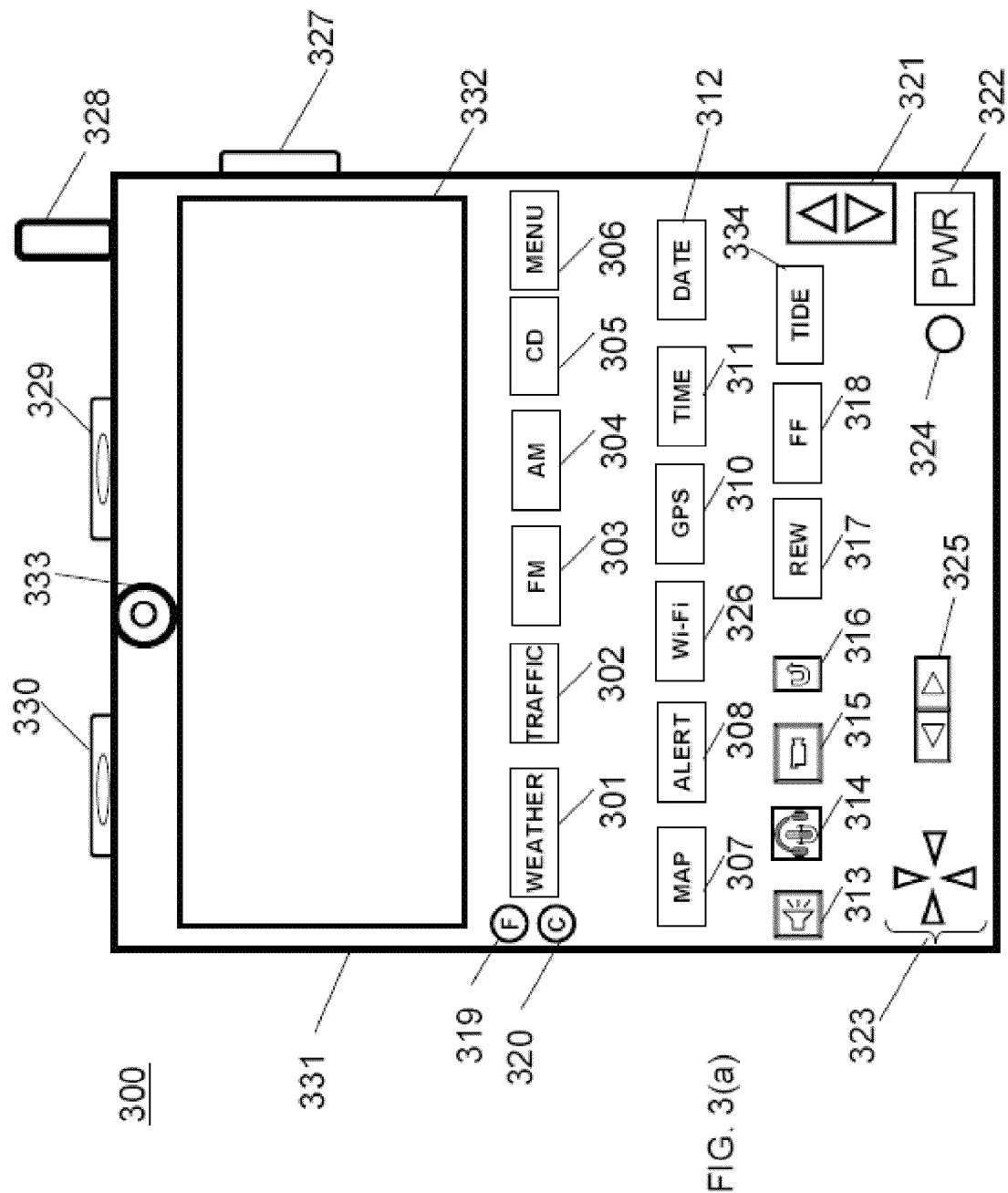
FIG. 3(a) shows an exemplary receiver system with buttons separate from the display screen.
Figure 3:
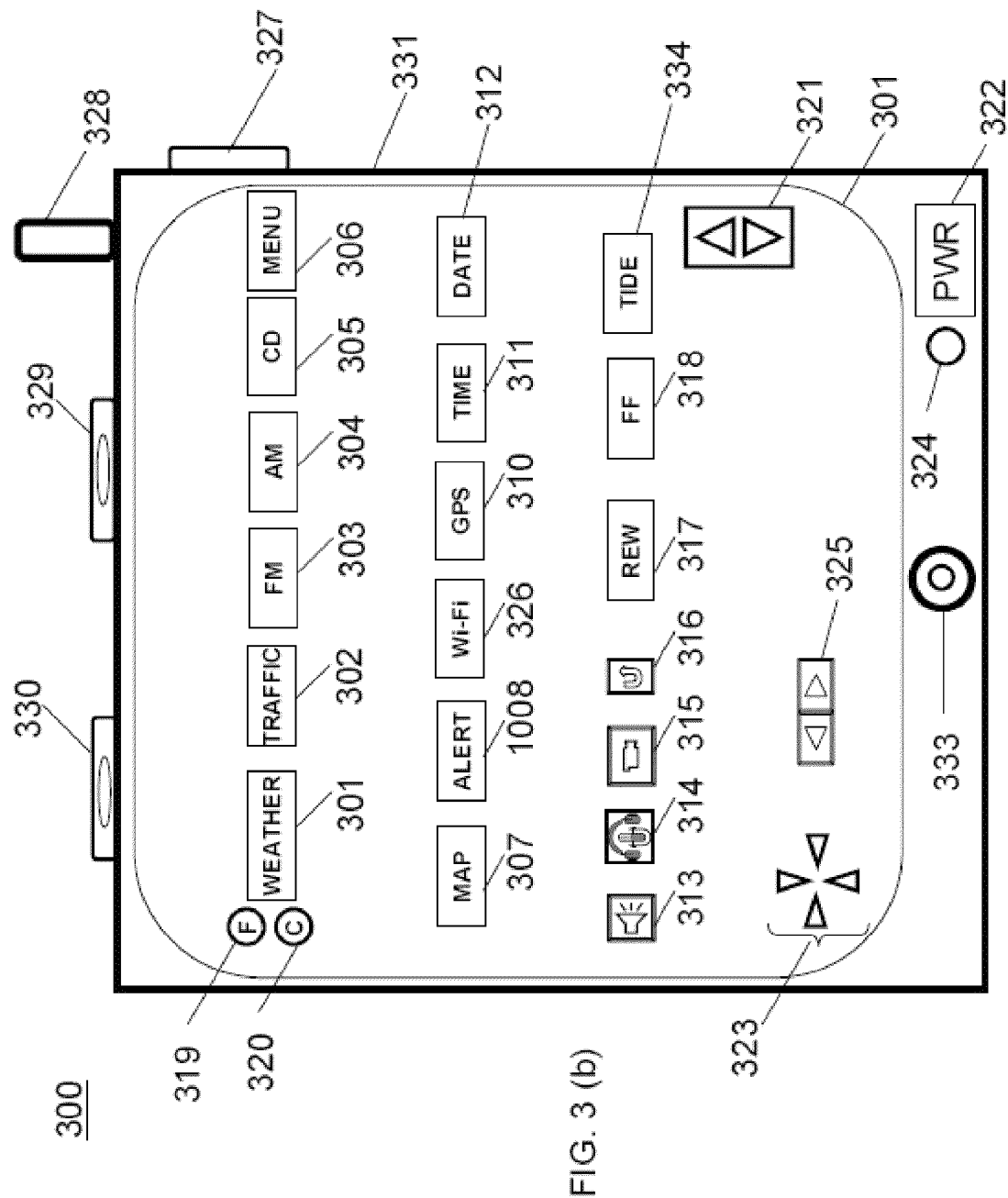
FIG. 3(b) shows an exemplary touch screen receiver system with buttons on the display screen.

Referring to FIGS. 3a and 3b, exemplary embodiments of a receiver 300 are shown. Receiver 300 is discussed in more detail below. Briefly, receiver 300 includes various user inputs and a display screen 332 which may be a touch screen 335. The receiver may be continuously powered or may be turned on by depression of a power button 322. The receiver may include a LED power indicator 324 and/or simply use the screen backlighting as the power indicator. The receiver 300 may be variously configured to include weather button 301, buttons 319 and 320 to select weather data in Fahrenheit and Celsius, respectively, emergency light(s) 323, speaker button 313, microphone button 314, video button 315, reset button 316, and volume button 325, and/or other suitable interface buttons. Various ports may be included to include additional modules such as GPS modules and/or other communication and/or sensor devices.

Figure 4:
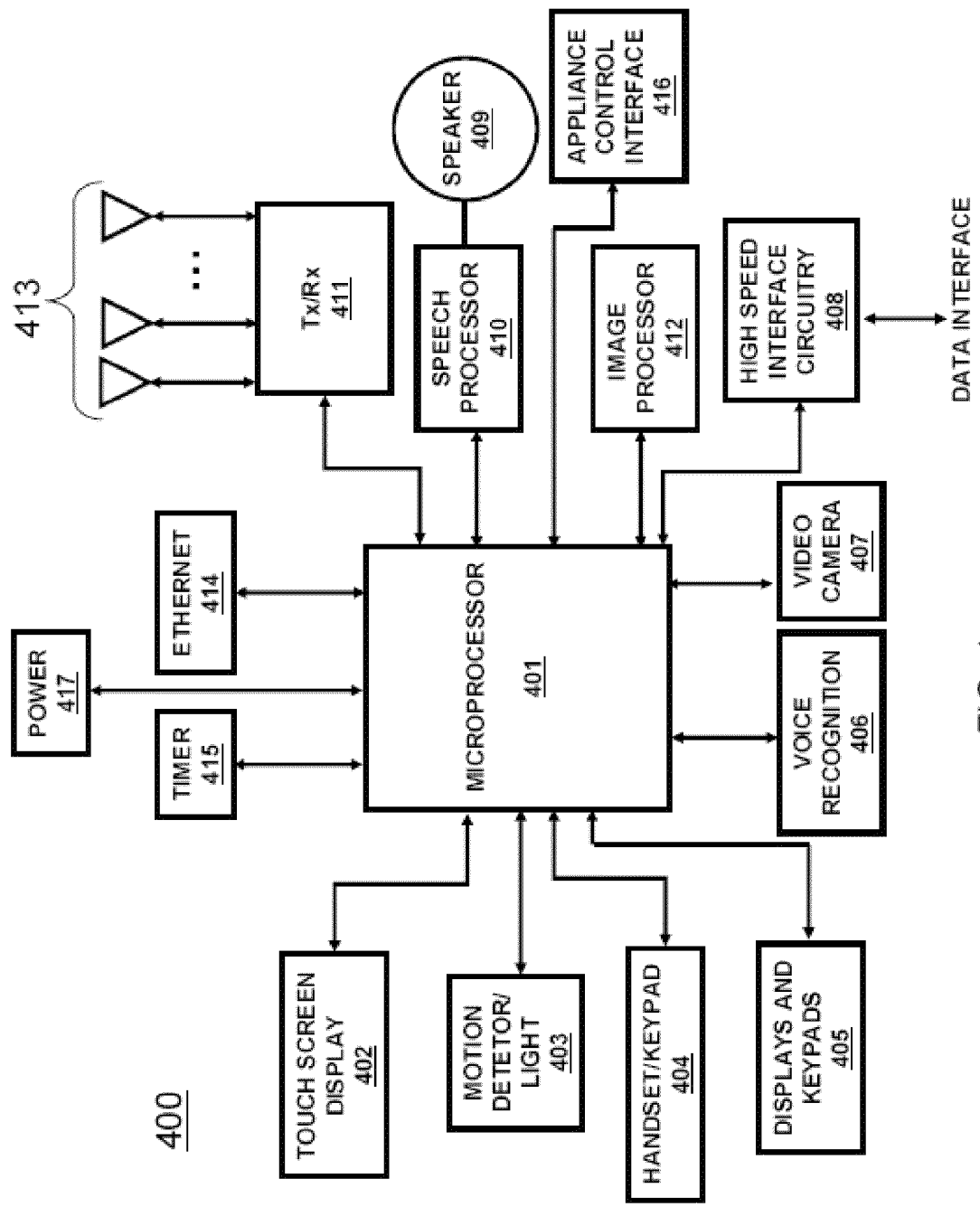
FIG. 4 shows an exemplary microprocessor based system for a receiver system.

Referring to FIG. 4, a block diagram of exemplary electronics 400 is depicted for receiver 300. The exemplary electronics include one or more computer units, e.g., microprocessor/microcontroller 401, a power supply (e.g., a battery and power regulator unit) 417, a timer 415 (e.g., a watch dog timer), a network connection (e.g., Ethernet 414 and/or 802.11 a-g, n), a screen interface (e.g., touch screen display) 402, a motion detector, light controller, door/window sensor, infrared detector, and/or appliance control/sensor 403, handset/keypad (e.g., user interface control) 404, various indicators, displays, and keypads 405, voice recognition circuits 406, still and/or video camera(s) 407, data interface circuitry (e.g., wired and/or wireless circuitry) 408, signal processing circuits (e.g., image processor) 412, appliance control interface (e.g., heat, window controls, bathroom heater, cooling, water heater, lighting, alarm clocks) 416, speech processor 410 and associated audio device (e.g., speakers and/or headset) 409, various antenna transmitters and/or receivers 413 and associated receiver/transmitter (e.g., transceiver) circuitry 1411.

For example, a home automation system may provide a proprietary transceiver which is on one side compatible with a home automation system and/or home weather station and on the other side compatible with a standard interface into a wireless device such as a SD port. Alternatively, a standard blue tooth or other similar communication protocol may be utilized. In this manner, when the user walks into his or her home, the communication device may synchronize with the local weather data device and/or home automation device and begin controlling that device in accordance with the user's preferences. For example, the user may program the device so that the windows open when the weather is within certain temperature ranges and/or certain temperature and humidity ranges. He may also program the device to control the home automation system to turn up or down the thermostat when he/she arrives home and then turn it up/down when his hand held device in no longer within range of the home. In this way, the home can use its own home automation system to reconfigure itself to meet the user's personal preferences. In further embodiments of the invention, the users home phone may detect that he/she is home by virtue of the hand held communication device and then route incoming calls from the user's work phone and/or cell phone to his home phone. The device may transmit the current weather to a centralized location.

As the users mobile device moves between various locations and/or is configured within a particular location for stationary use, the device is customized to that particular location. The specificity of the weather data may be configured in accordance with any of the following.

The cell tower and/or central location broadcasting to the cell tower may include a database correlating cell tower location information with zip code. This enables the cell towers to conserve critical bandwidth by not transmitting all, e.g., weather information, for the entire region or country, but rather specific information, e.g., weather information, for a particular area served by the cell tower. Thus, the data broadcast by the cell tower is specific for the particular area being served by the tower. A battery operated device within the cellular tower may then turn on its receiver at a predetermined time or upon receipt of an interrupt signal, e.g., triggered by a preamble, to receive data. This enables the battery powered device to consume a minimal amount of power while still staying fully informed about current conditions, e.g., weather conditions.

Referring again to FIG. 1b, where the zip code map is overlaid over the cellular area map, it is clear to see that the zip codes are much more dense in some areas than in others. Thus, the zip codes may serve as suitable weather area indicators in densely populated areas, but not in less densely populated areas where zip plus four codes may be desirable. Once a device is programmed with its zip code or zip plus four code information, it can be selectively activated at an appropriate time to access only its zip code information. Thus, for example, zip codes and/or zip plus four codes in highly populated areas (e.g., New York City) might be aggregated so that users within two or three zip codes receive the same weather information—thus saving battery resources and transmission bandwidth. Whereas users in less populated areas, may receive weather data aggregated to one or more zip plus four codes so that users receive more specific weather data useful to their particular location within the zip code. The invention includes a method of delivering weather data to zip codes and zip plus four codes. The method includes the aggregation of zip plus four codes within a zip code and/or aggregation of zip codes within very populated regions. It also encompasses assigning weather data to subsets of zip plus four codes within a particular zip code in some regions, to zip plus four codes in other regions, and/or to zip codes in still further regions. The method further includes assigning zip plus four codes in close proximity from a weather perspective to receive the same weather information.

The WWVB transmitter is a long wave transmitter which typically covers the entire United States. This enables the transmitter to be located in a central location in the United States and transmits to any location in the United States including difficult and remote areas. The long wave transmitter has a disadvantage in the amount of data that can be carried over the long wave transmitter is limited. This disadvantage can be somewhat ameliorated by time coding the data and transmitting the data periodically and having the receiver turn on at specific times. The coding in accordance with the present invention includes breaking the data into geographic regions as discussed above. A time code table is transmitted and/or preloaded into a receiving device. The device is programmed to turn on and receive its data during the predetermined time period. This helps vastly conserve battery power. Further, alerts may be periodically sent in yet another time slot which is coded so as to trigger an interrupt. For example, the receiver can be partially powered once every 15 minutes to scan for a preamble which will indicate that an alert is being sent for a particular region. The alerts can be region specific and the time slots may be coded for particular regions. In addition to alerts, updated weather information may be provided where necessary. For example, a one week forecast may be downloaded periodically. Updates to the forecast may then be sent down coded so that only changes in the data are actually transmitted. Thus, further bandwidth is saved with accurate forecasts because less changes in the forecast as the date approaches results in less update data being transmitted. Further, areas which typically share the same weather patterns may be coded together during particular times of year and areas with varying weather patterns may be coded separately.

One exemplary embodiment of the time coded information will now be explained by way of illustration only. In order to provide weather data and still have a useful battery life, it is helpful for the data be provided in a time synchronized manner. For example, the receiver may locate particular header information in the transmission. This header information may include time coded information based on the pager/WiMax/802.x's location. For example, if the pager/WiMax/802.x is located in a particular county or city such as Washington, D.C. or area code 20001, the pager/WiMax/802.x would know that data is transmitted 10 hours and 13 minutes, 40 seconds after the start code.

Thus, a very low powered internal timer may run in the electronic device's microprocessor 400 shown in FIG. 4, which is activated upon receiving a header code or other time information such as time information from a wide area network/local area network time source such as the time source output by Boulder, Colo. WWVB time source and/or a time source output from a cell tower. From a header code and/or preconfigured system table time information (e.g., correlated to zip code or zip plus four codes), the data may be synchronized with the time source such that it is offset by a predetermined amount of time and/or data. By using a zip code to determine the length of time from a particular time code that the unit would turn on, power up and look for weather data coming in from a particular area code, substantial power savings is provided. The microprocessor processes incoming data, for example, received from one of the plurality of antennas 413, and manages the receiver system by responding to control commands which may be input by the user dynamically or pre-configured to a set of standard default values.

While certain conventional receivers (e.g., meteotime) may receive weatherdata via time code transceivers, these embodiments are extremely limited to as few as 90 datasets for an entire country updated only once per day. Further, current weather data such as msm direct has very limited coverage such as at most 90 large urban areas. Such limited coverage areas and update times are of little or no practical value. Additionally, it is not possible to provide weather alerts and maintain any battery efficiency. The present invention seeks to vastly improve the usefulness of weather data and to enable the use of severe weather alerts while still allowing for low power operations. In order to have a practical device which satisfies the needs of consumers for weather data, the device needs to provide very specific location based data that in fact correlates to the weather the user is experiencing. As the user becomes accustomed to accurate weather data, he or she will begin to rely on the device and it will become an integral part of his/her existence.

In one exemplary embodiment, Internet connections such as cable, DSL and/or Fiber to the Home connections are now available almost anywhere in the US, and in some other countries. For example, it is estimated that more than 50% of U.S. homes now have some form of broadband Internet connection. Broadband connections are approaching 75% of all Internet connections in the U.S. This penetration percentage is increasing quickly and should approach 100% in a few years. With respect to the present invention, households with higher incomes are more likely to utilize devices which embody the invention. In particular, studies have shown that 68% of households with incomes over $50,000 have broadband connectivity.

Figure 5A:
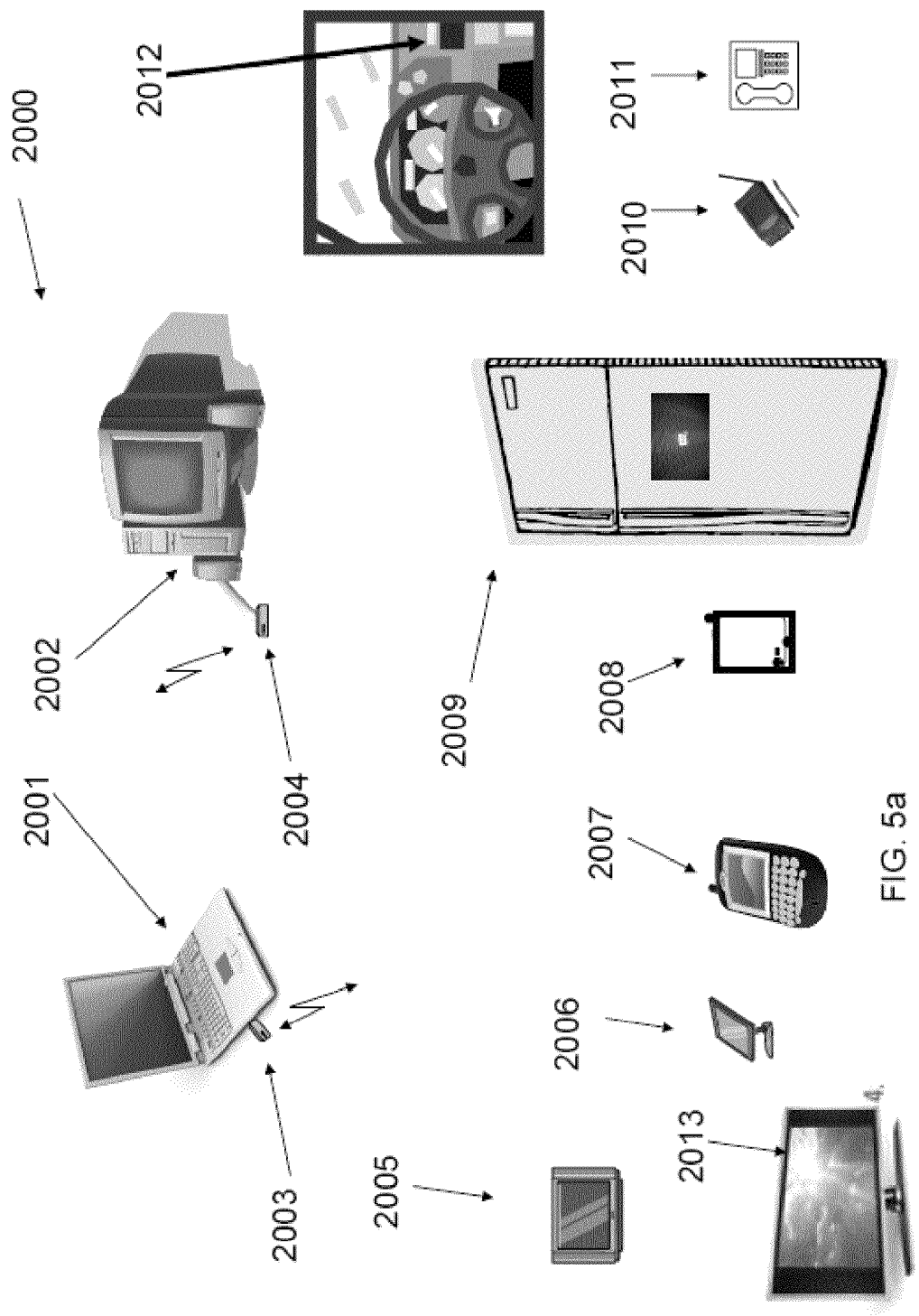
FIG. 5a illustrates exemplary form factors for receiver systems as shown in FIG. 4.
Figure 27:
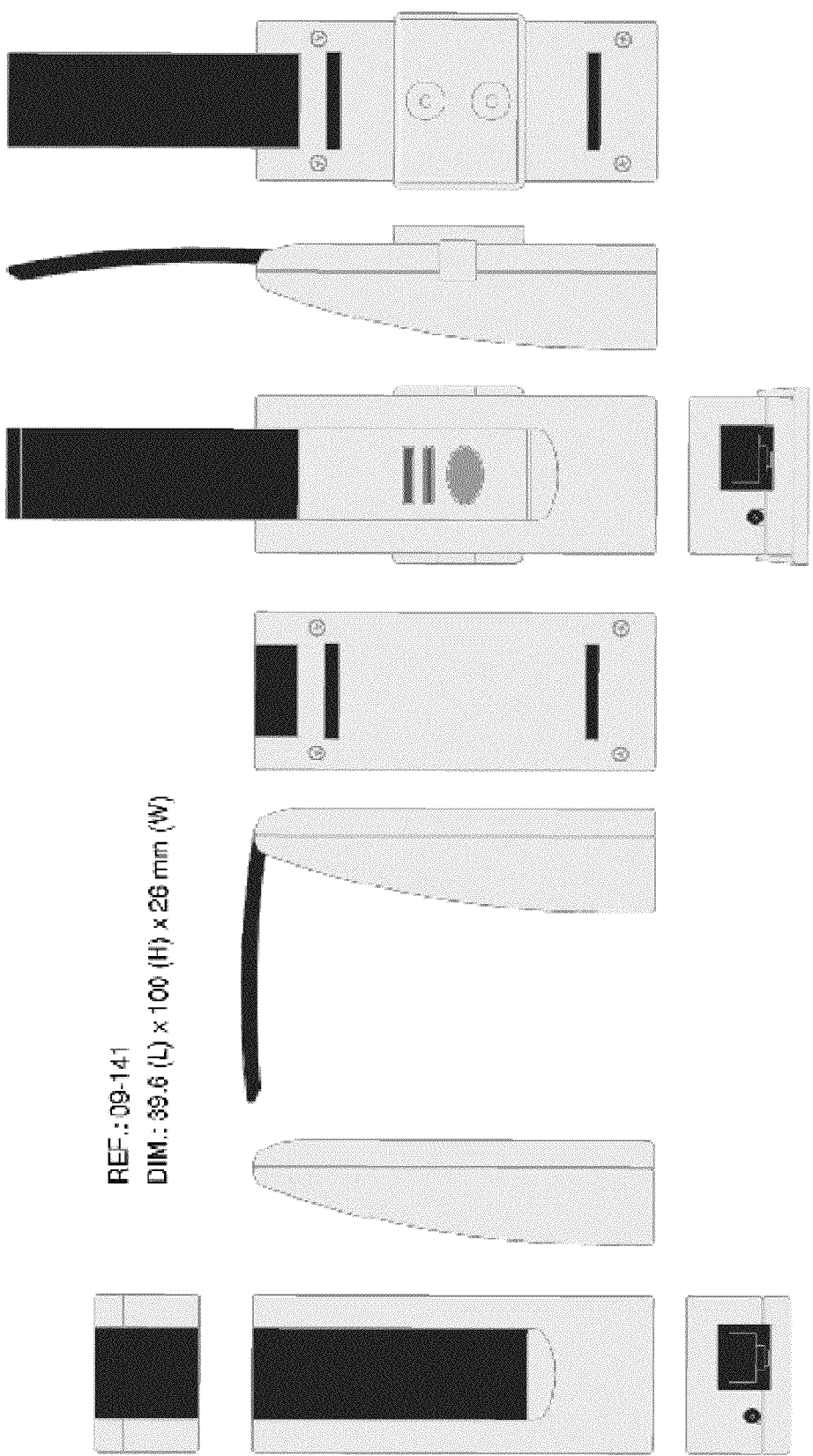
FIG. 27 is an embodiment of a weather station gateway apparatus (e.g., a home base network interface) for providing network connectivity with the weather station in accordance with embodiments of the present invention.
Figure 28:
FIG. 28 is an image depicting an embodiment of a weather station gateway apparatus for providing network connectivity with the weather station in accordance with embodiments of the present invention.
Figure 29:
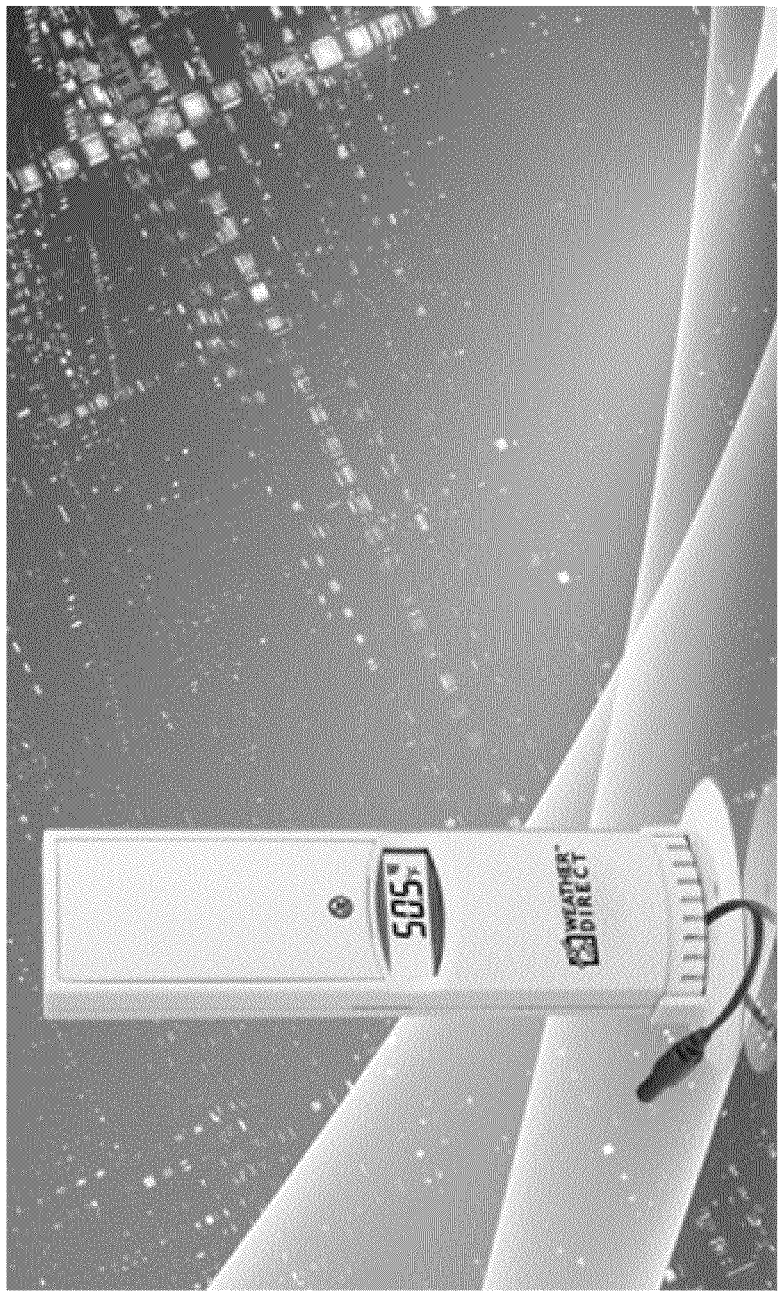
FIG. 29 is an image depicting an embodiment of a temperature sensor apparatus (e.g., a mountable outside or indoor sensor) for detecting and providing temperature data to the weather station in accordance with embodiments of the present invention.
Figure 30:
FIGS. 30-38 are images depicting nine additional embodiments of weather station interface units in accordance with one or more aspects of the present invention.
Figure 31:
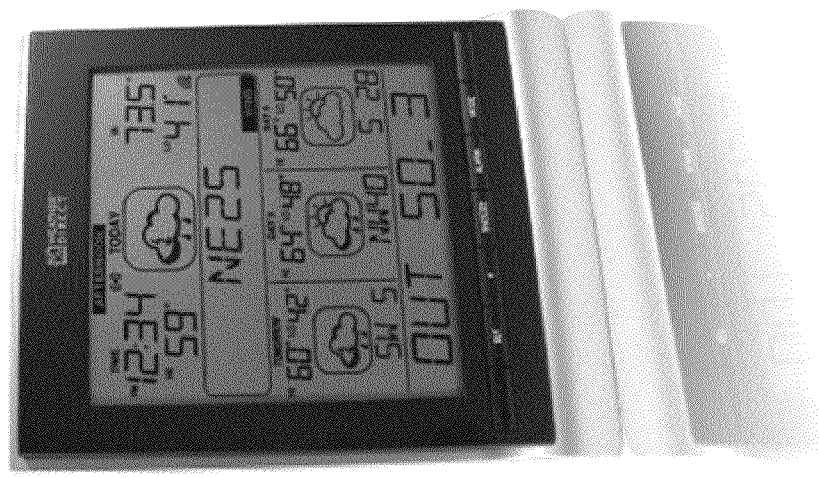
Figure 32:
Figure 33:
Figure 34:
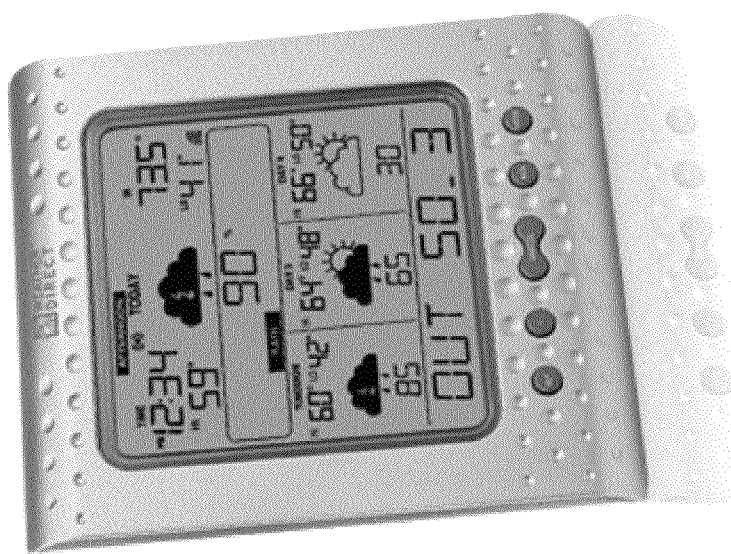
Figure 35:
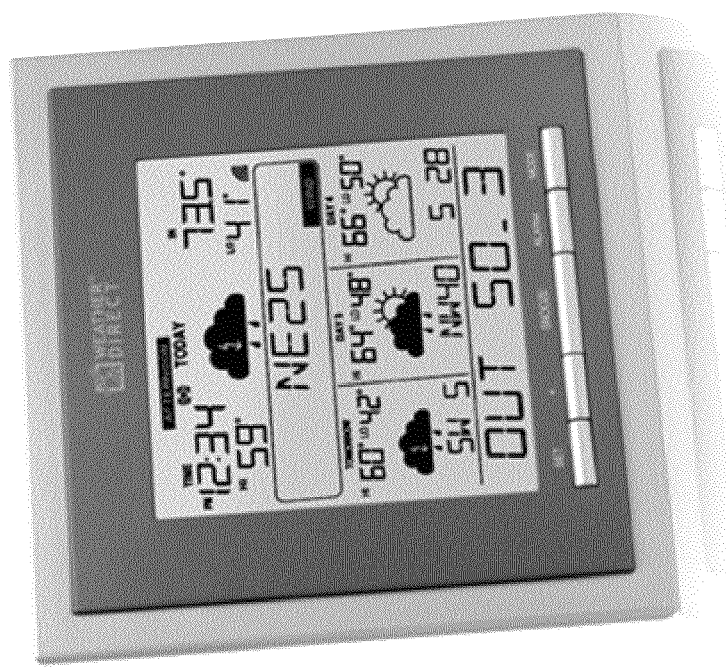
Figure 36:
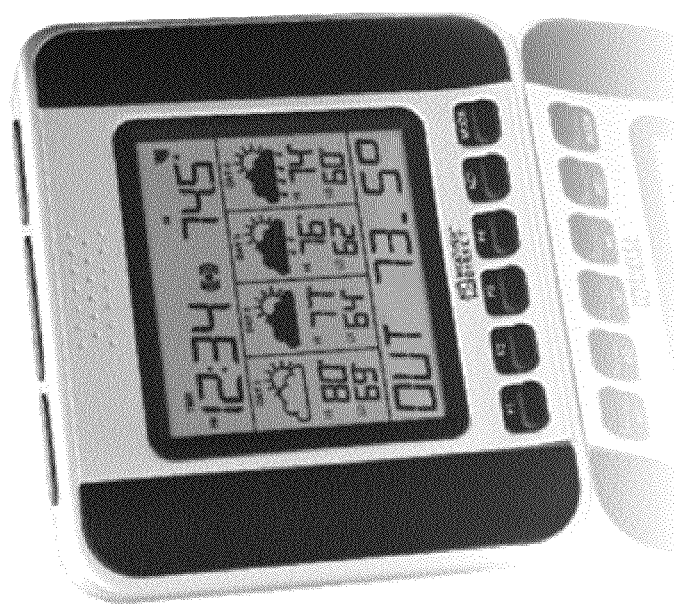
Figure 37:
Figure 38:
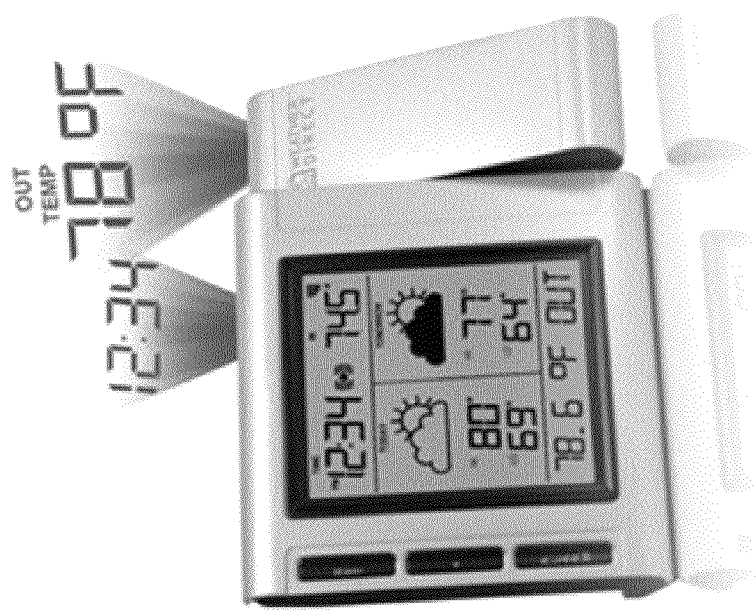

Referring to FIG. 5*a*, an in-home network may include on or more computers 2001, 2002. The devices shown in FIG. 5*a* may be designed to utilize an always on Internet connection either directly (e.g., a broadband or 3G internet connection), and/or via a local computer and/or router which is then coupled to the Internet. Referring to FIG. 4, the high speed interface circuitry 408 and/or transmit receive circuitry 411 may be coupled to a network which may be further coupled to other networks. Again referring to FIG. 5*a*, the computers 2001, 2002 may include a local area home based network interface 2003, 2004. See FIGS. 27 and 28 for exemplary home based network interfaces (e.g., gateways). This interface may be coupled to a plurality of receiving devices via a suitable interface. For instance, the illustrative gateway device depicted in FIG. 28 may be capable of communicating with a large number of wireless devices (up to 120 in certain examples) in a weather station network system, at great distances designed to encompass the entire house and yard (e.g., up to 300 feet in certain embodiments). The gateway of FIG. 28 in this example may be connected to an Internet router via a LAN cable, and may receive electrical power via a supplied AC power adaptor. The gateway device depicted in FIG. 29 may have a power consumption of just over 1 watt and may be designed to conform to all governmental and other energy saving requirements of home and office equipment.

See, for example, FIGS. 22-26 and FIGS. 30-38 for examples of receiving devices. In the embodiments shown, 2003 represents a low power (e.g., 915 Mhz ISM band transceiver) and 2004 represents a transceiver/router pair. A receiver 300 may be included in a variety of devices. For example, the receiver may be included in devices such as a wall mount display and/or projection display and/or alarm clock unit 2005, a television 2013, a table top display monitor 2006, a handheld monitor and/or PDA device 2007, a personal navigation device, smart phone, and/or weather station device (together with web cam, temperature sensors, wind sensors, humidity sensors, pollen sensors, and/or other wired or wirelessly connected sensors) 2008, a smart appliance enabled device (e.g., refrigerator 2009), an answering machine 2010, a phone 2011, furnace, bathroom heater, lights, sprinkler, and/or a car interface device 2012. The interface circuitry 2003, 2004 and each of the receivers in devices in home network 2000 may include a router and/or be coupled to a home or hotspot router. Where the circuitry is coupled to a router wirelessly, it may be coupled using 802.11 a-g, n, and/or a lower power interface circuitry such as 915 Mhz ISM band transceiver. In either event, the receiver 300 may include an Ethernet controller.

The receiver 300 may be implemented in a standalone configuration and/or coupled to one or more other receivers 300. The receiver 300 may alternatively be configured as low cost display station with the minimum components for receiving and displaying information to a user. Alternatively, the receiver 300 may be a weather station, wall clock with and/or without localized information such as weather and/or traffic information, bedside alarms with localized information such as weather and/or traffic information, and/or temperature display with and/or without local wireless connected sensors.

An exemplary embodiment will now be described with reference to FIGS. 5*b*-5*e*. The user may configure the various weather display devices by use of a computer. The computer may be a local computer 2001, 2002, and/or a computer coupled through the Internet and coupled to the user's home. In exemplary embodiments, the devices all register with a centralized server such as www.LaCrossetechnology.com or www.YourOwnWeather.com or www.weatherdirect.com. In other embodiments, the user is able to remotely control and configured his devices by virtue of any web connection without a centralized server.

Where a centralized server is utilized, the user may be able to configure his local weather station to upload information to the local server for use by other members of the LaCrosse™ weather community.

Figure 5B:
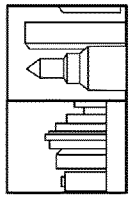
FIGS. 5b-5f illustrates exemplary user-interfaces for the receiver systems.

Referring to FIG. 5*b*, a user may control and control any of the devices coupled to a home network in any location to which the user has registered. For example, from a single location, the user may control, configure, and diagnose conditions at his home, vacation home, office, and/or other locations. For example, a user may log onto a centralized location and control the settings of any device including alarms, home automation systems, thermostats, and/or information display devices under his control. For example, each device may be assigned a different MAC or other identifying address. In the example shown in FIG. 5b, a different MAC address is assigned to each of the devices within the user's network 2000. It will be apparent that additional device MAC addresses may be available for networks in the user's vacation home, office, and/or other suitable location.

The interface screen shown in FIG. 5b is designed to provide a simplified interface for the user to configure each of his or her devices. For example, the user may select the display device on his refrigerator by highlighting the MAC address 100.2.2.100. The filters on the upper middle of FIG. 5b allow users to select related devices. For example, the user may select devices all from the same manufacturer, e.g., Weather-Channel™ devices. The user is then able to configure all of the settings at once for these devices. Alternatively, the user may select a single device and individually customize the interface parameters.

As shown on the right hand side of FIG. 5b, the user may configure the device to have a various display modes. In exemplary embodiments, the device may select any number of days from one to seven. The user may, for example, select a one day, three day, five day, or seven day weather forecast display mode. Similarly, the user may turn on and/or off the weather map display mode. The weather map such as a radar image may well be too much information for many users. Other users, will enjoy having this information on display. The image may either be static, and/or dynamic. Where a dynamic image is utilized, the image may be configured to show movement in the radar image over the last several hours to show movement of a storm system. The device may include a map display button on the display device. In this manner, normally the screen will show, for example, the three day or seven day weather forecast. If the forecast shows rain, the user may want further information. The display may alternatively include a hour-by-hour forecast button and a map display button. By depressing the map display button, for example, the display will reconfigure to show a dynamic image of the storm system movement relative to the user's currently entered zip code. Further depressing the display button may show webcam displays of zip codes "up wind" of the user's current position so that he/she can see an approaching weather pattern. Where the hour-by-hour display mode is selected, this mode may show the predicted weather on an hour by hour basis. This may be configured by the user to show an eight hour window after the current time, and/or a 12 or 24 hour window for the day.

The display device may alternatively be fitted with other buttons such as current traffic conditions along a pre-programmed route to the user's work. By depressing a "traffic button" the user may receive either visually and/or audibly customized traffic information. Alternatively this information may be automatically provided at some predetermined amount of time after the alarm sounds. For example, the alarm clock or other display device may be programmed to give the traffic data at a time certain (e.g., weekdays at 6:35 am) and/or 30 seconds after the alarm sounds. The traffic data may be pre-programmed by the user. For example, the user may enter his home zip code and his work zip code. The computer may then calculate or determine the most likely routes between the user's home and his office. The user may select the route he/she utilizes. The current traffic data is then obtained from an Internet source for roads along the route and reported to the user either visually and/or via synthesized voice. Suggestions may also be made as to the fastest route to take that day based on the reported traffic conditions.

The display device may also include an updated traffic alert that alerts the user only when an accident or other traffic condition has impeded the user's normal route such that an alternate route becomes more efficient. In this manner, the user is not provided with repetitive information every morning about traffic backups that happen every morning. The user may be presented with simplified traffic information such as an estimate of the travel time given current traffic conditions together with alerts in the event of an accident suggesting an alternate route. The map display mode also enables the display of an alternate selected route when the user's normal route is congested making an alternative route more viable.

Again referring to FIG. 5b, the display of outside temperature may be enabled or disabled. When it is enabled, the temperature may be derived from an outside sensor, from an Internet weather source, and/or from feedback from other users in the same zip code and/or zip plus four code with an outdoor weather sensor. The outdoor temperature may be the one detected by the user and/or an average of temperatures detected by all users in the same zip code. The display may further show a graphical representation of the weather parameters (e.g., temperature) over the entire day. The user may select where on the display the weather data such as inside and outside temperature is displayed.

Still referring to FIG. 5B, the furnace temperature settings may be displayed. Typically, a user would like to monitor the inside temperature, outside temperature, and furnaces settings. In this manner, the user and/or system under user programmable settings may be able to open the windows when the alarm system is turned off and the outside temperature is lower than the inside temperature and the AC is turned on. Similarly, if the outside temperature is above the inside temperature and the furnaces is turned on, then the system 2000 may be programmed to open the windows.

In still further embodiments, different members of the home may have different comfort settings of the furnace. When it is detected that one member of the household is home (e.g., the husband), the comfort setting in summer/winter may at a different level than when the another member of the household is home (e.g., the wife). The system may be programmed to determine who is home at any given moment in time by use of various techniques. For example, the system 2000 may monitor the garage door opener utilized to open the garage door. The system may also monitor the blue tooth code of the cell phone of the particular member that is home. Still further, the system 2000 may determine who is home by monitoring the alarm code entered to deactivate the alarm. In still further embodiments, the system 2000 may determine who is home by monitoring a signal emanating from a car in the garage. If no one is home, the home temperature settings are automatically set to a first level. If a first member is home (e.g., the husband), the home temperature settings are set to an optimal level of that member of the family. If a second member of the family is home (e.g., the wife) the settings are set to an optimal level of that member of the family. If both husband and wife are at home, the home heating settings are set at a compromise temperature determined to some predetermined method. For example, it may be an average of the husband and wife's settings, or some predetermined value upon which they both agree.

The temperature settings may be constant or vary with other outside influences. For example, when the humidity is very high inside the home, the home can feel hotter than it normally does. Hence, the cooling temperature may be programmed to be decreased so that the perceived temperature remains constant despite variations in humidity. Similarly, when the humidity is very low, the heat in the house may have to be increased so that the perceived temperature remains constant. While a centralized control and measurement of humidity may help alleviate these problems, often the humidity cannot be controlled to a sufficient degree to compensate for the differences in perceived temperature.

Other controls may be similarly customized to individualize them to particular members of the family. Again referring to FIG. 5b, the display of certain alerts such as tornado alerts may apply to all members of the family and may not be turned off without a security code. The display of other alerts such as thunderstorm warning may be customized so that they only display depending who is home at that time. Further, the display of other information such as tides may be shown for only some members of the household. Further, the devices which display certain alerts may be fully controlled via a centralized location within the home and/or via a centralized web page accessible anywhere the Internet is accessible.

Further, the tides may be displayed under user control. The tides may be measured using a tide measuring device which is mounted to the user's dock and lowered into the water. The tide measuring device may be configured to communicate with a central location as the other receivers discussed above. The measured tide level will override any predicted tide levels. The user can also monitor any variations between measured and predicted tide levels. For example, strong winds can have a tremendous impact on tide levels. Often winds and heavy rains can substantially impact tide levels, particularly in tidal rivers. Alerts may be e-mailed to users when the tides reach a certain level. Users in the same tidal system may also receive alerts when the average of the tidal gauges on the river or costal region show substantially increased tides. For example, if a user has indicated that he wishes to monitor the tides even though he/she does not have a tidal gauge, the user is nonetheless notified when the tide and/or river level exceeds a certain threshold.

Again referring to FIG. 5b, the furnace settings may be set in a centralized location, e.g., via the computers 2001, 2002, or through any internet connected computer or connected PDA/smart phone device. In the illustrated example, the temperature is set within certain time ranges. The pull down menu may be configured to provide more elaborate temperature controls as discussed above.

Again referring to FIG. 5b, alerts may be sent under user programmable control to any number of destinations. For example, alerts may be sent to a PDA, smart phone, work e-mail, home e-mail, SMS account, chat account, or using an IP connection and synthesized voice, a phone call may be placed directly to the destination when a critical alert is detected. For example, if a tornado is detected in the zip code, zip plus four code, and/or a neighboring zip code, an emergency alert is sent to every contact location. A potentially less critical alert, for example the tide being above some predetermined level, may be sent via only e-mail. The alert may be sent with, for example, an attachment such as a MPEG video taken by a webcam located at the site of the alert. For example, a high tide alert may send a still or web cam image of the dock and boat.

Again referring to FIG. 5b, the various devices configured for central control may be designated by various techniques. In the illustrated embodiment, the devices are controlled using an Internet Protocol (IP). In this manner, the interface may be customized such that different manufacturers may design to the protocol. For example, by using plug and play techniques, simply installing an new appliance (e.g., a furnace, an alarm clock, a new car, a new refrigerator, a new television, a new phone, the device connects with, for example, computers 2001, 2002, and/or with the user's router, determines the home to which they were installed, and registers with the users home automation control panel, e.g., www.myownweather.com or www.YourWeatherDirect.com. The goal of the unified interface for different appliances is to have a single unified standard to simplify interconnectivity for the user. Where the different consumer electronics suppliers standardize on a single interface (e.g., 802.11 a-g, n) and a single protocol, e.g., PCMIA plug and play like protocol, then the consumer experience is substantially enhanced. Further, one manufacturer can sell many additional products to the same family over time by staging the cost of the acquisition. For example, the children can purchase their parents an alarm clock one holiday, an outdoor sensor kit another holiday, a web cam for the grandchild's outdoor play area another holiday, etc.

Figure 21:
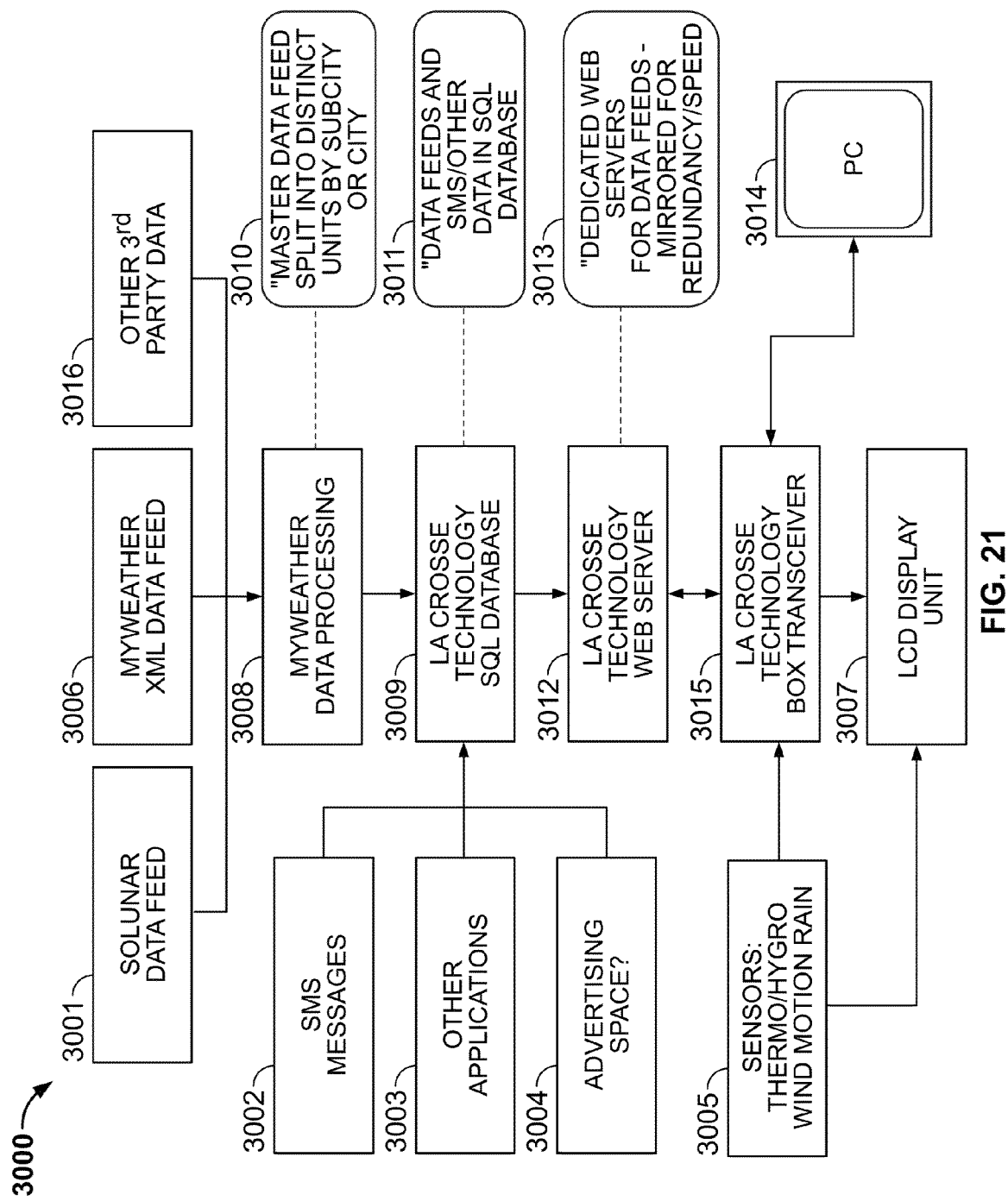
FIG. 21 is an exemplary flow diagram showing the data flow of the electronic device compatible with the YourWeatherDirect system.
Figure 22:
FIGS. 22-26 depict five different embodiments of weather station interface units in accordance with one or more aspects of the present invention.
Figure 23:
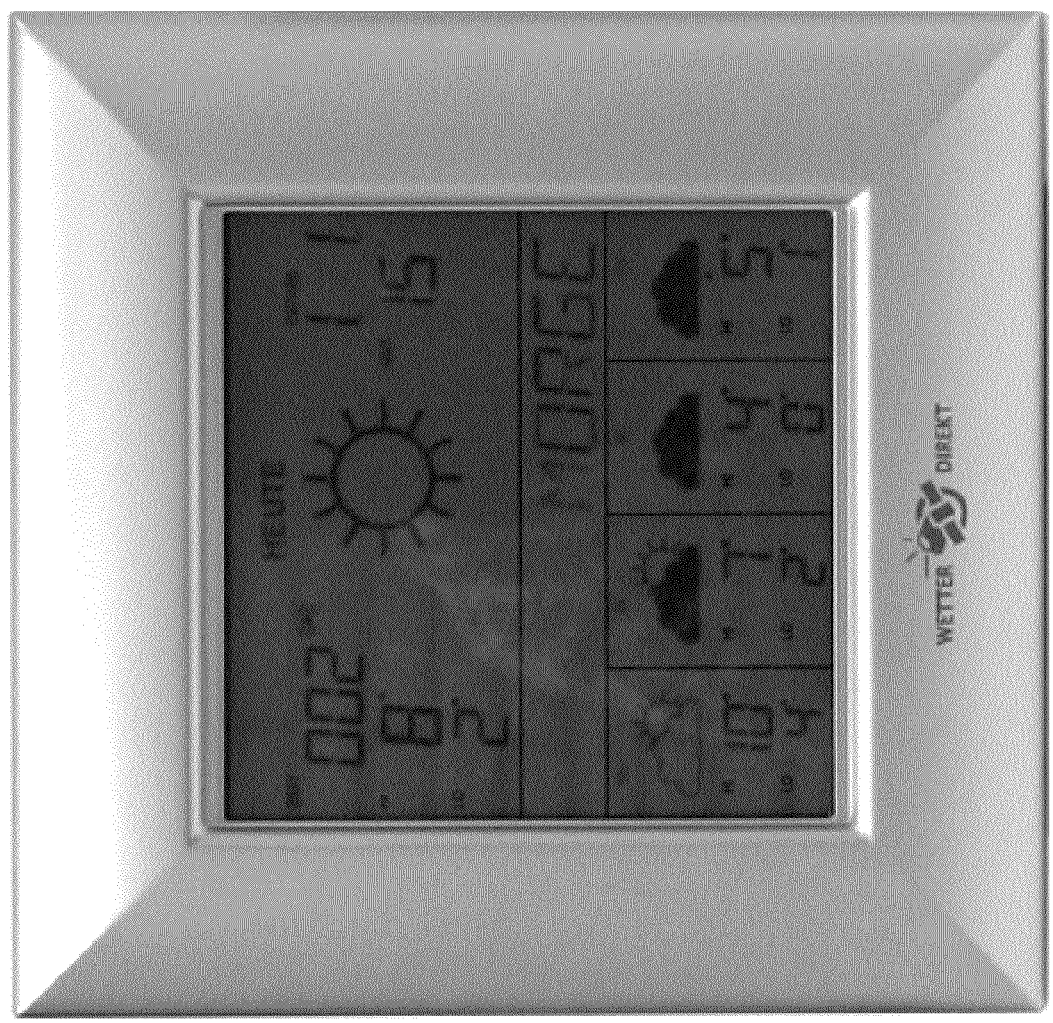
Figure 24:
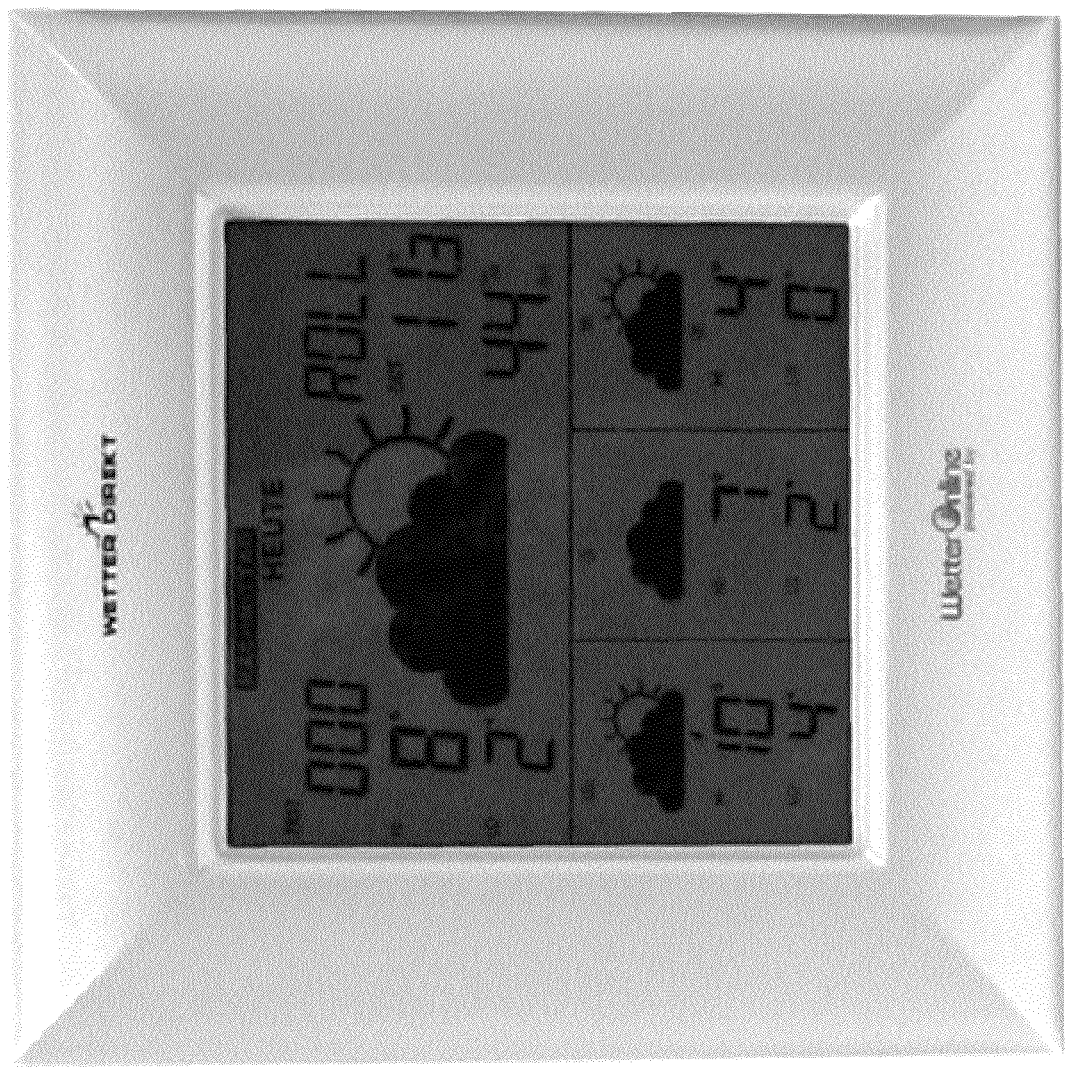
Figure 25:
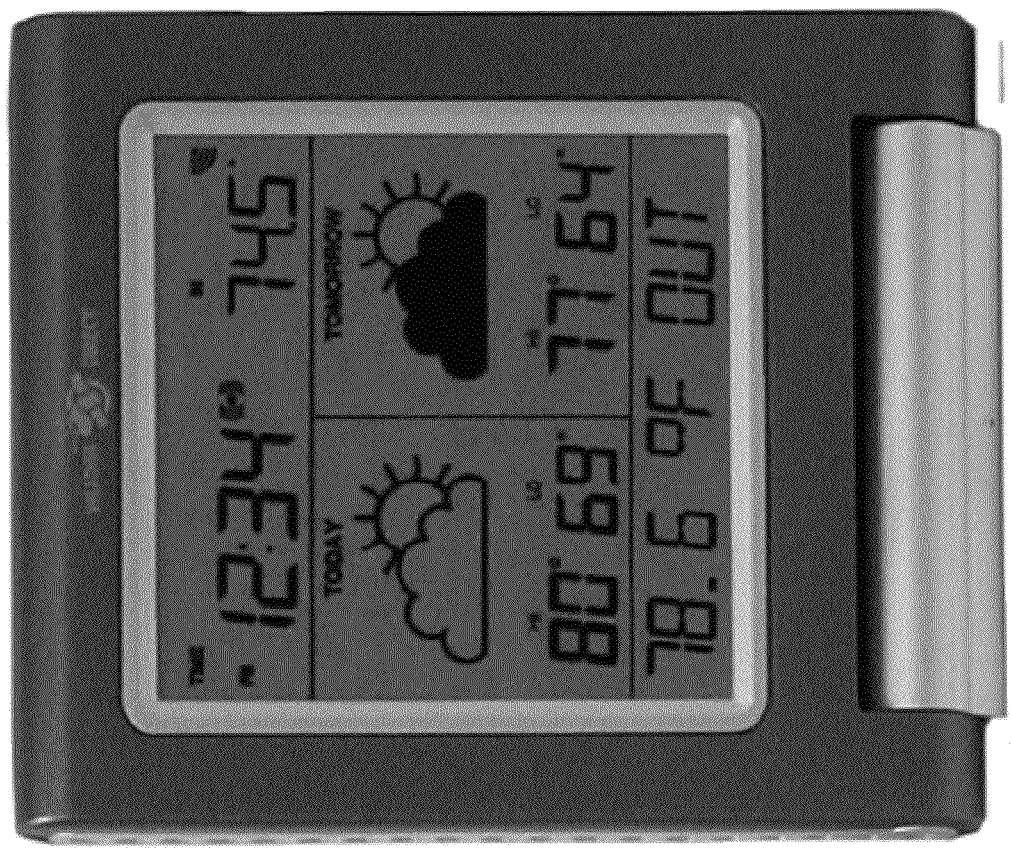
Figure 26:

For example, with reference to FIG. 21, data feeds may be collected from various sources such as solunar data feed 3001, YourWeatherDirect/MyOwnWeather XML data feed 3006, and/or $3^{rd}$ party Data Feeds 3016. The data from the various weather feeds, audio feeds (e.g., Internet Radio and/or Internet TV) are aggregated in a centralized and/or distributed server location e.g., MyWeather Data Processing 3008. A subprocess 3010 acts on the data from the various data feeds in accordance with predetermined parameters and/or user preferences to split the data into distinct units. These distinct units may be tailored to a particular city, subcity, zip code, and/or zip plus four code. Alternatively, these distinct units may be tailored for a particular end user according to, for example, the end user's preferences and/or data about the end user. For example, the user may select a preference setting that he/she prefers classic rock, likes boating, lives in a certain zip code, and drives a certain route to work each morning. The broadcast to the user's alarm clock, car radio, and/or wall clock would then be tailored to the user's preferences. For example, it might provide classic rock music as the user is waking up (e.g., 6:00 am), an audio feed of the weather at a particular time (e.g., 6:15 am when the user is getting dressed), followed by traffic on the user's chosen route (e.g., at 6:25 when the user is eating breakfast). These messages might be interspersed with advertisements about a subject of interest to the user e.g. boating and/or information of interest to the user e.g., tidal and/or wind information.

Still referring to FIG. 21, a database (e.g., LaCrosse Technology SQL Database) 3009 may be utilized to perform the selection, parsing, and assembly of data feeds to the user. These data feeds may take the form of SMS messages 3002, other application messages (e.g., clock radio, car radio, cell phone music/data files, i-pod music/data files, wall clock displays, alarm clock displays). For example, a custom feed may be arranged for the wall clock, alarm clock, shower clock, car radio that includes feeds for custom buttons. For example, the custom buttons "Traffic" and "Weather" may be offered. When the user selects these buttons, a customized "traffic" report or "weather" report may be played audibly and/or visually on the display for the user. Alternatively, the display may automatically be configured to display the information continuously or continuously at certain times of the day. For example, the display may display the weather information continuously, and then be switchable to display the traffic information with estimated travel times for each of the user's pre-programmed alternate routes. Thee data feeds may be output to a suitable output device in step 3011. Alternatively, the output data feeds may be output to one or more servers (e.g., LaCrosse Technology Web Server 3012.) Where a web server is utilized, the web server may make the data available over the Internet. In preferred embodiments, the data is encrypted prior to being provided to the user so that the user's privacy and security is maintained.

Again referring to FIG. 21, the user may employ a suitable technology transceiver box 3015 to receive and/or transmit data. In one exemplary embodiment, the transceiver box plugs into any local area network hub in the user's home and/or communicates via a WiMax, WiFi, and/or similar network. The device may then utilize a second protocol such as a battery friendly protocol to communicate the information to a wall mounted display device, e.g., LCD display unit 3007 and/or couple to a device coupled to a PC 3014.

The selection of an individual MAC address is an easy to implement technique for individually addressing various components within the user's network. Additionally, the user may utilize preexisting network operating system software (e.g., Windows Vista) to monitor the topography of the network and a description of each device currently connected to the network. Further, security may be enabled for devices in the network (e.g., WEP 128) so that only the user who has access to the wireless key may receive data from the devices. In further embodiments of the invention, a centralized server e.g., myownweather.com/www.YourWeatherDirect.com may be coupled to computers proximate to the user's home location by virtue of a Virtual Private Network (VPN). Thus, the user may view, control, and manipulate his receivers 300 by virtue of a web pages at a centralized server, which in turn are coupled via a VPN to his local computers and/or receivers 300 located, for example, at his home. This is particularly important where devices include web cams.

Figure 5C:
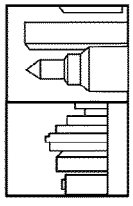

Referring to FIG. 5c, the devices may be individually addressed and configured from a centralized location, e.g., computers 2001, 2002, and/or an Internet portal. In FIG. 5c, the wall mounted weather display/clock located in the living room is currently being addressed in the example. The user may scroll down through each of the connected devices using the box on the left of FIG. 5c. When each device is detected by the system, it may be enable to download a driver which has configuration information for the particular device. Alternatively, the drivers for certain devices may be pre-stored on the receiver. Device drivers for other devices may be obtained from a centralized location, e.g., myownweather.com.

In the example shown in FIG. 5c, the setup and configuration data is downloaded from the device connected to the user's network 2000. In this example, the device may be configured for an outside temperature sensor, such as the temperature sensor apparatus depict in FIG. 29 for detecting and providing temperature data to the weather station device. For instance, the illustrative temperature sensor shown in FIG. 29 may be a mountable inside or outside and configured to communicate wirelessly with the weather station gateway device. In certain examples, a temperature sensor may have a wireless range of approximately 300 feet. The temperature sensor may also be battery powered, avoiding the need to position the sensor next to an electrical outlet. In addition to the temperature data, the sensor in FIG. 29 may also be configured to monitor and transmit humidity data. The sensor in this embodiment may include an extendable probe (e.g., 6 feet in length) that can detect and communicate an additional temperature and/or humidity reading, for example, from a swimming pool or spa, refrigerator, freezer, etc. Although the sensor in FIG. 29 may be configured to detect and transmit temperature and other data immediately (i.e., in real time), it may also be configured to store history data for a period time (e.g., days, weeks, or months) and transmit the stored data upon request, for example, as a spreadsheet file compatible with Microsoft EXCEL® and/or other third-party software applications.

To the extent another device in the network 2000 has an outside temperature sensor, this sensor data may be utilized (under user control) by any device in the network. The user may also enable this information to be used by other users in the myownweather.com community of users. The user may also enable various alerts such as tornado alerts, hurricane alerts, thunderstorm alerts, nuclear accident/attack alerts, etc. Further, the user may be able to customize the information displayed on the display device to include various items including tides, indoor temperature, camera control, furnaces settings, e-mail/SMS/Chat alerts, remote monitoring of sound, alerts based on internal temperatures being below a preset level (e.g., 50 degrees, 40 degrees, and/or 32 degrees), sensor displays, number of days of weather prediction displayed, alarm settings, streaming of music and/or video files from the Internet and/or a locally connected computer, and/or displaying various calendar events such as Outlook calendar settings and events.

These various settings may be under user input button control and/or voice activated control. For example, many people currently use two computers at work—one of which constantly displays their outlook calendar. The use of paper calendars is quickly disappearing because of the advent of being able to send outlook appointments to different individuals (e.g., the entire soccer team, or those engineers/attorneys working on the new development project). Because appointments automatically are placed on calendars and others can check you calendar for availability, paper calendars are fast disappearing. However, people are use to looking at the calendar on the refrigerator and/or on their office wall. This constant visual feedback reinforces the appointment and makes it more difficult to forget appointments. Currently, calendars are synchronized with PDA. However, these PDA's must be carried with the user and the default is not to show the calendar.

What is needed is a dedicated, low cost, thin, light weight display device that may be mounted on a refrigerator door, on an office wall, and/or on a cabinet door which constantly displays the user's calendar. For home applications, having the entries color coded for different members of the family provides an instant advantage of knowing both your own and other family members schedules at a glance. It also provides the constant feedback that is missing from other calendaring devices.

Figure 5D:
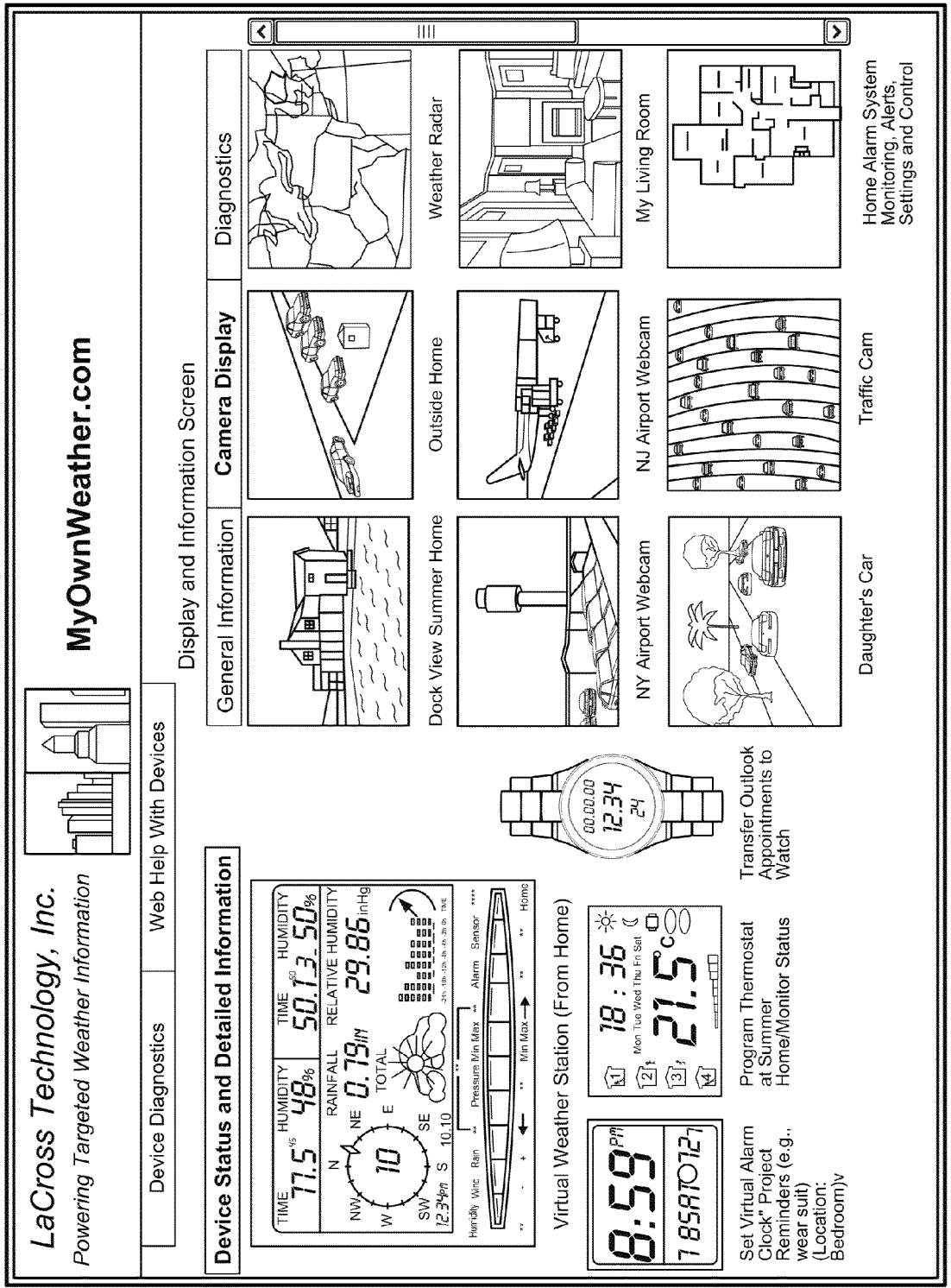

Referring to FIG. 5d, there is shown a further display of the system 2000. In this embodiment, the user may configure his information screen to monitor various data from his network 2000. For example, at a glance, the user may monitor a webcam and other data from his summer house such as inside/outside temperature, alarm status, furnace status, etc. The additional information may be variously configured to only appear once the picture is clicked on by the user, where the user hovers over the picture with his mouse, and/or overlaid over the location information supplied by the webcam. Similarly, the view from the user's dock may be displayed with tide, wind speed and direction, as well as outside temperature. Further thumbnails may be displayed including such webcams as the local airports (e.g., LaGuardia and Newark), traffic cams from the drive home, the user's living room, baby's room, and/or day care center, the alarm status of the home including a map of the various rooms and associated alarm status and diagnostics.

Still referring to FIG. 5d, the system 2000 may further be configured to download and/or upload information from various devices and include virtual images of the controls of those devices on a connected web page. For example, a user wishing to set his alarm clock to get up early for an important meeting, may do so from work. By accessing the web page, e.g., myownweather.com, the user is presented with a virtual image of the alarm clock sitting next to his/her bed. The user may click on various buttons and set the alarm for every day, and/or for only a certain day. The control command is then sent to the device using a suitable protocol, e.g., IP. The alarm clock then responds with a message (e.g., via e-mail, SMS, chat, or to the web page myownweather.com) confirming that it has received the new settings and will adjust its settings accordingly. The alarm clock may be further programmed to notify other users (e.g., the husband and wife) where the alarm clock serves the needs of more than one person. In this manner, the spouse is notified when the alarm clock is changed. For example, the alarm clock may have multiple alarms one controlled by each spouse. These alarms may be password protected so that one spouse cannot change the settings of the other spouse without having the password. Further, the alarms of children may not be turned off and/or altered without the pass word.

Other devices in the network 2000 may be variously controlled and/or supplied with data. For example, the changing of the alarm time may be synchronized with multiple devices. For example, setting an alarm on the home alarm clock and/or setting an appointment may simultaneously set the alarm in the user's watch, PDA, television, radio, i-pod, and car stereo system. The number of devices having the alarm may be user configurable and/or automatically set depending on the importance of the alarm. For example, certain devices may be set depending on the family member involved. Critical alarms may have more devices activated than non-critical alarms.

Further, the network 2000 may enable the control and monitoring of various connected devices using the computers 2001, 2002, and/or a network connected device (e.g., myownweather.com). In this embodiment, the user may control his thermostat by being presented with a virtual image of the thermostat connected at home. The user simply clicks on the buttons and programs the thermostat from work, his vacation home, or any remote location. The user may further query and obtain input from local devices such as his home weather station.

Figure 5E:
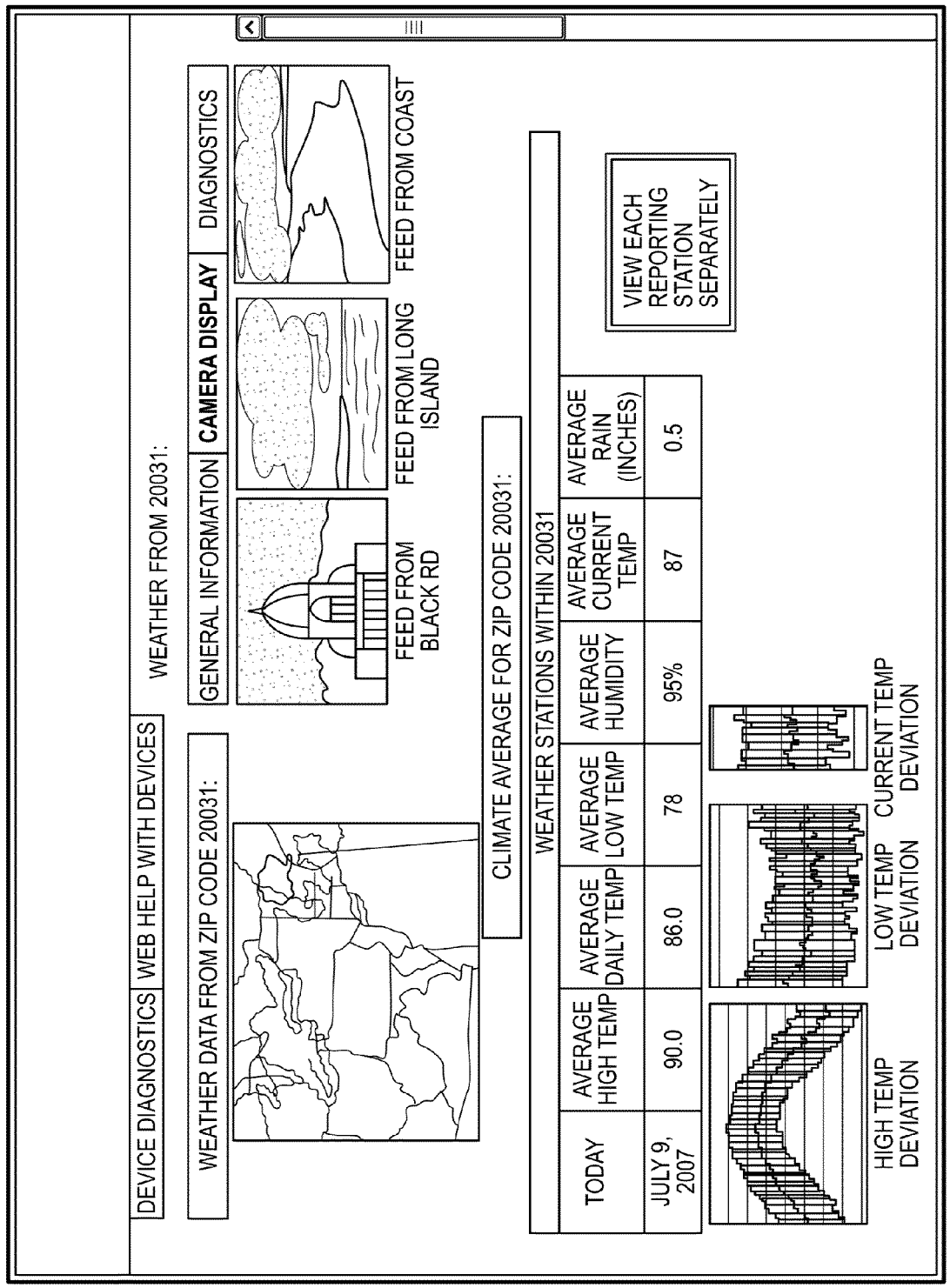

Referring to FIG. 5e, the user may utilize the collective information from many different reporting stations to aggregate weather information to provide better information to meet his needs. For example, a user may be traveling to another state to attend a sporting event or to take his children to play in a soccer game. The weather prediction in the paper says there is a chance of rain and the user desires to know the specific field conditions at the site he plans to play and/or attend an event. If the user knows the zip and/or zip plus four code for the location, the user can simply type that data into the myownweather.com page. The data from potentially thousands of users within that particular zip code is then aggregated, analyzed, and/or averaged to present a representation of the localized weather for the particular zip code. This information may be presented with or without prediction data from other commercial sources.

For example, the user may be shown potentially hundreds or even thousands of web cams of the outside of other user's homes. These webcams can quickly be scanned in thumbnail images to determine the general overall instantaneous climate for the zip code in question. Further, the average current temperature, high temperature, low temperatures, rain fall, humidity, and a radar overlay (with movement) may be displayed for the particular location. Where the address is entered by the user, the location closest to the particular address may be displayed as separated data from the aggregated data. The user may also be able to scroll through the separate data to view each element individually.

In an exemplary embodiment, a user may be provided with a web portal, such as, www.myownweather.com. This web portal may be configured to allow the user to set-up and register his network 2000. In this embodiment, the user may type in, for example, 10 digit serial number of his device. The webportal will then access the receiver 300 and activate the receiver. The user is notified of the activation by, for example, a report on the web page and/or an indicator on the device such as a display message or a flashing led. In one exemplary embodiment, the user only has to push a confirm button once, stopping the flashing of the led and indicating to the webportal, that his own box and not another box somewhere else has been registered. This process with clearly identify each individual box and avoid any wrong registration. The registration process will allow the user to register the device under the user's particular name and password.

A business method associated with aspects of the invention is to provide the user with certain free services. The user is given access to other services if he allows data from his box to be utilized by the web portal for other user's benefit. For example, only user's who allow their web cam to been seen by other users may receive free web cam viewing. The web portal has a moderator (possibly volunteers) to moderate webcams from various zip codes. Paid services may include customized weather forecasts, realtime satellite imagery, and other similar such data, e.g., pollen alerts for particular allergies.

With respect to pollen alerts, the user may register certain allergies, e.g, tree pollen. When the tree pollen count exceeds a certain level, the user is notified based on his zip code and/or other geographic indication.

The network 2000 may also serve as a base station for a home automation system. The various sensors in different rooms may be wired and/or wirelessly connected to the base station, e.g., computers 2001, 2002, and/or an Internet connected and/or 3G connected monitoring location(s). As discussed above, the device will measure and control various sensors such as window sensors/controls, door sensors/controls, temperature sensors/controls in different rooms e.g., by controlling various furnances/air conditioners, based on temperature, time, attendance and programming which may be local and/or remote via the webportal. In certain applications, the devices in the home have very little processing power (e.g., thin clients). In this manner, virtually all of the intelligence and software is shifted to the webserver which substantially reduces the cost of the in-home devices, reduces or eliminates the need for a central control panel, and allows for easy updates. Further, this configuration enables external access and control so that the user can log onto the webserver from any computer in the world.

Embodiments of the present invention are not limited to weather stations, but encompass additional information such as traffic information, headline news, and selective advertising such as "Craigslist" classified and E-bay auctions of certain classes of goods. For example, the living room display could display any e-bay auctions the user has actively monitored and/or initiated. This way users can see the highest bid anytime without switching on the computer.

The network 2000 facilitates the creation of a weather web community. All users with a wireless outdoor sensor can automatically transmit outdoor information like temperature, humidity, wind to each other. Averages are more accurate than any one reading. A centralized server can then average readings from various different stations and present this information to the weather community.

Currently, most web pages are advertiser supported. By providing content, companies such as Yahoo.com and others attract people to their site. Today, companies purchasing advertising on a site are paying as much as 0.15 cents per per unique user attracted to a particular web page. For example, if 100 unique users per month are attracted to a weather site web page, companies will pay $15 for the right to advertise on the site. It is not unusual for some sites to receive 10 million or more unique users each month.

The inventors of the present invention produce weather stations sold under the trade name "The Weather Channel™" and Lacrosse™. A business method in accordance with the present invention is to utilize weather station sales to attract users to "The Weather Channel™" web site and/or other web sites that supply weather information, e.g., www.Yahoo.com and collect advertising royalties for users so attracted.

By enabling purchasers of weather stations, alarm clocks, web cams, alarm systems, home automation systems, sprinklers, watches, furnaces, refrigerators, televisions, and other appliances to monitor, modify, diagnose, and control their devices from a centralized web site, users will be attracted to the site. This creates substantial advertising revenue opportunities at the site. Further, the site is anticipated to experience peak loads during times of severe weather. For example, where a natural disaster such as a hurricane, tornado, or volcanic eruption, many people have an insatiable appetite for news about the event. Typically, the coverage by traditional news outlets is hampered because reporters have trouble traveling to the impacted areas due to the mass exodus of refugees from the impacted areas. Consequently, there is often a dearth of news from traditional outlets.

However, the personal weather stations and associated weather web cams in accordance with the present invention will often be fully active, even during peak storm events. In embodiments of the invention, the centralized server may allow viewers to view web cams in the heart of the storm by simply clicking on the active storm area in the radar image of the storm. The position of the click on the radar image superimposed over a map will take the user to webcams located in a position under the place where the user has activated the cursor. For example, if a user clicks on the eye of a hurricane, he/she will be taken to the latest pictures of web cams located in that area.

In further embodiments of the invention, the web server will actively search all webcams from that area for those with the most activity. For example, by analyzing the MPEG encoded video stream from the web cam on a frame by frame basis, it is possible to determine the amount of storm activity by measuring the amount of data in the MPEG stream. Static pictures with little or no storm activity will have very little data in their MPEG stream because the picture does not change much frame to frame. However, in areas with substantial storm activity, the web cam image will change rapidly frame to frame. In this manner, the system may sort through thousands of webcams and automatically locate those with the most active storm areas.

Again referring to FIG. 5e, if the user clicks on the radar or satellite image of the storm in the upper left hand corner of the web page, the user will be shown images from the area of the storm organized for relevance to the user. This relevance may be based on proximity to the area code input by the user, proximity to the storm center as indicated by the user clicking on the storm, and/or some combination of criteria such as storm activity shown in the web cam and proximity.

In other embodiments of the invention, the user may type in the name of a storm. For example, in the United States, most storms are named storms. Individuals typically type in the name of the storm on a search engine to find out information about the storm or go to a weather information page such as "the weather channel.com" to gain additional information about the storm. In embodiments of the invention, the web page is provided with a link to information about the storm. For example, the link "Katrina" will take users to information about hurricane Katrina.

In alternate embodiments of the invention, the users may record voice overlays over their weather webcams using, for example, microphone button 314 as shown in FIG. 5. For example, a user watching the storm may make a contemporaneous audio record to accompany the video feed he/she is generating. For example, the user may be monitoring the view of his home from his dock (see the web feed in FIG. 5*d*). The user may record an audio overlay of the storm noises from the dock and/or dubbing an audio overlay from his/her 2001, 2002 (FIG. 5*a*). In this manner, each user with a wireless weather station in a storm region may become a roving reporter. The software at the centralized weather location, e.g., myownweather.com may be programmed to determine which weather web cam feeds contain audio and which further include audio overlays. Those with commentary may be promoted in priority order to be displayed first to those accessing the web page. In this manner, users wishing to view the storm information will be provided first with webcam feeds that are more likely to have information more captivating to the user.

In further embodiments of the invention, a storm chat room is provided on the weather site (e.g., a "Katrina Chat Room") for those caught in the storm. The chat room may provide both audio and video feeds from various individuals. People entering the chat room may view the weather web cam of individuals "riding out the storm" and communicate with them via chat communications. The individuals may hear the weather feed from the location and ask questions of the "reporters" from the weather community which are in the path of the storm.

Embodiments of the present invention will allow historical information to be cached about the storm. For example, each of the weather stations and associated computers in network 2000 will cache information about the storm in the event that they are not currently capable of streaming the information to the centralized weather server (e.g., the broadband internet connection is down). Once the web connection is reestablished, the web cam information that was cached will then be streamed to the centralize web server. The centralized web server will have the capability to accept and/or reject the cached weather data. In the case of a severe storm alert from an area, the web server will be programmed to accept the historical data and make this data available to users on the web page. By allowing the user to modify the time code of the satellite image and/or radar image of the storm, the user can see the storm path. For example, the user may want to view the intensity of the storm as it makes landfall. The user can manipulate the time code (e.g., by moving a time code slider bar back and forth and watching the storm move back and forth along the storm track). Once the weather feed is being displayed to the user, the user may also watch the weather feed in a fast forward mode. For example, by repeatedly pressing the fast forward button, the user may be able to watch the weather feeds at any one of several predetermined fast forward speeds. The audio will be sampled from the MPEG stream so that snippets of audio are presented periodically from the stream depending on the fast forward mode selected. In this way, the user is presented with intelligible audio despite the video being advanced in fast forward mode. An audio segment is played for a second or two before being advanced to another location in the MPEG stream where audio is again sampled and played to the user at normal speed.

Once the user has selected the location he/she wants to view, the user can click on the eye of the storm or anywhere along the eye and watch one or more cached webcams of the storm region. The cache may be at the centralized location, e.g., myownweather.com and/or in a distributed environment located at various weather monitoring stations around the country.

In the embodiment shown in FIG. 5e, the user may watch any number of web cams simultaneously. For example, the user may click a button causing the web cam thumb nail view to go full screen displaying 5, 10, 15, 20, 25, 30 or more simultaneous web cams of the storm region. The user can then click on an individual webcam to watch the event full screen.

In a further business method in accordance with the invention, the sign-up procedure for the wireless weather station with the weather page requires the user to release copyright rights in any pictures generated by the webcams to the central site, i.e., myownweather.com. The site may then sell the rights to the webcams to various news outlets and syndicate the rights to the most dramatic footage to news organizations and/or to organizations such as myspace.com, Youtube.com, and/or facebook.com on a revenue sharing basis.

Users along coastal regions may be given an added bonus and/or incentive to install a dock mounted web cam capable of capturing the ferocity of the storm. These incentives may come as coupons or special offers in tidal measuring and/or monitoring devices. The use of these web cams will often add dramatic footage to the archives of the weather site and thus increase viewers to the site and the duration of stays at the site. This will increase the revenue generated by the site.

Again referring to FIG. 1a, in still further aspects of the invention, the receiver unit 300 may be programmed to detect that it is located within a particular cell in the pager/WiMax/802.x network by virtue of a pilot signal or header code coded transmitted to each cell in the pager/WiMax/802.x network. For web connected receivers, the receiver may determine the likely location of the receiver using DNS lookup techniques. Using techniques such as described above, the receiver 300 may automatically pre-configure itself for the most populous area within that network. For example, if the cell/network is located near a city such as New York, the weather data would be automatically pre-configured for New York. Alternatively, if the receiver 300 is powered up in Washington D.C., the receiver 300 would automatically pre-configure itself for Washington D.C. weather. The pre-configuration enables the weather station to provide useful and relevant information straight out of the box with no setup required by the user.

Similarly, even if the user is located in an area outside of New York City, but still within the same cell as New York city, the receiver 300 would still configure pre-configure itself for New York City because that is the most populous area located within the particular cell where the receiver is powered up and/or reset. A user may thereafter, more specifically locate and configure the receiver 300 by simply inputting a zip code, zip plus four code, or other geographic specific location. In the event were the pager/WiMax/802.x is able to receive information from multiple different cells, the pager/WiMax/802.x will use that information from the different cells to more specifically locate itself. For example, if the receiver 300 is receiving information from both Washington, D.C. cell and Baltimore cell and Philadelphia cell, the receiver 300 would know that its' location is proximate to a mid point between those three cells and actually more finely tune the weather data for that location.

The system 2000 alternatively also includes a time code. For example, by locating the receiver system 300 by virtue of the auto detection mode and/or the manual input of geographic information mode, the receiver may pre-store and/or download time code information. The time code information may be utilized in conjunction with a time code in the transmitted weather data. The receiver 300 would then know to power up and begin analyzing data at a particular time offset interval from a time code transmitted by the system 2000. The use of time coded information provides substantial savings in terms of power consumption and battery life for the receiver 300. The receiver 300 is also capable of re-synchronize no matter where in the country or world the receiver is located. For example, as the receiver moves to a different cell in the network or accesses a different DNS hotspot, the receiver will resynchronize the weather data to the new geographic location and select a different time code.

If the receiver is normally based in one time code, it may be programmed to remember this location and associated weather information as well as location and weather information for a temporary travel destination. Thus, if a user spends 80% of his time in one location and then intermittently travels to different destinations, the receiver will remember his/her home destination as well as the weather information for frequent travel destinations. These destinations may be hard coded by the user and/or adaptively added by the receiver 300 on a learned artificial intelligence basis in accordance with the user's travel.

This is of enormous advantage in certain applications, for example, for mobile weather stations. As a business person or other traveler, traveling from city to city, the business person wants the weather station to power up, synchronize to the local weather at whatever city the person has traveled to and provide instantaneous weather based on the person's current city location. In the event the mobile weather station also serves as an alarm clock, the device may provide local weather in conjunction with the alarm function as discussed above. The weather may be received from the network 2000, e.g., a wireless hotspot and/or a 3G connected weather source. The receiver 300 may also be synchronized to the local time and/or have a multi-time display when away from the user's base location. The system may also be pre-programmed to determine the proper location from the time code to begin searching for weather data and thus conserve substantial battery power. For example, if a user travels from Washington D.C. to Philadelphia, the receiver would then locate the data from the communication system, realize that it was on a pager/WiMax/802.x cell located in Philadelphia based on data information sent to that receiver and reconfigure the system's associated time code. Thus, the receiver re-synchronizes to the Philadelphia location. A reset button 316 may be provided on the receiver 300 such that as the receiver 300 is moved from one area to another, a user may simply push an "acquire new location" button and the device will resynchronize to the new location. Alternatively, as discussed above, the device may automatically detect its new location and resynchronize automatically.

In still further embodiments, the receiver system 300 may turn on automatically at a certain preset time for example, at 3 a.m. in the morning, and look for geographic synchronization information. Alternatively, as the receiver enters new hotspot location, it may resynchronize. For example, if the receiver receives the new location code from a pager/WiMax/802.x cell, the receiver may detect that it has moved to a different location. In response, the receiver re-synchronizes, downloads new weather data, and provides the new weather data to the end user.

Aspects of the invention are not dependent on a particular number of zip codes and/or zip plus four codes. For example, it is specifically contemplated that the number of zip codes and/or zip plus four codes within any particular cell will increase and/or change over time. For example, when the United States Patent and Trademark moved from Arlington to Alexandria Va., the zip code for the office stayed the same. Thus, the geographic weather information associated with the zip code changes despite the zip code remaining the same. In aspects of the invention, the device adapts to the zip code changes by virtue of a centralized overlay map which overlays weather data to current zip code and zip plus four code information. Further, it accepts data from various weather stations and inputs that data into a centralized Aspects of the invention include an adaptable database which adapts to changes in the geographic correspondence of zip codes to physical addresses and to increases in the number of zip codes and zip plus four codes. Further, the specificity of the weather data is specifically intended to increase over time. It is known that the precise weather predictions for various areas in the country will increase in specificity as additional weather monitoring stations are provided. This is particularly true for rural regions of the country where current weather monitoring stations are not as dense as in more populated areas. As this happens, the system 2000 will add additional specificity to the data and zip codes being sent, such that the user can then select further zip codes and/or zip plus four codes which are downloaded from the centralize server location, e.g., myownweather.com.

In exemplary embodiments, the receiver 300 may be configured to weather data associated with the zip codes and/or zip plus four codes that are available from a particular cell, aggregate them in its memory and provide the user with a choice of selecting one of the zip codes using for example, a simplified user-interface. For example, in one embodiment, the user is not required to utilize a numeric keyboard input. In this exemplary embodiment, the user may input his geographic location information using a simple thumbwheel 325 or other up-down button 321. Simplifying the interface on the weather device substantially reduces the cost and complexity of the device, making mass production practical. For example, the user-interface may simply be a selection button coupled with an up-down arrow and/or a puss button thumb wheel switch. This interface is all that is required to guide the user through weather station setup routine including entering zip codes/zip plus four codes. For example, the user may select from a menu of zip codes for a particular cell which may themselves be broken down into a few geographic regions: e.g., Queens, Staten Island, Manhattan, Long Island, etc. Once the user selects the particular geographic region, he/she may further select a particular zip code. Once the user selects a particular zip code, he/she may further be queried to select a particular zip plus four code. The particular cell may be associated with a geographic map. In embodiments having a graphic screen, the user may be provided with a map corresponding to the cell site as an alternative to the zip code entry screen. The user may alternatively be able to select a region on the map as opposed to a zip code. The map may be at a higher zoom level initially and allow the user to reposition and zoom the map to lower levels of detail until he/she has reached a sufficient level of resolution to correspond to the resolution available for the local weather data. For example, in some locations in Montana or Wyoming, the weather data available may not require the input of zip plus four codes. While in other more populous areas, the weather data available may be very detailed to the level of zip plus four codes and even to a street level of detail.

In still further embodiments of the invention, the user may select multiple zip codes of interest to the user. For example, a user who lived 40 miles from the user's place of employment may select from a display on the screen 332 or 335, the user's home zip code location and the zip code location of where the user travels frequently. The user may also select for example, an area within an extremely large zip code. For example, specialized weather data may be sent for various portions of the country where the zip code covers a very large geographic region. In this way, the user can select sub areas east, west, north and south for zip codes areas that are expansive. Where the user does not know his zip plus four code, an overlay map may allow the user to select the location within the larger zip code where he lives. Alternatively, the receiver 300 may include either locally and/or available through the network 2000, a reverse lookup of the users address to his/her zip plus four code.

In an alternative embodiment, a user-interface allows a user to select a particular symbol such as the first letter of the state using a thumbwheel selection switch 327. For example, the user may dial through from A to Z and for example select the letter W. Next in the selection process the user may then scroll through the various selections and select the letter A and thereafter the user terminal would display all the cities in the state of Washington. Similarly, if the letter D was selected the user would be prompted with a subset of selections for either D.C. or D for Delaware. In this manner, a rapid selection of both the state and then subsets within the state is made. For example, the selection of Delaware would provide various sub selections of particular areas within Delaware and/or zip codes within Delaware allowing the user through a simple thumbwheel switch or other simplified user-interface to efficiently provide the specific geographic locations in order to facilitate selection and setup of the weather station device.

Figure 5F:
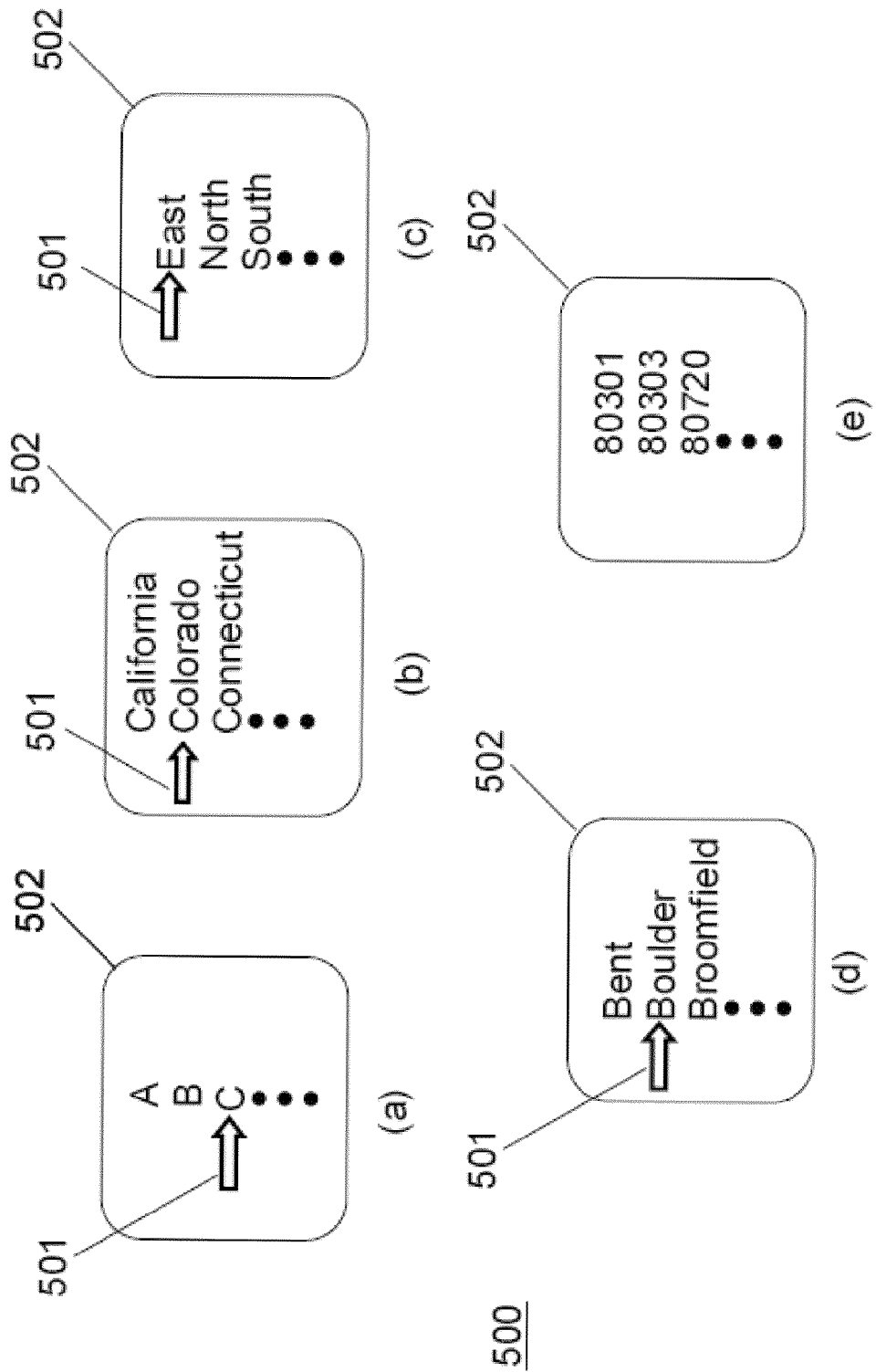

An exemplary illustration of FIG. 5*f* shows an interface displaying letters A through Z, representing the first letters of all the states. If the letter C is selected in FIG. 5*f* (a) as indicated by the arrow 501, the user-interface 502 is prompted in FIG. 5*f* (b) to select one of California, Colorado, and Connecticut. Upon selecting the state, for example the state of Colorado as indicated by the arrow 501 in FIG. 5*f*(b), the user is prompted in FIG. 5*f* (c) to select a cardinal region for example, East, West, South, and North within the selected state of Colorado. In response to selecting the cardinal region, the user displays the towns/cities/counties within the cardinal region in FIG. 5*f*(d) and prompts the user to make a selection. Upon making a selection for example, Boulder as indicated in FIG. 5*f*(d), the receiver 300 determines if there are multiple zip codes for the selected town/city/county; if not, the user displays available data. However, if there are multiple zip codes for the selected town/city/county, the receiver 300 displays all the zip codes as shown in FIG. 5*f* (e) for Boulder selected in FIG. 5*f*(d), and prompts the user to make a selection. Where there are zip plus four codes, the receiver 300 may alternatively be programmed to show zip plus four codes for the selected zip code. In response to making a selection the receiver 300 displays the corresponding alert data, weather data, or other useful data information.

Figure 6:
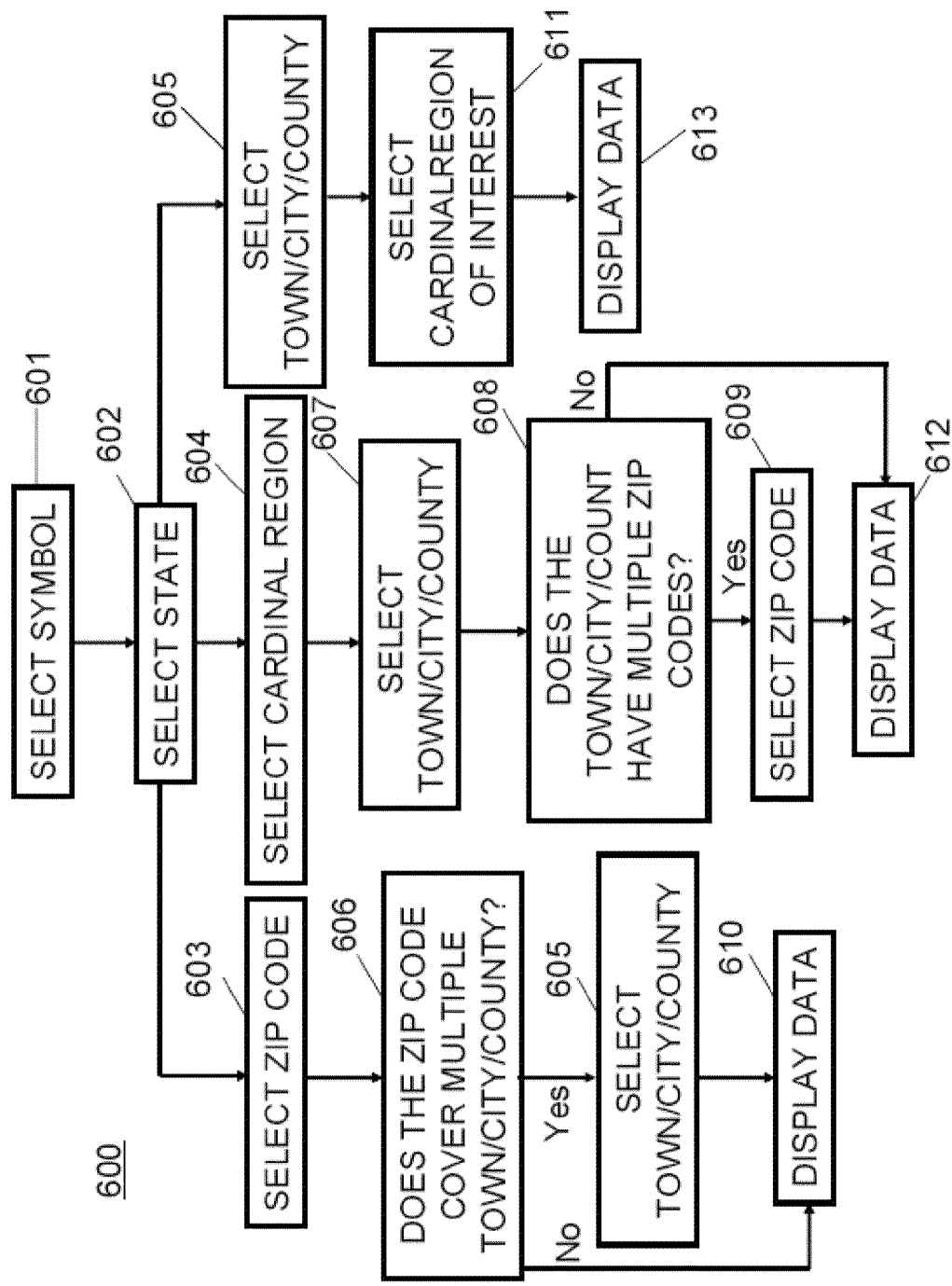
FIG. 6 illustrates an exemplary flowchart for making a selection of geographic location of interest to a user on a user-interface.

In a further exemplary embodiment, a flowchart of FIG. 6 shows the process of prompting a user for selection of location of interest for data reception. In step 601 the user is prompted to select a letter corresponding to the first letter of the state of interest. Upon selecting a letter, all the states beginning with the selected letter are presented on the user-interface and the user is prompted in step 602 to select a state of interest to the user. After a state is selected the interface displays for example, three options, including zip code, cardinal region, and town/city/county for user-selection. Alternatively, instead of displaying the three options of zip code, cardinal region, or town/city/county for user-selection after the user selects a state, the user is prompted for one of, zip code in step 603, cardinal region in step 604, and town/city/county in step 605, depending on the receiver-setup, either by the user or the manufacturer. If for example, the receiver may be setup such that after selecting the state of interest in step 602, the user is prompted in step 604 to select a cardinal region for example, East, West, South, and North, within the selected state. In response to selecting a cardinal region, the town/cities/counties corresponding to the selected cardinal region are displayed, prompting user in step 607 to make a selection. Upon making a selection, the receiver determines in step 608 whether there are multiple zip codes for the selection made; if the answer is no, the receiver displays the data for the town/city/county. On the other hand, if the answer is yes, the receiver displays a list of zip codes in step 609 for the selected town/city/county, and in response to making a selection by the user, the receiver displays the data corresponding to the selected zip code. A similar procedure is followed for zip plus four codes. Note that the receiver could optionally display data at any of the steps, for example, after selecting the state in step 602 the receiver could choose to display data for the state, which may be for example, an average data for the state. Similarly, upon making a selection in step 604 the receiver may display for example, the average data for the cardinal region selected. The displayed data may be an alert data, a weather data, or other data information.

Figure 7:
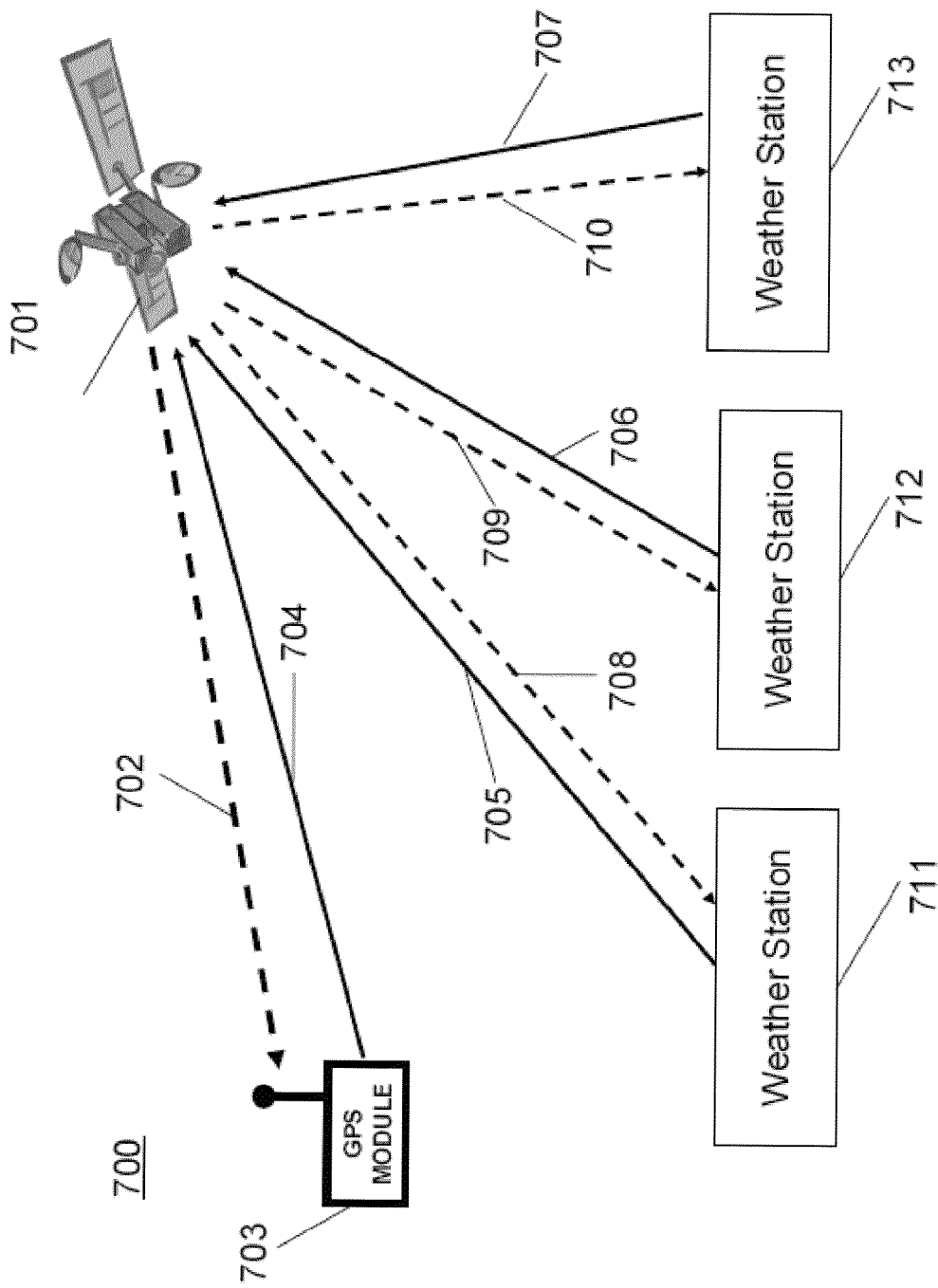
FIG. 7 shows an exemplary GPS system comprising a GPS module and satellite, pulling weather data from weather stations to be transmitted via the satellite and received by the GPS module.

In addition to the current system, a GPS module 703 shown in FIG. 7 may be included in the receiver 300. The GPS receiver may be permanently and/or detachably mounted to the receiver 300. Where the weather station 300 includes a GPS module, the device will automatically extract weather data based on the coordinates of the GPS system. These coordinates may come from the GPS module 703 or may be input by the user manually. In the embodiment where they are derived from the GPS module 703, the receiver 300 may translate the GPS coordinates to zip codes and/or zip plus four codes to extract the correct weather related data. Alternatively, the weather data may be sent coded for GPS coordinates and the zip codes entered by the user may be translated to select the corresponding GPS coordinates. In other embodiments of the present invention, the GPS module 703 may be located in a hand held unit by the user and/or in an external unit which is connected either wired or wirelessly to the weather station or weather receiver.

In still further embodiments of the present invention, weather data may be transmitted from a satellite 701 to the receiver 300. The receiver 300 may use the same antenna as the GPS unit and/or alternatively may use another antenna such as a satellite radio antenna. Where weather data is transmitted using a data feed of a satellite radio, it is preferred that the weather data be encoded with geographic data such as zip code and/or zip plus four code as discussed above. In embodiments where the GPS antenna or satellite antenna is utilized, the antenna may be utilized in a similar fashion as is currently employed for transmission of conventional data. In this manner, weather data may be provided to any location in the world by virtue of an up link to a satellite, down link to through the GPS/satellite radio interface. Similarly, customized weather data may be provided via DVB broadcast to local receivers. The local receivers may input zip codes and/or zip plus four codes and utilize these codes to filter incoming weather data. Accordingly, satellite receivers may contain one or more virtual channels depicting current weather conditions for any number of user selectable zip codes based on set-up data entered by the user at the time the satellite system is configured and/or installed in the user's home.

Satellite antenna systems may provide an extremely low cost universal weather receiver that can be carried by the user to any country in the world and throughout the United States. The receiver may be combined with one or more antennas. For example, in the embodiment shown in FIG. 4, multiple antennas are shown. The receiver may obtain its local zip code and/or zip plus four code directly from a hot spot antenna and/or a cellular antenna. The weather data information may in contrast be downloaded via satellite using a different antenna.

Referring to FIG. 7, the GPS module 703 may be configured to receive weather data from a plurality of weather stations 712-713 via satellite 701. The weather data may be received over a conventional GPS antenna and/or through a low cost satellite radio antenna. For example, satellite radio companies currently lease and/or sell data distribution rights for transmission over their systems. The GPS antenna may be utilized to provide the general geographic region that the receiver is currently located and the satellite radio antenna may be utilized to provide a virtual radio channel having satellite radio weather. For example, users frequently want to turn to the radio broadcast to hear local weather related information. For satellite radio, the user is disadvantaged because the stations are typically nation wide. By having the user either input geographic information (e.g., a zip code and/or zip plus four code) and/or automatically detecting the location of the satellite radio receiver, the satellite radio receiver may then filter the weather broadcast information based on the user's current location. In this manner, the user may receive very geographically targeted weather forecasts and/or traffic forecasts based on the current location of his satellite radio receiver (e.g., his car). This provides substantial additional value added services to satellite receiver radios that are not currently available.

In addition to using header information in data transmission, a further power saving mode of the weather receiver 300 is the utilization of a particular interrupt cycle keyed by a preamble in the data transmission. For example, every ten minutes the receiver 300 is programmed to turn on and monitor the incoming signal for a particular flag in the received data. The flag may be variously configured. In one exemplary embodiment, the flag would indicate whether there is a particular weather emergency alert for that area of interest to the user. Such weather emergency alert would provide a time code where the receiver 300 may turn on and receive the weather alert data. Thus, for example, there would be allocated in the spectrum of the received data a particular bandwidth for the weather emergency alert data that would occur for example, every ten minutes. Conventional weather data may only be updated, for example, ever five or ten hours. On the other hand, alert level weather data (severe storm warnings) may be updated much more frequently, e.g., every 10 minutes. The flags for weather alerts may be inserted into the data carousel at a higher repetition rate, and therefore received by the weather receiver on a much more frequent basis for example, every ten minutes.

The weather receiving devices 300 may for example, be variously configured and include cell phones, GPS receivers, alarm clocks, clock radios, wall clocks, PDAs (personal digital assistants), walkmans, iPods and other similar such devices. The receiving devices 300 may be integrated into digital cameras and Dictaphones, cars, airplane seats.

With respect to the IPod, weather data may be received using a suitable signal (e.g., FM subcarrier, AM subcarrier, pager/WiMax/802.x network) and played as a separate file accessible through the iPods user interface. For example, a user who provided an add-on to the iPod such as AM or FM receiver or digital radio receiver or other similar device, would also receive data as to the specific weather of the user's location. In alternative embodiments, whenever the iPod or iPhone enters an Internet hotspot, the weather information in the receiver 300 is updated. Thereafter, the user may use the user interface to select "weather" and hear a synthesized audio playback of the weather prediction for the user's selected zip code.

In further embodiments of the invention, iTunes may be provided with access to the myownweather.com interface. In this manner, iTunes has constant weather updates to the user's computer. Each time that the user plug his iPod into his local computer, the local weather data is automatically updated on his music player. In some embodiments, the iPod is coupled to a blue tooth interface. Each time that the iPod comes in range of a computer running iTunes and a blue tooth interface, the iPod is updated with the latest traffic and weather information. In preferred embodiments, this is accomplished each time the user returns to his home and/or apartment at night. The iPod then includes a user interface that allows the user to select traffic and weather to be played via synthesized voice on his/her iPod each morning.

The amount of data to be downloaded daily may be substantially reduced by encoding the data. For example, the daily, three day, five day, or weekly high temperature, low temperature, precipitation forecast, etc., may be downloaded as compressed data points. In these embodiments, the speech synthesis for presenting these weather related data points to the user is stored in the receiver 300, e.g., an audio device such as the iPod. The data points are then selected at the appropriate point in the "weather broadcast" stored in the receiver 300. For example, the text "Today's high temperature will be XXX" is stored in the audio files of the receiver 300. If the user has enable the device to provide the daily high temperature, the device would play the audio file for the days high temperature, retrieve the days high temperature from storage, and insert it at the proper location. Thus, the amount of data actually required to be received by the receiver 300 is substantially reduced. This makes the device capable of using long wave receivers which have limited data broadcast capabilities. For example, using the synthesized voice, compressed data, and time coded transmissions, temperature data for the entire nation may be provided by a WWVB transmitter.

For example, temperature bands have typical configurations across the nation. By encoding the general location of these temperature bands on a given day, very little information need to be transmitted to provide the daily high and low temperatures for the entire nation. In this manner, having a receiver which can translate a pre-programmed zip code and/or zip plus four code to access compressed temperature band data transmitted via WWVB, enables a low cost transceiver to provide temperature data for the entire United States (or other country with a large geographic region).

Figure 8:
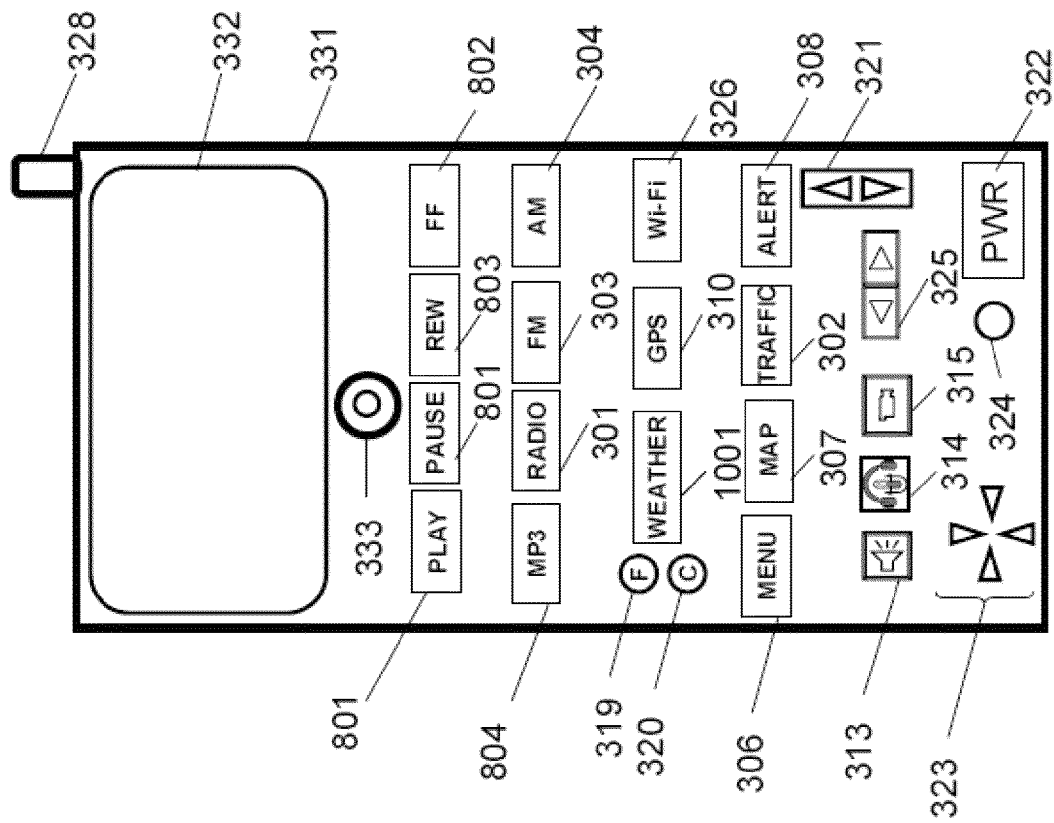
FIG. 8 shows an exemplary illustration of an iPod system equipped with a receiver.

In one exemplary embodiment, the receiver 300 is configured as shown in FIG. 8. In this figure, the receiver 300 will be referenced using the reference numeral 800 to depict the specific embodiment of the receiver in FIG. 8. The receiver 800 may receive data such as weather data, and/or traffic data based on the particular cell for which the receiver is currently located and/or based on the GPS information generated by a GPS module in the receiver and/or a combination of GPS information and weather data available from the cell. The receiver 800 enables the user to select a particular channel in which the audio file is to be played to the user to present the current weather for that day as well any traffic alerts for the location of the user.

Figure 9:
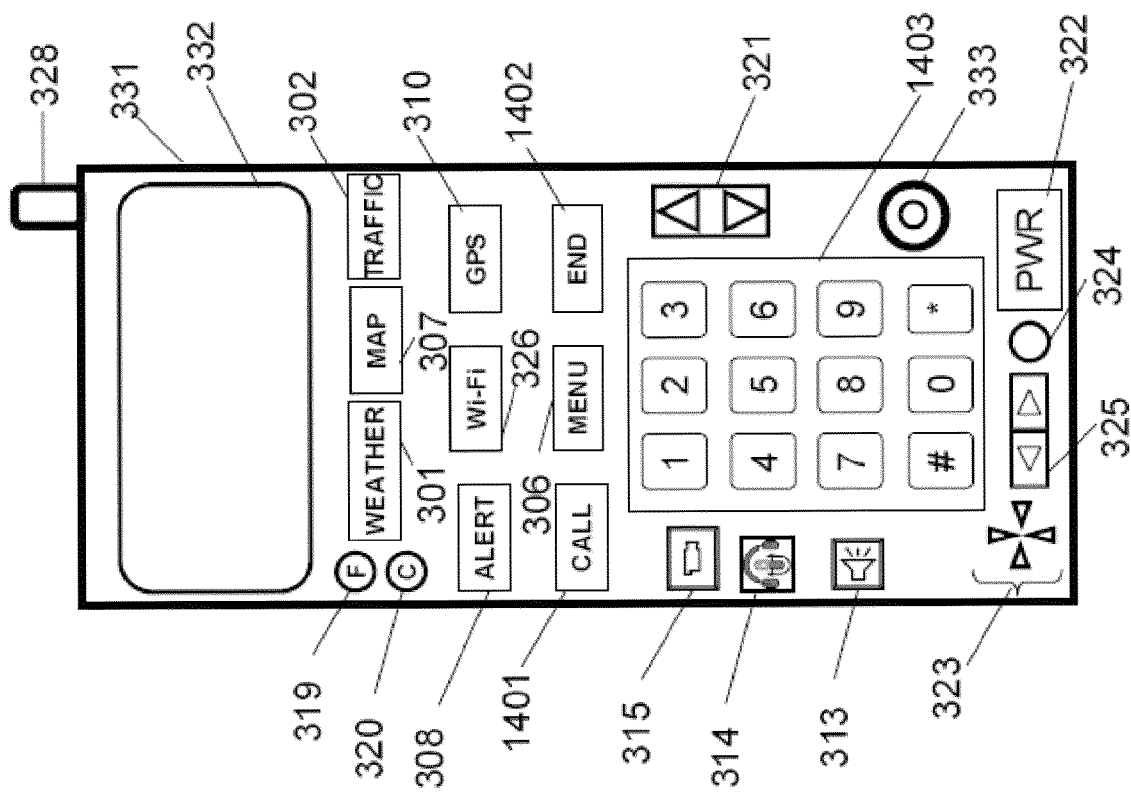
FIG. 9 shows an exemplary illustration of an cell phone equipped with a receiver.
Figure 10:
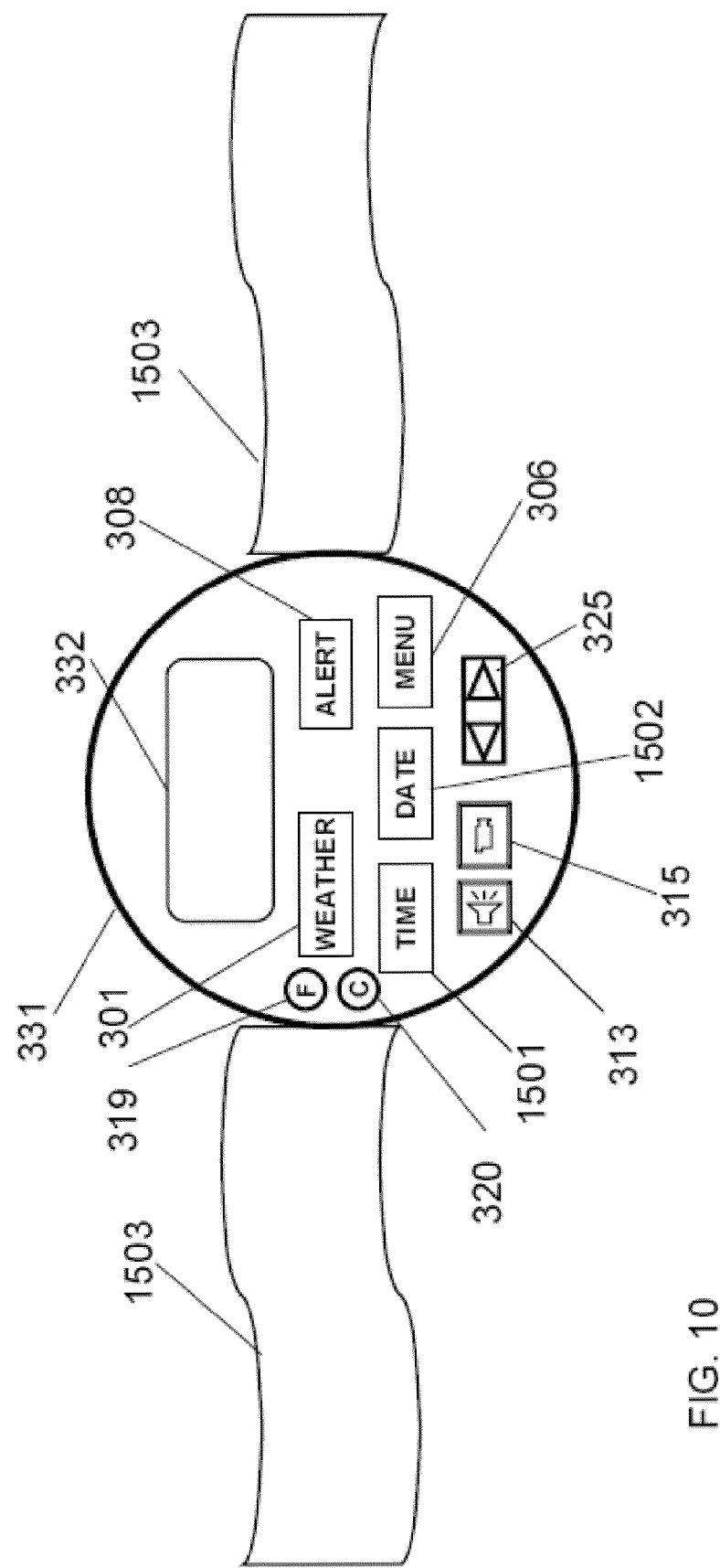
FIG. 10 shows an exemplary illustration of a watch equipped with a receiver.

In a further embodiment, the user may select other locations for example, the user's home location and the user's work location. A further exemplary illustration of a device equipped with a receiver is shown for the cell phone 900 and the watch 1000 in FIGS. 9 and 10, respectively. In a further embodiment, the invention may be utilized in a laptop computer in addition to the aforementioned devices.

In the watch embodiment, the watch may be equipped with a blue tooth or similar interface. When the watch and/or cell phone is placed on the night stand, the alarm clock receiver 300 may download the local weather and traffic information to the watch and/or cell phone. This data would be updated each time that the watch or cell phone is proximate to the alarm clock. The alarm clock, watch, and/or cell phone may be sold as a kit with the ability to forward information from, for example, the alarm clock to other proximate devices. The alarm clock may alternatively be fitted with a docking station and/or an 802.11 interface to wirelessly connect to the Internet.

In still further embodiments, when a receiver 300 is located in a mobile environment, e.g., when traveling down a road and/or in a train, the transceiver comes in contact with different cell towers. The receiver detects when it has left its home area and displays alternate weather displays. In one exemplary embodiment, it selects a weather display most appropriate for its current position. For example, if it has just entered a new cell location, it selects the weather for the area between its home location and the new cell location. In other embodiments, it may select an average weather for the entire cell location. The display, e.g., display 332 on receiver 300 may show the home location weather together with current position weather.

In addition to cell towers discussed above, a similar display may also be available by downloading data from available towers, such as pager/WiMax/802.x towers, cell phone towers, AM, FM, HD Radio stations, broadcasting virtual channels of weather data for that particular cell location. For example, a radio may include a button to display a virtual weather channel. This virtual weather channel may have an audio component, a video component, or both. It may be advertising supported. For example, the video component by include a symbol that says "Brought to you by Shell™" or some other company that pays for the advertising. Further, where an audio virtual channel is utilized, the audio may end with a sponsorship message.

Figure 11:
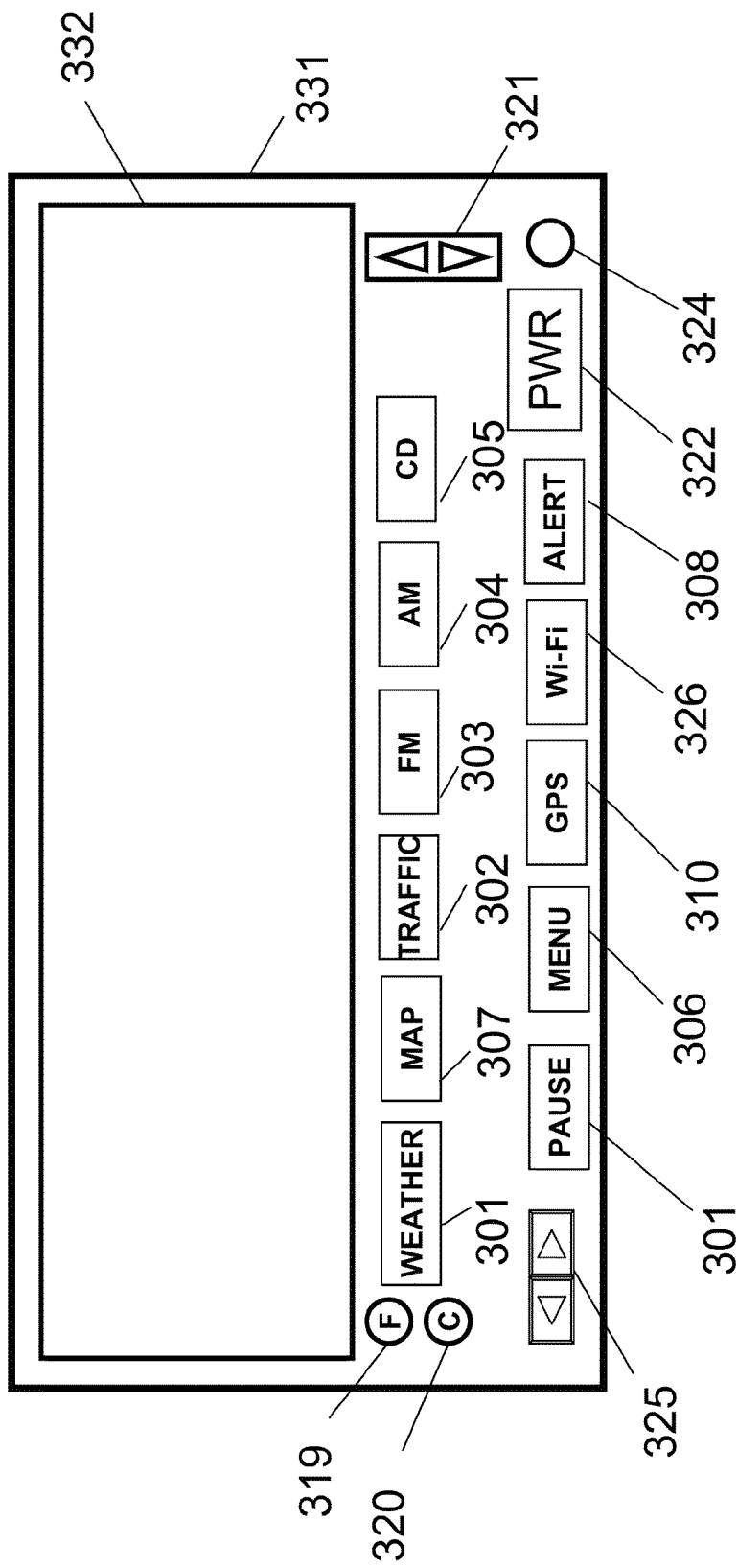
FIG. 11 shows an exemplary illustration of a vehicle radio system equipped with a receiver.

For example, referring to an exemplary embodiment of the receiver 300 as depicted in FIG. 11. The receiver 1100 may be configured to be incorporated in a vehicle. In this embodiment, a weather button 301 may be included in addition to the traditional buttons of FM 303, AM 304, CD 305. A user may simply push the weather button 301 and instantaneously the weather data of the user's current location appears on a display screen 332 in the vehicle. Alternatively, the radio may be programmed to continuously display the weather data. Pushing the button may play an MPEG audio file of the current weather forecast. The displayed weather data may be determined from geographic information within the receiver (in the case of a GPS radio) and/or from a particular cell such as a pager/WiMax/802.x cell, FM transmitter, AM transmitter, HD radio transmitter, and/or cell phone cell tower. In the case of a satellite radio transmission, the current location of the vehicle may be determined using any of the methods discussed above including manual input and/or GPS input.

Figure 12:
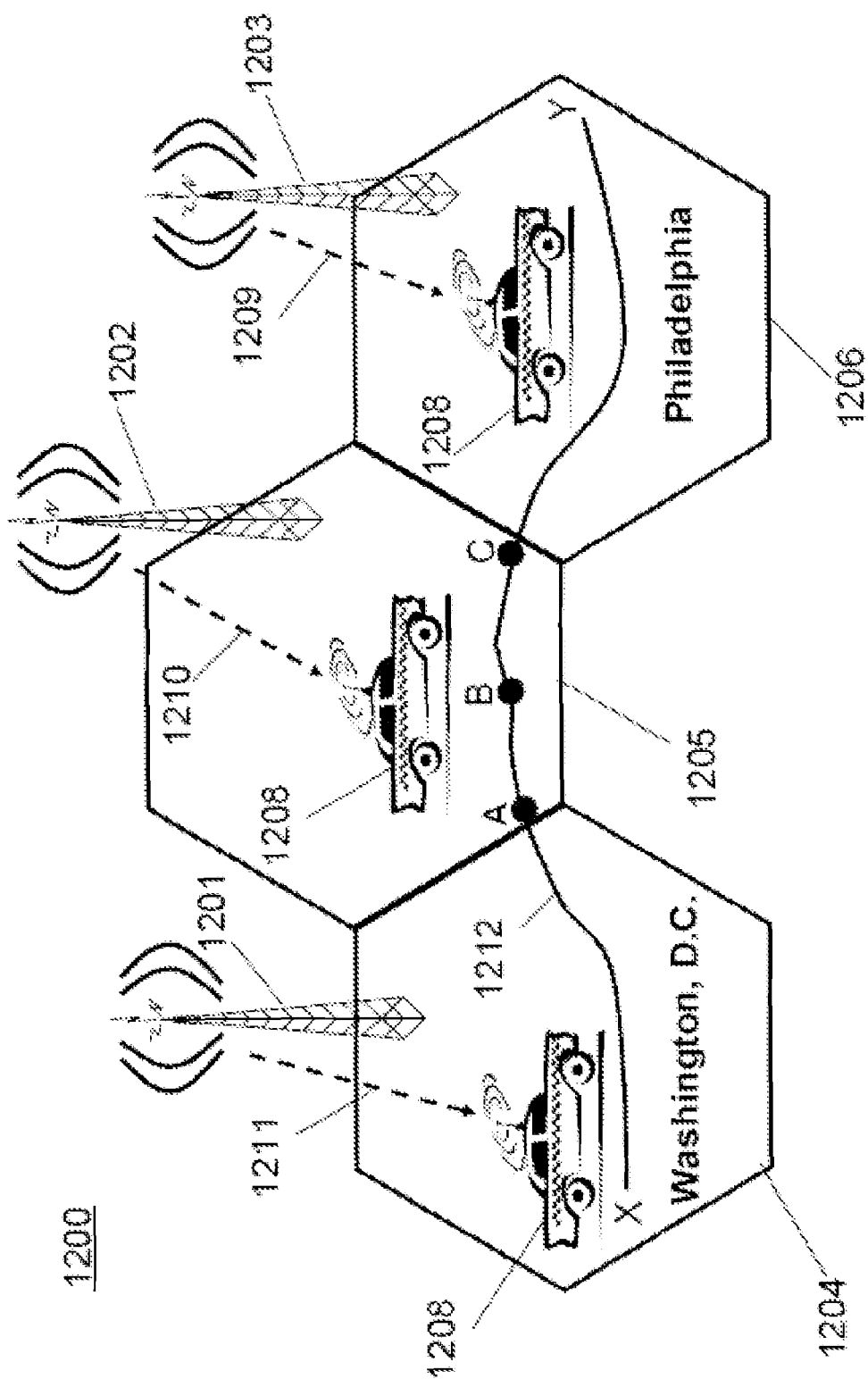
FIG. 12 illustrates a vehicle with a receiver that updates its weather data information as it travels from one location to another through different tower cells.

In an illustrative embodiment of FIG. 12, as the vehicle 1200 moves from one location to another (e.g., Washington, D.C. to New York City), the receiver may pass through any number of cells. For example, it may pass through cells 1204-1206 through the path from X to Y. As it drives into each of the cells, the receiver in the vehicle receives updated broadcast data for its current location within the cell. For example, as the vehicle 1208 in cell 1205 with location points A, B, and C, approaches location B, it still has the weather information for location A. However, upon entering location B the receiver in the vehicle receives a broadcast sent for location B and updates its data for the current B location. In addition to receiving the current weather data, the receiver also receives weather data for later in the afternoon, the evening and the next morning. These data may also be displayed on the receiver display screen. For example if a user were to fly to Detroit and rents a car upon getting there, while driving to the user's hotel the user may simply push the weather button to see what the weather would be like for the next day, the next afternoon and the next evening in Detroit.

As the number of Wi-Fi hot spots expand in the United States and elsewhere, the user's receiver (e.g., vehicle based receivers, iPod and/or a cell phones) passes through a different Wi-Fi hotspot, the user's device would receive updated weather information at a very fast rate via broad band. The user's weather data would therefore be filtered not only for the user's current location, but for all locations proximate to the user's current location. Thus, as the user passes through a Wi-Fi hotspot the user's weather data would be updated with substantial weather data and other information that the user could therefore filter locally based on any changes in user's current geographic location.

Storage is very inexpensive. Thus, if the user is known to frequently move his receiving device to any one of a number of locations the device may download and preload the weather and/or traffic data for all relevant locations.

For example as the user drives down the road and passes through a Wi-Fi hotspot, weather maps and other data intensive applications may be downloaded into the user's receiver (e.g., his vehicle radio), which is displayed based on the user's current geographic location. For example, if the vehicle passes through a major city with many Wi-Fi hotspots the vehicle receiver system may automatically log on to those Wi-Fi hotspots, download the weather data and/or relevant traffic information for its current location and locations proximate to that location. Then as the vehicle and/or receiver travels down the road outside of the Wi-Fi hotspot, the weather data would still be presented as weather maps and other information after being stored based on pager/WiMax/802.x towers or other GPS information.

Figure 13:
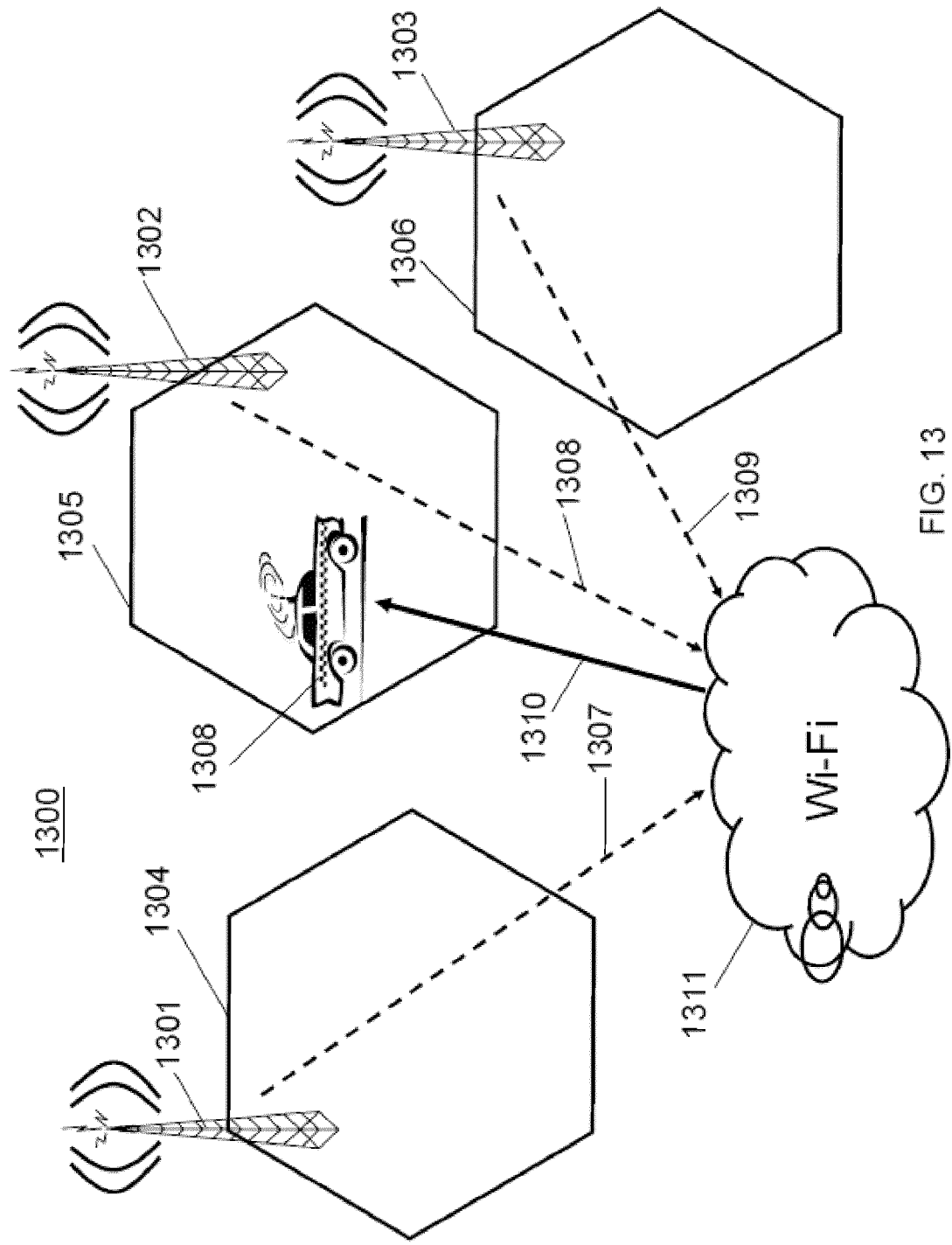
FIG. 13 shows an exemplary illustration of vehicle with a receiver that updates its data information via wireless internet as it travels from one location to another through different tower cells.

An illustrative embodiment is shown in FIG. 13, where several transmitters 1301-1303 in cells 1304-1306, respectively, transmit weather data for regions covering their respective cells via Wi-Fi 1311 and received by a receiver in the vehicle 1100. At the receiver of the vehicle 1100, the received weather data is filtered to provide the user with the weather data for the vehicle's current locations and other location of interest to the user, based on the receiver's filter setup.

In a further embodiment of the invention, a clock hanging on a wall also includes a Wi-Fi receiver for receiving weather and traffic data from the Internet via the user's local router. For example, a display screen such as a ten inch LCD high resolution screen may be configured to display received weather map data directly from the user's router. This weather map data would include not only a weather information and/or a weather map for the current day's events, but also information such as temperature, precipitation, barometer, weather alerts and other data. The weather data may also be configured to be loaded into a receiver in the users vehicle using the user's home WiFi network. For example as the user pulls the car into a garage, the car would synchronize with the Wi-Fi hotspot in the user's home and download additional traffic and weather data for the user. As the user starts the car the next time for example, in the morning, an onscreen display in the car shows the user the current weather expected for the day, and also the current existing traffic conditions. The user's vehicle is also synchronized to download any updates to his iTunes collection as well as updated street information (e.g., new developments, traffic detours, traffic construction updates) via his Internet connection.

The car stores the user's last five routes to for example, work, and based on those routes interpolates and determines the most likely route that the user would follow that particular morning based on the traffic conditions and expected weather conditions. For example, where rain or snow is expected, it may be that larger roads provide quicker travel times. Updated traffic information is downloaded for this route from the Internet prior to the user leaving the house. The traffic information would be updated and displayed as the user moved from the user's house along the route to the user's place of work. As the user makes turns and the route to work becomes more definite the traffic information is displayed on a much more definite basis. For example, the user may not follow the suggested route, but may take an alternate route. The weather and traffic conditions are updated based on the new route selected by the user. This information is all preloaded prior to the user leaving the garage.

Further the weather information is modified and displayed as the user progressed along the user's route. The downloaded and stored weather information in the user's garage is therefore displayed as the user, for example, approached user's place of employment. The traffic data and/or weather data may be updated by radio frequency transmissions along the user's route and/or other WiFi hotspots. In the most instances, there will be no need to update the information between when the user leaves the garage to when the user arrives at his work destination—absent an accident or other unexpected event. In the event of an unexpected event, an alert may be sent out and download as the user moves along the route. These updates may be downloaded information via Wi-Fi, or other cell phone or FM or other transmission mechanisms.

In addition to car utilization, the same concepts may be utilized for example, in an iPod, a Treo™, a cell phone or other Wi-Fi connectable device. For example, as the user travels to the user's work location and enters a Wi-Fi hotspot at the user's work location, additional data may be downloaded to the Wi-Fi connectable device. This device may utilize DNS geo-location techniques and/or stored geographic information to filter the data to obtain more location specific data. For example, as the user enters a Wi-Fi hotspot, the Wi-Fi hotspot may in addition to providing Internet connectivity, also provide a specific geographic and time location information to the user who enters that Wi-Fi hotspot. This data may be utilized to modify the displayed weather and/or traffic information data.

Figure 14:
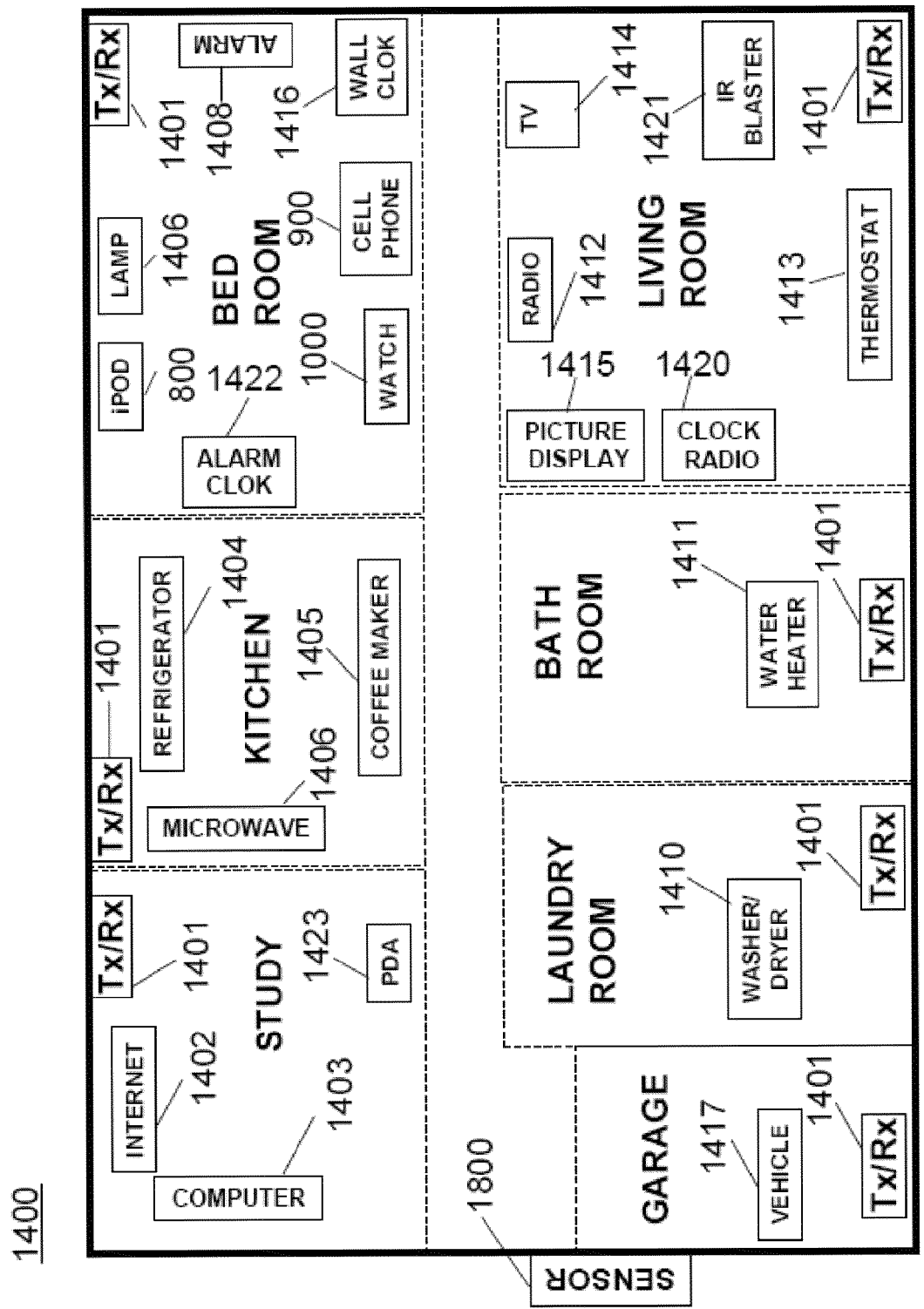
FIG. 14 illustrates an exemplary home with receivers integrated into various appliances in the home.

In addition to the weather receiving devices previously discussed in the present application, there is a further need for a distribution of the weather data within the home to various receivers—some of which may have only limited reception capabilities. For example, FIG. 14, shows an exemplary illustration of a home 1400 with receivers 300 integrated into various appliances such as the refrigerator 1404, the microwave 1406, the television enabled devices 1414, the iPods 800, the clock radios 1420, furnaces, the wall-mounted radios 1412, wall-mounted automatic picture display devices 1415, and other similar display devices located within the home 1400. The appliances in the home 1400 may be operated wirelessly or wired.

Figure 18:
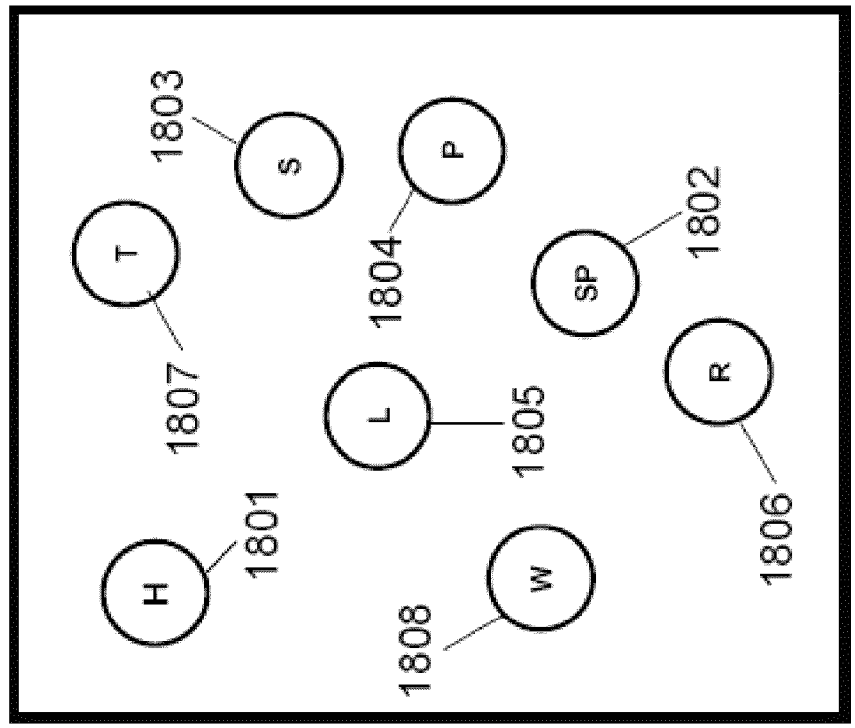
FIG. 18 shows an exemplary illustration of an integrated sensor system including series of sensor detectors.

The receiver system 300 may also be inter-connected to a sensor device including a series of sensors disposed external to the home. For example, an integrated sensor device 1800 illustrated in an exemplary embodiment of FIG. 18 may be disposed external to the home that would include various sensing devices such as humidity sensors 1801, wind speed detectors 1802, static charge sensor 1803, pressure detectors 1804, visible light detectors 1805, rain detectors 1806, temperature gage 1807, and other local weather information. The sensor device may also be removably attached to the receiver system 300 by the means of a snap member 330, wired to a receiver 300 (e.g., through the power system) and/or wirelessly connected.

The received local weather information may be provided via the user-home's Wi-Fi hotspot to a central location in a control center operated by the weather providing service. As discussed above, the control center may aggregate the data received from of the user-homes and use this data to accurately predict the weather systems, provide accurate storm forecast, and predict expected temperature changes based on information from a plurality of different homes proximate to the user's home. For example, by monitoring rain gauges from many different homes, the central location may accurately track the direction and speed of the movement of a storm front across the region. This information can be utilized to provide accurate alerts to a user located in an adjacent region. Therefore, systems and methods in accordance with aspects of the present invention, provide a more accurate forecast to users within the geographic region. In this manner, a company selling weather station receiving apparatus could actually also provide very accurate weather prediction services on a nationwide basis.

Figure 15:
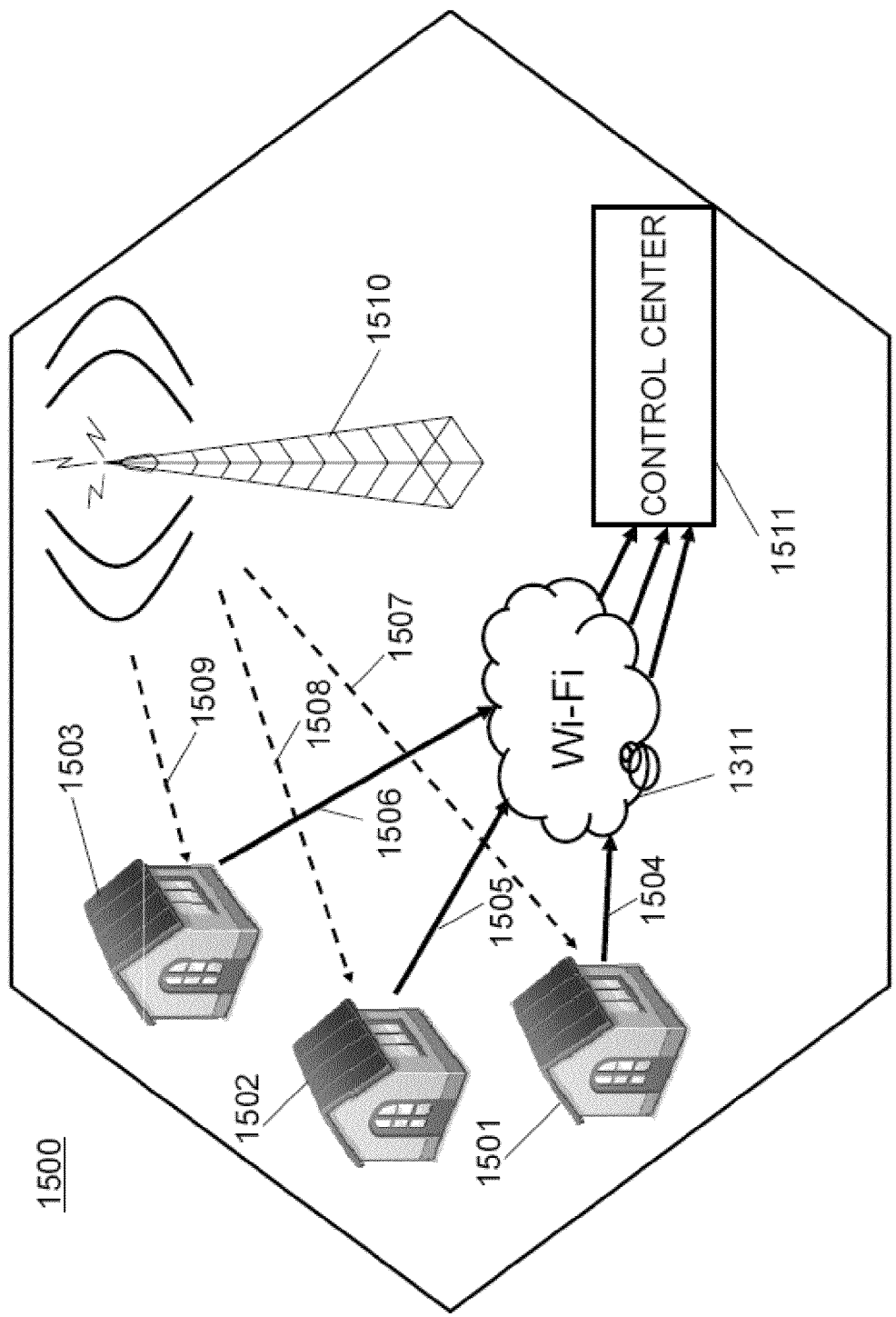
FIG. 15 shows an exemplary illustration of plurality of homes receiving weather information from a transmitter and transmitting the received information via wireless internet to a control center.
Figure 16:
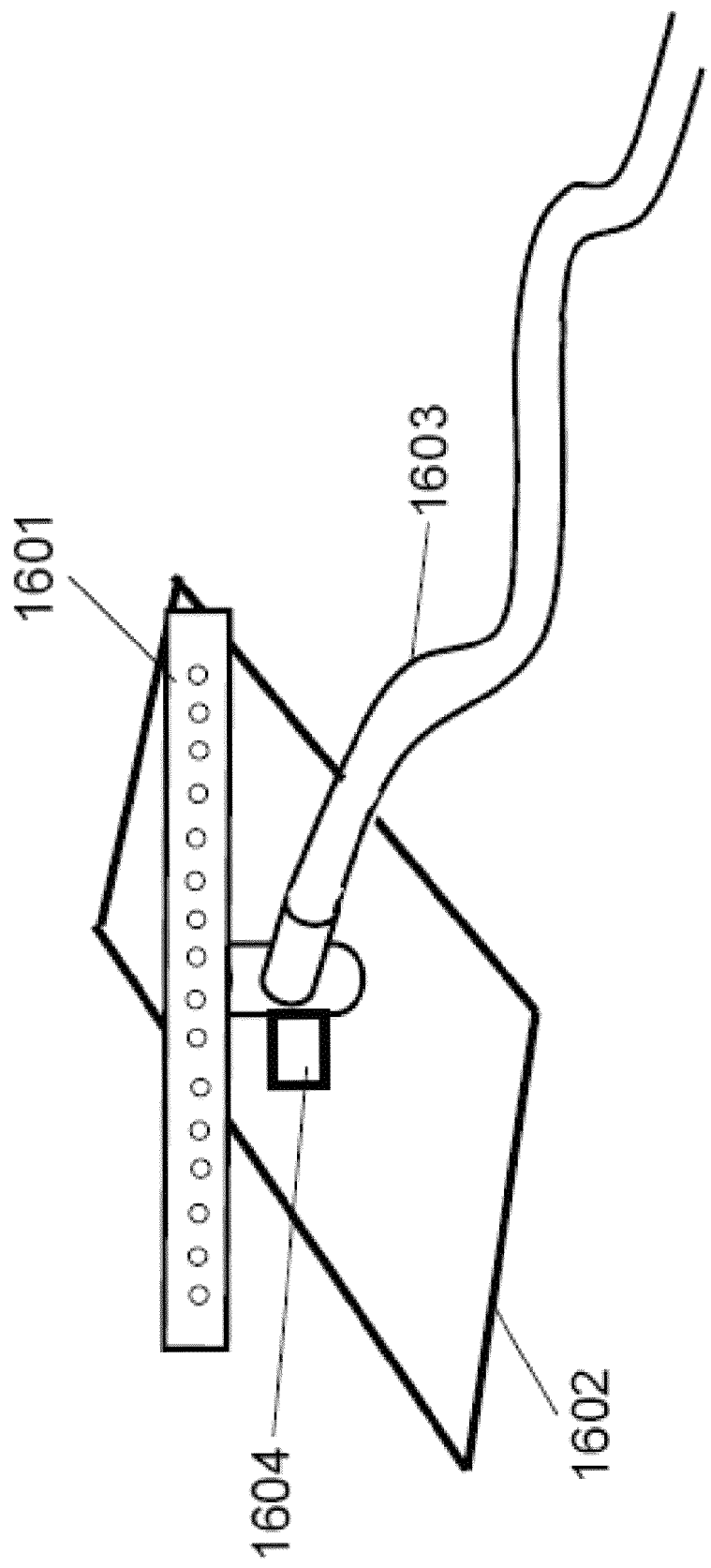
FIG. 16 shows an exemplary illustration of a sprinkler incorporating controlled by a receiver via a wireless module.

Referring to the exemplary illustration of FIG. 15, a plurality of homes 1501-1503 may be configured to receive weather data information via transmitter 1510. The weather data received from each of the homes 1501-1503 are transmitted via Wi-Fi hotspot 1311 to the control center 1511 (e.g., myownweather.com), where the data may be aggregated for prediction including weather, storm, and temperature based on the received data from the homes 1501-1503. The homes providing data to the control center would preferably be many homes, as for example, hundreds or thousands within a geographic region. The more data would ultimately statistically lead to a more accurate prediction.

Remote Monitoring, Receiving Alerts and Configuring Receiver Systems for Alerts

In aspects of the invention, the receiver unit 300 may be integrated into a home automation system so that the unit would, for example, close windows when it detects rain or when it detects a high probability of a prediction of rain, based on probability calculations.

Further, the receiver unit 300 may control, via a separate wireless module 1604 in the sprinklers 1600, when the sprinklers 1600 turn on and off. The separate wireless module 1604 may include a battery operated valve that would control when the sprinkler is allowed to operate. Thus, a home owner is spared the waste and embarrassment of watering his lawn during a thunderstorm.

As an alternative to the battery operated valve, the sprinkler may also include its own rain gauge and be configured to be powered via a turbine and energy store included within the sprinkler module 1604 so that the power would be generated based on the water flow through the turbine. This power would then be stored in a capacitor and used to open or close a valve to either turn off or turn on the water flow. The water flow would be turned off or turn on based on information about the weather received by the system 2000. For example, if it was determined that there was a high probability of rain within the next eight hours, the sprinkler would not be turned on at that time.

In addition, the data sent from the Wi-Fi sensor to a centralized location could monitor the path of rain. For example, if there are 400 hundred homes within a zip code that all have a rain sensor the centralized weather monitoring station may monitor a rain front as it approached a particular area and give a user a high predictability of when the rain may actually occur based on the speed and progression of the rain across the various sensors monitored by the company. Where the rain is sporadic, a prediction of the probability of rain once the storm front hits may be provided to the user.

In addition, based on the forecast, a heater may be turned on when there is a high probability that the low temperature would exceed a user's particular threshold so that the heater is efficiently controlled. For example, when it is warmer outside in the situation of a heat pump, so that the house could be warmed up prior to the temperature dropping. By integrating weather prediction capabilities into a furnace's control system, it may be possible to increase the SEER rating of the furnace beyond the levels achieved today.

In another embodiment of the invention, a weather sensor 1800 and/or Wi-Fi network is used for remote monitoring, for example to remotely monitor the current status of a user's home. The user is able to use the weather station to monitor for example, temperatures of the remote home, or intruder alerts using a camera or a video option, and/or other alerts based on movements within the home.

In some embodiments, the video cameras may rely on H.264 as adopted for 3GP applications. Additionally, MPEG 4, part 10 or Advanced Video Coding may enable substantial savings in bandwidth and battery power when applied in weather situations. For example, most weather cams will change very little most of the time. It is only during periods of severe storms that there will be significant data generated by the cam due to the fact that the compression technique minimizes data unless there are significant frame to frame changes for the video image.

Thus, this format for weather data allows for high quality weather images and may be compressed in to very little data. This will lower bandwidth requirements for the device and extend the live of the battery. As more networks convert to 3GP and/or 3GPP, the video streaming of the weather web cams will become even more efficient. This will enable users with an average smart phone to access weather web cams very efficiently in a mobile environment.

Figure 17:
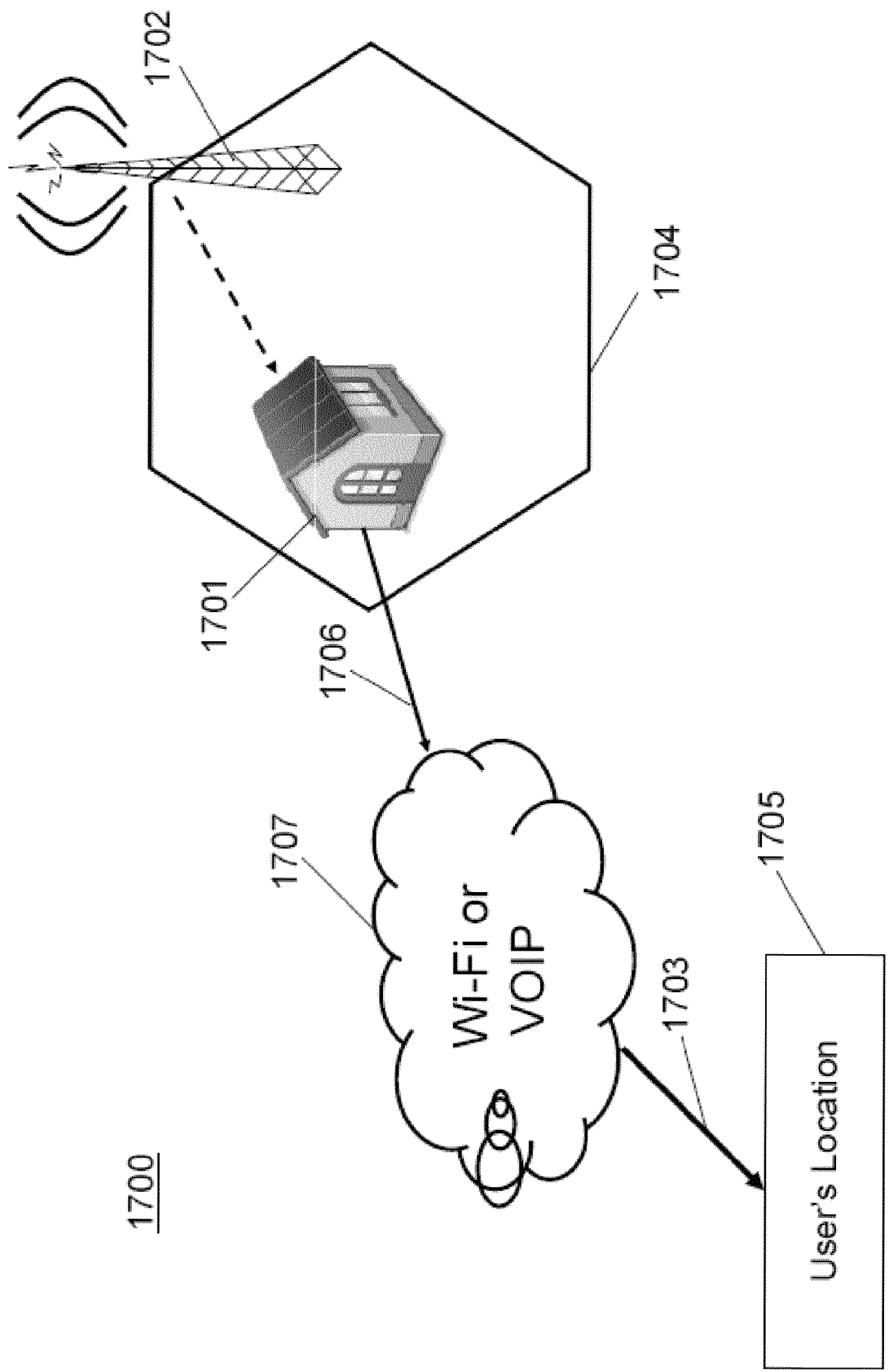
FIG. 17 shows an exemplary illustration of remote monitoring of a home via wireless internet of voice over IP by a user at another geographic location.

An exemplary embodiment shown in FIG. 17 includes a user's home 1701 with a receiver receiving weather data information from a transmitter 1702. The receiver in the user's home performs monitoring, display, and remote sensing functions. The result of the monitoring operation may be sent via Wi-Fi or voice over IP 1706 to the user at the user's location 1705, e.g., a wireless smart phone. Thus, a user who has a second home would be able to receive email alerts if the temperature in the home dropped below a certain level or if the water content in the home became high such as in high humidity or with a water incursion sensor. Similarly, the user may be provided via Wi-Fi access, photographs and/or video of the home, based on receipt of some trigger such as a motion detection switch being activated, a water intrusion alert activation or a temperature falling between some predetermined alarm level.

In addition, if there were particular NOAA weather alerts detected in the vicinity of the location of a user's home for example, the user's summer home 1701, these alerts may trigger an alert to be emailed to the user in any various numbers of email locations and/or a text message and/or a phone call to the user's cell phone via voice over IP or other similar connected mechanism. For example, a user who only had a cell phone but not text message capability, would receive a call placed to the user utilizing a voice over IP connection. This call may utilize synthesized voice to generate an alert to the user. Additionally, an alert may be sent to a call center, where the call is processed over the PSTN network. In any event, the user is ultimately alerted to the NOAA weather condition, a detected condition, and/or some other event impacting the user's summer home and/or principal residence.

A user on a mobile platform such as cell phone 900, a boat or a GPS device 703 may alternatively have an emergency alert that would be sent in a reversed path on the pager/WiMax/802.x network. For example, if the user were to enter a SOS with a particular code in a reversed path on the pager/WiMax/802.x network, the weather alert system would allow the user to alert emergency personnel and/or a tow vessel to the user's condition and the need to be assisted.

In aspects of the invention, a user is provided with a simplified user-interface such that the user may select a particular alert. In this embodiment, based on the particular cell tower of the user's geographic location, certain alerts are pre-selected. For example, if the user is located proximate to the Midwest certain alerts such as tornado alerts or dust storm warnings are automatically enabled for the user based on the user's geographic location. In other areas of the country certain cell locations are automatically alerted for, for example volcano alerts. In the northwest US, users who are located proximate to a cell tower in that area have alerts automatically enabled for that particular user's weather conditions that are of most relevant. In addition, in cell towers located proximate to coastal areas, the coastal warning alerts are automatically enable for the users, while these alerts are disabled for users living in inner coastal positions. This automatic alert filtering function is of substantial advantage to a user who does not want many alerts, which are of not interest to the user, has limited ability to reconfigure his/her device, yet still wishes to receive critical alerts.

In addition, the users are provided via Wi-Fi access or other access, a whole range of alerts, including emergency alerts, weather alerts, traffic alerts and warning alerts. For example, civil danger warnings in the United States have become of much more interest to the general public. In one example, if the water were to become contaminated, NOAA provides a water contamination alert. Similarly, there are alerts for chemical hazards, dam break warning, contagious disease warnings and other similar alerts which may require a user to take emergency action. These alerts may take priority over other settings (e.g., sound volume) and be immediately presented to the user. The alerts may be provided via Wi-Fi access, NOAA weather transmission access or pager/WiMax/802.x systems, cell phone systems, and other similar weather receiving devices.

The filters for the alert functions could be variously configured. For example, the alert could be selected on a geographic basis. In alternate embodiments, the device may contain different alerts for different counties, different states, and different counties.

In exemplary embodiments, alerts may be selectively enabled by users. For example, school snow closings and delays are now frequently available via e-mail servers. However, many users are now aware of the closings because they are not currently logged on to their e-mail accounts. Further, the school closings and delays are often not posted until 5:30 or 6:00 am in the morning. This forces a family to wake up, go down stairs to check their e-mail, go back up stairs and reset the alarm (e.g., for a one hour or two hour delay) and return to bed.

Embodiments of the present invention may be configured to receive the e-mail alerts. For example, the user may register an e-mail address with the school system. This e-mail address may be one assigned by a centralized server location e.g., myownweather.com. When the server receives a school delay or closing notice, it decodes the information in the e-mail to determine the type of alert to issue. Most of these alerts may be automatically processed. For certain alerts in certain systems, the alert will need to be forwarded to a manual processor at the central server for human intervention. The central server and/or local computer terminal in network 2000 may be configured to read the data from the alert e-mail and both alert the user on his/her receiver devices and, selectively under user configuration control, reset one of more of the alarm clocks in the family. For example, where the high school is delayed by two hours due to a snow delay, the mother's and youngest daughters alarm clocks may be delayed automatically from ringing for two hours. However, the father's and eldest daughter (college age) alarm clocks are not modified. In still further embodiments of the invention, the eldest daughters alarm clock might be associated with an e-mail notification from a college, e.g., N.Y. University, and the father's alarm clock may be associated with an e-mail alert from the AT&T corporation snow closing alert center.

Alternatively, the software for processing the e-mail notifications may be loaded locally and provided the ability to access the local e-mail account. In still further embodiments of the invention, the alert notification software may be programmed so that it does not "send/receive" the e-mail such that the user would be considered to have "read" the e-mail, even though he has never actually seen the e-mail. Thus, embodiments of the invention are programmed to preserve the "read" status of the mail message will still accessing the contents. This may be accomplished by executing a macro in the mail reading program to "mark as unread" and/or by inputting separate e-mail notification addresses into the snow alert messaging system.

The centralized web server may preconfigured much of this information for the end-user. For example, by knowing the end user's zip code and/or home address, it is possible to determine one of a number of school systems and emergency alert systems (e.g. for terrorist attacks and/or county emergencies) that would be of interest to the user. The user's experience of selecting alerts, determining the web addresses of servers to supply with the e-mail addresses, supplying the correct e-mail address for receiving these alerts and forwarding them to the receivers, and associated alarm setup functions is substantially simplified using an on-screen setup menus in accordance with embodiments of the present invention.

Other counties have also implemented various e-mail alert systems for certain emergencies. The receivers in accordance with the present invention also include configurations (e.g., via the centralized server) for receiving e-mail alerts from various organizations such as the children's sports teams (for game cancellations), church organizations, and car pools. These e-mail alerts are forwarded to the user in a similar fashion to other alerts that the user may receive from the weather system. For example, as part of the registration process the user is asked if he or she has school age children and if so, what school system they are enrolled, e.g., Long Island, what sports clubs they belong to, and other civic organizations which have registered with and/or utilize an e-mail alert system. This information is used by the receiver and/or a centralized location e.g., myownweather.com to forward updates (e.g., school closings) to the user. These alerts then appear on the user's alarm clock and on receivers throughout the user's house, his/her watch, cell phone, iPod, television, radio, car navigation system, and/or other connected devices to alert the user to the closing. Similarly, where the heater is controlled by the alarm clock, the heater settings would be reflected by changes in the alarm activation times. This invention prevents the very unfortunate situation of a child being left with no one to take him/her home due to an early closing. In this manner, when schools close early due to severe weather, the child is not left at the school with no one to pick them up.

In addition, aspects of the present invention provide the user with the ability to select or deselect any number of alert messages. For example, the user may be provided with a particular menu of alert messages keyed to his particular zip code and be able to check or uncheck the individual alert messages. The setup system of the present invention may be configured to have two interfaces. The simplified interface walks the user through the setup menus using a series of questions in a decision tree arrangement. An alternative interface which may be selected by the user at any time during the interview process provides a menu structure type interface.

In embodiments of the invention, the alert messages may be further filtered such that if it was late in the evening, after the user's normal bedtime, messages such as storm warnings or other similar alert messages would not be activated. However, for certain alert messages such as dam break warning or contagious disease warnings, these messages would be alerted regardless of the time of day. The user would be provided with filters based on geographic location, time of day, status of the alert. These alert filters are preset to default values in some embodiments of the invention, but may be changed by users to desirable settings.

In addition, the user-interface may be configured to provide categories of the alerts that would allow the user to more easily setup the receiver system. For example, certain categories such as emergency categories or terror related categories would be provided in one group of warnings. Biological hazard warning, contaminated water warning, chemical hazard warning, and other such warnings would fall within this group. In other emergencies, such as contagious disease, child abduction emergencies, civil danger warning or civil emergency message would be placed in a separate group.

In still further embodiments of the invention, a local computer is not required to set-up the system. In these embodiments, a display mounted on the wall, the refrigerator, on a bed side stand, and/or a projection display is supplied with a remote control. The remote control is designed to interact with an infrared port on the receiver 300 or similar such device to allow the user to walk through the various menus described herein to setup the device. The use of a remote control eliminates the need for a keyboard interface in the receiver 300. This is particularly useful for clock and/or weather station based devices where a complex keyboard arrangement detracts from the aesthetics of the device.

In still other embodiments, the receiver includes various information determined from that current status of the home in which the receiver 300 resides. For example, the receiver may include a status as to whether the user is in the house or outside the house, whether the user has the alarm set or not set, whether the user has currently activated any motion detection apparatus. The alarms presented to the user may thus be filtered and directed depending on the user's location, type of receiver 300, time of day, day of week, and other suitable parameters such as setup data entered by the user.

Further, the user would be able to select any one of a number of central weather monitoring servers. For example, some users may select www.Yahoo.com as their centralized weather monitoring station, some may select www.myownweather.com, while still others might select www.theweatherchannel.com. Each of the different sites could be targeted toward different classes of users with different capabilities. For example, certain web sites would be integrated into popular destinations such as www.facebook.com or www.myspace.com. In these embodiments of the invention, the user is able to customize his personal site with, for example, his local weather, video cams of his/her vacation home, video cams of his/her home, updates to his/her calendar based on alerts from the local soccer team, etc.

Further, the user may individually customize the weather alerts for each of the receivers 300 in accordance with the particular alerts the user wishes to receive. For example, if the user has a mobile weather station, certain alerts would be non-filtered automatically, whereas other alerts would be automatically filtered. In particular, for certain activities the alerts would be automatically turned on. In one exemplary embodiment as a car with a receiver approaches a river-crossing a flood warning alert would be integrated with the GPS system so that the user would be given an instantaneous message as if there were a flood warning and the use were approaching area typically inundated by flood waters. For example, most roads today include "high water" signs and flood level water dept indicators. Further, most areas include river level gauges which measure the level of rivers known to have frequent flooding. However, the river crossings subject to frequent flooding are currently not integrated into any GPS systems. Further, the weather related data such as severe thunderstorm and/or rain fall are not integrated with any GPS device. The present invention seeks to increase the safety of motorists by integrating the weather related data of river levels, rain gauges, thunderstorms, and flood warning alerts with GPS directional control and mobile receivers (e.g., smart phones). When a flood alert is determined to be probable based on data obtained from, for example, a central monitoring station, the user is notified when he/she is approaching a danger zone.

In addition, a freeze warning would be provided on the user's dashboard as the user approached a bridge. Where the temperature is below freezing, and precipitation has previously been detected in the area, a color indication in the GPS system together with a bridge freeze warning appears on the user's receiver (e.g., his in-dash navigation device).

In addition to the above embodiments of the inventions, the integration with the home automation system with the receivers 300 will be further explained. For example, depending on certain alerts and/or weather conditions, together with setup information entered by the user, the home automation system may take certain actions in response to receiving alerts. For example, if the home system received an Amber alert, a child abduction alert, or a criminal escape alert the home automation system would be automatically programmed to close doors, close windows and turn on an alarm system. Further, for tornado warning alerts, the home automation system would be programmed to automatically activate the storm shutters for homes so equipped. The storm shutters could also be activated for certain law enforcement alerts. The shutters, however, would not shut in response to a severe thunderstorm warning or severe weather warning. In addition to the above items, the receiver may also be programmed with particular nuclear power plant locations. As such, the user would automatically turn on the nuclear power plant warning when located or positioned within the cell having a nuclear power plant.

In other embodiments of the invention, NOAA weather warnings or alerts are integrated into a receiver in a watch and/or cell phone, and/or other suitable devices. These devices may be configured to provide the user with an audible and/or visual alert in response to certain severe weather or other national emergency situations. For example, if a user were located in a cell or geographic region in which there is a tornado watch or a tornado has been reported, an audible sound indicative of tornado would occur on the user's watch and/or cell phone irrespective of its current volume and/or sound off button. Embodiments of the may also include dynamic depictions of the alert on the user's screen. For example, for a tornado alert, the user would be provided with a visual indication of the tornado such as a swirling funnel cloud on the screen of the device. This visual indication may be accompanied by an overlay map showing the last reported location of the tornado as well as the current position of the user.

In this manner, embodiments of the invention provide an instantaneous mechanism for informing the general public of, for example, a radiological hazard, a nuclear hazard, or a tornado, instructions to the public for corrective action, and the location of the disaster relevant to the user's current location. The provision to the public of instantaneous instructions for reacting to the severe emergency provides a substantial national emergency management objective. For example, after the 911 terrorist attacks, there was no effective way for federal emergency management personnel to provide targeted instructions to those individuals within the disaster area. Embodiments of the inventions contained herein solve that problem by providing local and national emergency personal with instantaneous communication with every individual having a cell phone or watch in the disaster region in order to provide them with appropriate instructions for reacting to the emergency.

In further embodiments of the invention, there is provided a lightning strike alert. The invention receives real-time lighting alert information from weather sources currently available and provides this information as an alert in real time to receiver 300. Receiver 300 may then be utilized by swimming pools, golf courses, soccer officials, boaters, and other recreational activities to determine when the threat of a lighting strike is likely. In embodiments of the invention, the alerts are coded to a specific zip or zip plus four code and distributed to receivers 300 in accordance with aspects of the invention. The lighting strike information in certain receivers 300 may show relative distance of lighting strikes to the user's current position.

In embodiments of the present invention, where maps are presented to the user, the user is afforded the opportunity to pan and zoom the map. In some embodiments, the maps are centered dynamically on the user's current location. The user may select other preferred locations for centering the map by selecting from a pull down menu.

Further, the user is provided with weather predictions that are made in accordance with the present invention. By moving a slider bar or other interface, the user may select weather predictions 10, 20, 30, 60, 90, minutes in the future. Alternatively, the bar may be graduated so that as the user moves along the bar, the increments of future weather predictions are increased, e.g., 4 hours, 12 hours, one day, two days, three days, the weekend, etc. The user may overlay different predictions by selecting an icon on the screen. For example, the user may view the temperature forecast, the wind forecast, the rain forecast, the pollen forecast, the UV forecast, the lighting forecast, and/or other forecasted data selectively depending on which settings are enabled. Further, the user may have certain forecasts pre-selected as packages. For example, a beach forecast would provide the predicted temperatures, water temperatures, tides, wind, UV index and precipitation for the weekend. Similarly, a mountain forecast may provide temperature, precipitation, and pollen.

A projection weather-receiving station may be adopted such that the reception of certain alerts (optionally user programmable) causes the receiver unit to turn on and project an alert on the ceiling or out into the room. See, for example, the embodiment of the weather station interface unit depicted in FIG. 38. In this example, if a tornado or hurricane warning alert were detected, the receiver unit may turn on and project an image of a tornado/hurricane on the wall and optionally its location relative to the user's home as well as optionally an audible alarm to immediately alert the homeowner to the tornado. The tornado/hurricane alert would continue to alert the user as long as the condition existed until the user pushed a button on the unit to turn off the audible and/or visual alert.

The weather receiving station may alternatively include a proximity sensor such that, in order to save battery life, it would display the alerts only when a user's presence is detected.

Currently, the NOAA transmission is provided on a continuous basis so that alerts are provided at anytime. This requires a receiver to stay on full time in order to detect the alerts making battery power receivers impractical. Accordingly, an improvement to the NOAA system is to periodically send a preamble or other header information that would precede any alert. This header information would either be timed to coincide with a particular time such as time received from a centralized source, pager/WiMax/802.x source or other timed synchronization mechanism or it could be a sent periodically, for example, every 10 seconds. In certain embodiments, the receiver is programmed to turn on for a very short period of time periodically to look for the preamble to detect if there were a particular alert being transmitted, thus saving substantial power.

The preamble may be coded such that a different preamble is presented based on the category of alert. For example, non-critical alerts have one preamble and critical alerts could have another preamble. The receiver 300 may be programmed to determine whether the alert was in a particular category, thus, saving substantial additional battery power. The present inventors have been working with NOAA in order to create a preamble arrangement in the transmission of the data in order to make the system practical for battery operated and other small hand held devices.

Transceiver Systems for Distributing Received Data to Low Powered Devices

The current NOAA transmissions or certain Wi-Fi transmissions are such that they require extensive amounts of power that leave them impractical for most battery operated receiver devices for large amounts of data. Embodiments of the invention provide a solution to this problem by including a small ergonomically attractive plug that fits into a wall socket that provides a transceiver function which receives data in one frequency band and transmits data using another frequency band. The transceiver in accordance with the invention may be configured to receive NOAA information using for example, a Wi-Fi information channel, consuming the power required to receive at these bands. As an additional feature of the AC plug-in transreceiver module, there is included a transmitting device for transmitting to a plurality of weather station receivers located proximate to the AC module. The receivers located proximate to the AC module may be configured to receive using a low power/low cost frequency band, i.e., ISM band. In this manner, the AC module may receive power from the AC outlet, and provide a conversion capability for powering battery powered receivers within the home. The AC powered module includes a receiver 300 for filtering and processing the incoming weather data and then forwarding selected subsets of that data to certain receiver devices within the home which may be configured for low power batter operations (e.g., wall mounted weather clocks). The receiving band in these embodiments may be specifically designed to accommodate low powered devices and have its receiver programmed to power up and turn on only periodically at a predetermined synchronization with the transceiver module.

Where the low power band is the medical band currently used for many battery powered weather station devices, e.g., in the range of 915 megahertz, the band may be further segmented into a plurality of different channels (e.g., 24 different channels). Alternatively, the band may be segmented such that different devices are powered on and set to receive data at different synchronizations. For example, where the ISM (industrial, scientific and medical) band in the range of 902 to 925 megahertz is utilized, this band may be divided into 24 different channels and/or utilizing one channel in a time division multiplexed mode. While these bands may not have the distance and power associated with other information distribution bands, they have the unique advantage of being able to be utilized on battery powered devices.

Referring to FIG. 14, the home, business, or other enterprise 1400 may include one or more transceivers 1401. In a typical installation, only a single transceiver 1401 is utilized for proper reception. In other embodiments where the home is extremely large or has concrete infrastructure, more than one transceiver 1401 may be helpful. Other receivers in the home such as a PDA 1423, appliances such as microwave 1406, coffee maker 1405, refrigerator 1404, and/or other devices such as alarm clock 1422, lamp 1406, alarm 1408, watch 1000, cell phone 900, wall clock 1416, care information center 1417, sensors 1800, washer/dryer 1410, water heater 1411, bathroom heater (not shown), picture display 1415, TV set 1414, IR blaster (e.g., a remote) 1421, thermostat 1413, and/or clock radio 1420 need only have a short range, low power, receiver for receiving data. In this embodiment, a single receiver 300 with a transceiver device 1401 may be utilized to distribute data to every device in the home 1400 in a very low cost information distribution network.

By using a periodic interrupt such that the transmission occurs periodically it is possible to configure the network 2000 to support battery powered devices while still providing the robust weather related data and alerts in accordance with the present invention. These period intervals are optionally enabled by a watch-dog timer or other similar timing device. The transceiver 1401 may optionally be located either inside or outside. Where the transceiver 1401 is located outside the home, it may include a mechanism for receiving a satellite signal or a long wave transmission such as a time signal from a WWVB receiver and/or a GPS satellite signal. These signals then may be broadcast into the house using a suitable frequency such as the medical frequency or other frequency for low cost reliable in-home transmission.

Certain items in the house 1400 may be interconnected using transceivers. For example, the home security alarm and/or the bed side alarm may be interconnected. In this manner, the home alarm may be deactivated 30 minutes after the user awakes so that it is not triggered by the user venturing outside to read his morning paper. Further, a user who set an alarm to wake up at 6 a.m. is also able to have the alarm communicate with other devices in the house. For example, the user may selectively turn down the heat at night by 10 degrees and turn the water heater down by 15 degrees and shut down the lights and other suitable energy saving mechanisms. In a similar fashion for a period of either 20 minutes, 30 minutes or other user selectable time prior to the selected alarm time, the alarm clock and/or transceiver 1401 may signal other apparatus in the house to, for example, turn on the coffee maker 1405, turn up the heat in the water heater 1411, turn on a bathroom heater, turn up the temperature in the house, and set other functions responsive to the time the alarm is set to go off.

The transmitter 1401 in the house may be visually linked to the other systems in the house so that the user knows that the systems are in communication. For example, by accessing a web page (www.myownweather.com) the user may see a graphic depiction of the network topography of the network 2000. The user may be able to click on these devices and associate them with a room in the user's home via a drop down menu. By dragging rooms around on the Java or ActiveX enabled web page, the user is able to configure the floor plan of the graphic network depiction to approximate the floor plan of his/her home. In this manner, the user's control of the network 2000 including any weather related sensors, alarm sensors, web cameras, appliance, furnaces, and/or other devices is greatly facilitated. This is particularly adapted for the use of microprocessor remote control units for controlling various appliances such as the furnace or other wall mounted displays. The interactive control web page (e.g., as shown in 1400) may be shown on any or the receiver devices 300 including a display. Further, each of the screens shown on www.myownweather.com may be replicated and/or shown on an in-home display for manipulation and/or control by the user.

For example, a business method in accordance with the present invention is to sell aspects of the invention as a kit with certain features pre-configured and pre-enabled. For example, one kit might include an alarm system, another kit a weather station, another kit an alarm clock control, another kit a cell phone and/or car navigation weather function including any associated software and/or control. These kits may be sold as combinations with weather and alarm functions, weather and cell phone/navigation functions, or a master kit with many different functions. The kits in embodiments of the invention are fully compatible, interoperable, and/or plug and play enabled. For example, a user might start out with a home alarm clock. The alarm clock might state that it is compatible with the "myownweather" home automation systems. The user could next purchase a transceiver 1401, a weather station, a home automation system, an alarm system, a television, a refrigerator, a wall mounted display system, and all of the various systems would interoperate, communicate with each other, and provide a synergistic configuration in accordance with the invention.

While most people would probably not purchases kits having every function, once they purchase one product in the family, they have a heavy incentive to continue to purchase compatible products. For example, when selecting a retrofit microprocessor temperature control for the home, the user would have an incentive to purchase one compatible with the myownweather system if he already had an alarm clock compatible with that system.

A user who decides to install a digital or a microprocessor controlled thermostat 1413 for example, may purchase the device from Home Depot™. During the registration process for the new thermostat, the device may be configured to communicate with the Internet using, for example, a centralize control location e.g., myownweather.com. When the user logs on in the configuration process, the user may alternatively be provided with advertisements to purchase other compatible products on-line such as an alarm system 1408 and/or a compatible alarm clock 1422. As such the alarm clock 1422 may be enabled to control the on-off temperature of the thermostat 1413 based on when the alarm was set at night and when the alarm went off in the morning. For example, current microprocessor controlled furnaces have settings for weekdays and weekends. However, they do not account for holidays and days the user has chosen to sleep in without keeping to his/her normal schedule. Systems in accordance with aspects of the present invention, automatically reconfigure the furnace settings dependent upon the current alarm clock settings.

For example, if the arises early in the morning in order to get to work early, conventionally the heat would still set 10 degrees lower than the user's comfort level, thus inconveniencing the user. This tends to have the user override all temperature savings furnace modes to avoid being inconvenienced. It is far superior to sell an alarm clock and microprocessor controlled thermostat combination so that the alarm clock's early setting will override the setting in the thermostat and thus raise the temperature based on the user's alarm clock setting. A further embodiment of the invention is to utilize a furnace that may be controlled by any number of alarm clocks. For example, the furnace settings may be altered by either the husband's alarm clock, the wife's alarm clock, or any of the children's alarm clocks. Where one is set for 5:00 am, one for 7:00 am and one for 8:00 am, the furnace may be programmed in accordance with aspects of the invention to warm the house at 4:45 am, keep the home warm until 5:45 am, reduce the heat by 10 degrees until 6:45 am, increase the heat until 9:00 am and then revert to a daytime temperature setting. Thus, the furnace is responsive to varying conditions of each user in the home.

The thermostat 1413 may also be influenced by an outside weather sensor device 1800 that includes for example sensing sensors for humidity 1801. Where the humidity outside the house is very high, the temperature inside the house on a hot day may be lowered such that the perceived temperature to the user remains the same despite the increase in humidity. Similarly, where the humidity outside the house is very low, such as in some southeastern areas, the temperature inside the house is increased in the summertime such that the perceived temperature to the user does not vary despite variations in humidity.

In yet further embodiments of the invention, the receivers 300 may be configured such that an incoming NOAA alert turns on a television 1414 in the house and automatically switches the television 1414 and/or other receiver to an emergency alert channel. The emergency alert channel may be a digital channel output by receiver 300 and/or a conventional television channel. Alternatively, the channel is an internet alert channel designated for a particular zip code and/or zip plus four code. As such, the user is immediately provided instructions audio and/or visual instructions in the event of an emergency. The device may be programmable by the user based on the type of alert being received.

In a further embodiment, a transceiver may be configured to receive NOAA alerts and/or Internet alerts and output a separate signal indicative of the alert. The transceiver may include an IR blaster device 1421 which may be configured as a remote control transmitter to, for example, turn on the television, control a wall mounted display device, control a computer terminal with an IR input, and/or control another device to turn on for the predetermined alert in conjunction with predetermined alert settings and/or settings provided by the user.

The transceiver 1401 need not have any user interface. The transceiver may be programmed by virtue of the user's home computer and may utilize the user's home computer network. For example, the transceiver 1401 may be an Internet enabled device which configures itself to connect to the user's home computer network e.g., an 802.11 a-g, or n network. The transceiver 1401 may be configured in accordance with the receiver 300 discussed above. Alternatively, the transceiver 1401 need not have any key input and/or visual output. In still further embodiments, the transceiver 1401 may have limited visual outputs such as a set of LED's indicating that it was in wireless communication with the user's network and a reset button. The transceiver may be configured such that the user configures and/or programs the transceiver 1401 by virtue of a computer either in the user's home or coupled anywhere to the Internet. For a home connected configuration, no firewall or virtual private network (VPN) is required. Where the transceiver is configured to be coupled to and controlled over the Internet, in preferred embodiments, a VPN connection is utilized to control the transceiver. In these embodiments, the user may log onto any Internet connected computer and control the transceiver 1401 by virtue of the mechanisms discussed above, e.g., using www.myownweather.com as the control interface.

The software to communicate with and/or control the transceiver 1401 may be preloaded into the transceiver and be plug and play compatible with the user's router software. Thus, the router network configuration page (e.g., for a Netgear router) may have a separate tab for configuring the users alarm, weather, furnance, alarm clock, and wall mounted display network 2000. The devices of the present invention may be sold as augments to the user's home computer network. In this manner, company's selling home networks may subscribe to networks 2000 compatible with the present invention and thus have many additional add-ons to sell users of their home routers.

The software controlling the transceiver 1401 (either in the home or over the Internet) is configured to program the transceiver 1401 to communicate with any of a number of home devices, e.g., those shown in home 1400. For example, where the transceiver communicates with the devices in the home 1400 using Bluetooth, modification of the configuration parameters at the web page www.myownweather.com causes the transceiver to output commands to alter the alarm clock of the user—in this case over a blue tooth network. Similarly, the user may set an appointment in his/her outlook calendar and this appointment may have a block to select an alternative wake-up time in the user's alarm. By filling in a time in the box, the user will send an appointment to his/her alarm clock with will modify the wake-up time and optionally provide an audio and/or visual reminder of the day's appointments along with any other morning alarm signal. Similarly, the transceiver 1401 may update other device of the user including his/her car based navigation device, his/her Treo™ phone which may be Bluetooth enabled, a laptop which is Bluetooth enabled and/or other similar device. In addition, the device may be configured with an IR blaster 1421 for turning on a television and/or beaming certain configuration data to devices within the home.

The transceiver 1401 may obtain alert information from the internet and output a television, radio, or other alert signal on all or part of an unused channel (e.g., in a VBI signal or side band signal) which is thereafter received by the appliance (e.g., television and/or radio) in a similar fashion as any emergency alert system currently employed by the U.S. government. This system would vastly expand the emergency alert service to the television to include a number of new alerts offered by the NOAA as well as geographic specific alerts and alerts enabled by aspects of the present invention.

In still further embodiments, the user may be able to e-mail his system 2000 using a device such as a smart phone. The e-mail messages may include pre-formatted data which enables the user to control, query, and monitor his system 2000. For example, the user may send a status e-mail to his home system. The status e-mail will cause the receiver 300 to generate a reply e-mail containing current status information such as home temperature, jpeg images and/or .mov files from cameras in and around the home, alarm informations, and/or other information from network 2000. When the user opens the user's email the user can open the home network control page via a link in the e-mail and/or a favorite location stored on his attached device and use this interface to control all the devices in the network 2000. The user can control them remotely from the user's computer 1403, the Internet, the user's car, and/or the user's smartphone.

In addition, periodic updates may be downloaded from a central server (e.g., myownweather.com) provided by, for example, Lacrosse Technologies or other company so that the user can stay current on all the new devices provided. For example, the company may provide a lamp which is specifically tied to the alarm clock 1422. In these embodiments, the lamp 1406 would slowly illuminate just prior to the alarm going off in the morning. The lamp may be sold as a separate component, but nonetheless be compatible with network 2000. The lamp may also include an ISM band and/or blue tooth or IR receiver tied to the transceiver 1401 and/or to the alarm clock 1422 directly. Where this is a new device in the devices available for network 2000, updates and drivers to support this device may be downloaded from a central source to all receivers 300. In this manner, the network 2000 may be kept current as the overall system 2000 evolves.

The user may then program the alarm clock 1422 such that when it goes off the lamp 1406 would also brighten slowly over a period of time for example, three minutes until it fully brightens. Thus, in addition to the alarm the user may also be prompted by the lamp 1406 to awaken. The user may similarly program all the other devices to turn on and off based the alarm signal. The updates may, for example, modify the control menu output by a projection alarm clock and/or alter the Web page of the user's control software to include an lamp option for each alarm clock so programmed and a mechanism for associating a particular lamp with a particular alarm clock. For example, by coding the location of a particular lamp, the system 2000 enables a user to distinguish a serial number or MAC address associated with a lamp in the parents room different from a lamp in the children's room. Further, their may be multiple lamps associated with a single alarm clock and/or multiple alarm clocks associated with a single lamp. These may be variously selected by virtue of the control interface page www.myownweather.com. Embodiments of the invention include lamps and alarm clocks with MAC address located on the bottom of the device. These MAC address and/or other similar serial number may be bar coded and operate in conjunction with a bar code scanner on the transceiver to facilitate easy setup of the network 2000.

The system 2000 may alternatively be configured to have serial numbers on a plurality of transceivers and place each transceiver in a different room of the house. The transceiver, via bar code and/or other configuration may then be associated with a particular room. For example, each transceiver may have a series of DIP switches or circular setting device which would allow the user to set the transceiver unit to "Master Bedroom" or "Kitchen". Other devices such as lamps, alarm clocks etc., in this embodiment, would also contain similar configuration switches. In this manner, the device locations would be uniquely shown on the home network map 1400. A kit of transceivers may be coded for "bedroom" or "kitchen". The picture of the user's home maybe provided by input from the user and/or selected from particular tax map data provided by the local county. For example, today the address of most users have a line drawing of the outline of the user's home together with the number of bedrooms, bathrooms, and other rooms in the home available from on-line tax records. This information may be utilized to provide the user with a overlay map of his/her home 1400. This line drawing is available to help the user configure the home map 1400. Alternatively, a representation of a generic home would be presented to the user and be subject to reconfiguration by the user as discussed above. The user is then permitted to "drag and drop" various apparatuses around the home 1400 which appear as icons for "alarm", "Refrigerator," "Wall display" displayed in various rooms such as the bedroom, living room, den, hallway temperature controls, sprinkler control, outside lighting control, and so on.

The present invention contemplates a business method of selling the kits in accordance with aspects of the invention to alarm company installers throughout the United States. The alarm company installers would then configure the systems in accordance with the invention and sell them as value added services to customers to distinguish their alarm offerings from every other alarm company. This invention will vastly increase the alarm company's ability to attract and maintain clients, and thus capture the very profitable $30-$45 monthly fees paid by most alarm company subscribers.

In alternate business methods of the present invention, the home alarm system may use an Internet based monitoring company based remotely from the area occupied by the user. In this manner, the user may substantially reduce his monitoring fees to as little as $3 to $5 per month. For example, a series of operators in India may monitor the security of some cost conscious consumers who desire to install their own home monitoring system.

In still further aspects of the invention, there is a need to solve the problem associated with most home automation and alarm systems today: the need for a very expensive user console. The user console today can cost several hundred dollars to several thousand dollars. This is viewed as a substantial impediment for the average home users to have a home automation system and/or sophisticated home alarm system.

Accordingly, this aspect of the invention brings home automation to the masses in a user affordable manner. For example, one alternative to providing a user-interface is a device that configures the system by serially plugging into each device that the user has purchased for his home automation system. For example, a receive 300 could be configured as a USB stick with a 915 megahertz transceiver plugged into the user's laptop or personal computer 1403. Therefore, the user's home computer and/or laptop is transformed using this aspect of the invention into a very low cost home terminal computer control system able to communicate and connect with all aforementioned devices. In addition to USB stick, the device may be implemented as a SD form factor (e.g., a memory card) programmable and pluggable into the top of Treo™ device or Blackberry®. The screen on these smart phone devices would then be used to setup and control the home automation system. This memory card is configured to include, for example, a 915 megahertz transceiver or other transceiver device such that the Treo™ touch screen then becomes the user-interface for the entire system 2000, e.g., the home automation system.

Additionally, using the USB stick and the programmable and pluggable memory card enables the user to utilize the home automation system from any location. This way, the user may use the home automation system while in the house to program the devices and/or remotely as the user travels from the house for example, by controlling heat, a window position, an alarm system remotely from a Treo™ device. When in remote operation the device is communicating with the user's router via the Internet. The USB stick and/or receiver having, for example, the 915 megahertz may be configured to plug into the back of a Netgear router having a USB stick port for communication with various devices.

In an aspect of the invention, a transceiver 1401, which for example, is located outside the house 1400 may receive a time signal and then retransmit the time signal to all devices within the house 1400. This overcomes a present problem with many WWVB receivers in that they are not able to receive in certain locations in a home or building. Accordingly, having an external transceiver which serves as a repeater for the WWVB and/or NOAA signals is a substantial advance in reliability of these devices. Embodiments in accordance with this aspect of the invention therefore provide a unified and accurate time for all alarm clocks 1422, clocks 1416, watches 1000 and other devices within the house 1400. In this manner, a user is encouraged to buy all their clocks for their house from for example, Lacrosse or other manufacturer. Thus, by buying all of the user's electronic products for the house from a single manufacturer, the manufacturer may increase its sales. Further, the manufacturer may license its interface to other companies, thus increasing the array of available products and further driving sales. By using a single transceiver module located outside the house and/or proximate to an outside wall, the user may have every device within the house synchronized so that the time readings of all the devices in the user's house for example, clock 1416, vehicle 1417, PDA device 1423 and other devices are entirely synchronized.

In still further embodiments of the invention, the time data may come in through the PDA device 1423 such that when the user plugs in the USB stick with the transceiver 1401 the user is then able to utilize this device to synchronize the time across the user's entire time home 1400. Further, the device may also be able to synchronize the user's car 1417 such that the car time reading, the home time reading and the watch time reading are all identical. In addition, the present device is further adapted to be able to be utilized in schools and other institutional environments. For example, each clock is outfitted with a transceiver such that the clock that receives the time then relays the time to every other clock throughout the institution, thus setting up a network within the institution where time is propagated from one clock to the other, and synchronizing every clock. Currently, clocks receiving satellite and/or WWVB signals may or may not work depending on the location of the clock within the home and/or school. With the transceiver located in every clock, as long as one clock in the home/institution receives a signal every clock in the home/institution will be synchronize to the correct time and/or institution such as school, office or business. Accordingly, the reliability of the clocks in the home and/or office is vastly is improved by the utilization of a transceiver cascading throughout the institution. This invention overcomes a substantial problem preventing so called "atomic" clocks from being adopted in institutional settings.

A particular weather receiver station may also be adopted to function with a low cost receiver that is given away to end users. For example, Home Depot may give away the weather receiver or sell it at a very inexpensive price if it were coupled with advertising. Thus, users of Home Depot would receive a Home Depot Weather Receiver that may be keyed to for example receiving weather data for a particular zip code and/or specific geographic location.

In addition to the weather, there may alternatively be a banner and/or other advertisement that would periodically and/or continuously appear on the screen in a stationary or scrolling fashion such that advertisement for Home Depot may be received by the receiver and displayed on the screen. For example, a Home Depot sale on a particular item would appear across the bottom of the screen. This could be keyed to the particular the zip code so that Home Depot could run an ad and it would run different ads in different zip codes in different parts of the country. For example, in the case of a snowstorm warning Home Depot would run ads for snow shovels, or sleds or other devices that would be such as snow blowers that would be appropriate in the middle of a snowstorm. Similarly, for tornados and/or hurricanes, ads would be run for chainsaws.

Further, when an ice warning occurred in the fall the first time Home Depot may automatically and/or in conjunction with the weather run an advertisement for salt to be sold to the end user. In addition, the device may be utilized in other locations in the home. The concept of a low cost advertising supported device would enable the store to sell the device at a substantial reduce discount and/or to give the device away to customers. For example, the store may have two pricing levels one would be a price without the advertisement that may sell for, for example $20.00. Another would be a price with the advertisement that would sell for example for $2.00. Thus, the advertisement supported device may have advertisements for Home Depot, for Costco, for Sam's Club and for other shopping networks and/or other suitable sales and advertising opportunities such as cars, automobiles, etc. . . .

In addition to clock and weather, the current headline news would be displayed across the device. For example, news for the particular geographic location such as an election of an individual member of a political party and/or specific news for that geographic region may be displayed as well as national news broadcast. These devices will operate in a similar fashion to for example Windows or Vista, which have posters of the latest new releases on the laptop computer. These will be provided on the clock or other in home device via the Internet connection to the wireless network and/or the transceiver connected outside the home and/or the pager/WiMax/802.x network.

An alternative is to sell a consumer oriented device that would provide the lowest gas price within the geographic zip code of the user. For example gas prices in the United States are known to vary by as much as fifty cents from gas station to gas station. In the consumer oriented model it would provide the lowest available gas price within the zip code, the address and location of the station having the lowest available gas price. This consumer oriented model could be said to save the consumer more than the price of the model in the first month of the operation.

In addition, the receiver device could be utilized as a novelty item to be supplied by for example banks or national brokerage houses. For example Merrill Lynch would provide the weather station device, which would provide the Dow Jones industrial average, Dow Jones Stock Ticker symbol either in real time or delayed across the user's device. Further, the user through the computer interface model is able to select an investment portfolio and so the user could dynamically in real time watch the stocks in the portfolio as they move up and down on a daily basis. The total value of the user's portfolio as it changes during the day would also be displayed on the receiver 300. Through the interaction between the on-line brokerage account and the wall mounted device, the user would only be looking at the stocks of most interest to him as they moved up and down. These stocks could be broadcast to the wall mounted united and/or the user's hand-held device such as the user's Treo™.

In a similar fashion, any auctions the user has chosen to monitor on E-bay or auctions which the user has placed items to sell or placed bids will also be selectable as displayable alerts. Each time that a change is made, an e-mail is sent to the user triggering an alert on the receiver 300.

In addition to weather, auctions, and financial data, sports scores for the local sports team posted on the clocks are also within the scope of this invention. For example the rolling screen on the bottom of the screen would provide the latest sports score for the local sports teams.

In addition, the device is adapted for coastal areas to provide tide information. The high tide and the time for next high and low tide. In addition to knowing the tide information, the height of the tide at each end of the high and low tide can also be determined by information sent by the pager/WiMax/802.x to coastal regions. In addition variations in the tide caused by changes in the direction and intensity of wind speeds are also shown. The tide level (as modified by the prevailing wind) at a particular coastal location is of extreme interest to many people who live in the coast or other body of water. Costal development has expanded into many areas where the boater may not be able to leave or reenter the area except when the tide is above a certain level.

In addition to the aforementioned information, the weather receivers are specifically adapted to include pollen information. This information is of critical importance to people who suffer from allergies and know when or when not to leave the house. In addition, ozone information for people who have breathing difficulty and the sun strength information for people who have sensitive skin are all displayed on the weather receiving station and are specifically tailored to the specific geographic region and downloaded in real time by the pager/WiMax/802.x system or other transmission device system.

In addition, the user-interface for the clock may be set using speech recognition. For example, the user simply presses learn and speaks the user's address and/or zip code into the clock, the clock recognizes the zip code and from the zip code input from the user, the clock sets itself to the right geographic region and pulls in the appropriate weather data.

In addition, the present invention incorporates a touch screen display with a map based on the particular geographic vicinity where the user is located. The map in one particular embodiment includes a plurality of concentric circles such that the concentric circles are overlaid on a particular receiver location that the user is currently located. The user can select the most precise concentric circle to the user's current location. In exemplary embodiments, the user may drag the circle over his current location and select the degree of specificity of the information by increasing or decreasing the size of the circle. The map includes a series of circles which overlap each other and are located about a plurality of different counties and/or states in the user's area. The user by touching on the screen and/or using other user-interface selection devices can select one of the circles overlaid on the map and therefore select the proper location that the user currently resides.

An aspect of the present invention seeks to overcome the current method of having a user manually set their clocks. In embodiments of the present invention, the "atomic clock" sends out a Bluetooth and/or IR signal. This signal may be sent continuously, when the clock detects an incoming request, and/or when a user selects a synchronize button. When the atomic clock detects a device in close proximity indicating an interest in receiving a synchronizing signal from the atomic clocks', the clock may output a infrared, blue tooth, and/or ISM signal to the device. Therefore, by simply pushing a button on a watch or alarm clock or other devices that are within sending and receiving distance of another clock, the watch or the alarm clock automatically synchronize if such another clock is synchronized to the atomic clock time. In this manner, the atomic clock "beams" its atomic time to other devices such as watches. This enables the watch to have a very thin form factor yet still be synchronized to atomic time. This synchronization may happen automatically when the watch is place in proximity to an "atomic" alarm clock and/or under user control.

In addition, as discussed above a synchronization feature is implemented between the users' calendar at work for example the user's Outlook calendar, the user's calendar at home and/or other calendar in the user's weather-receiving device or the bedside alarm. As such, the user's bedside alarm also includes a graphic screen showing the user's calendar so, for example, when the user wakes up the user can look at an alarm clock and instantaneously see the events planned for that day based on the calendar which is synchronized using conventional synchronization software. This is particularly effective for projection alarms which may display the day's events each morning after the user has arisen.

Additionally, the calendar on the refrigerator is synchronized to the calendar on the user's computer such that when the user accepts events from the user's home computer such as appointments and other Outlook and/or other calendaring program appointments. These appointments are automatically replicated to other devices in the house such that the calendar then appears on the refrigerator, kitchen wall and/or alarm clock. Similarly, the user's home calendar is automatically synchronized with his work calendar as well as his PDA calendar.

In addition, a new e-mail indication is provided on the refrigerator and/or the alarm clock and/or the wall clock so the user is given an indication when the user received a new email. This email may be filtered such that the user's friends and/or relatives are flagged in a specific image of the user is placed on the wall clock, calendar clock or on the refrigerator indicating that an e-mail is pending from that user.

In addition, when a user posts on an individual's site such as MySpace and/or Facebook, the face of that individual is replicated and produced on the wall clock and/or the alarm clock and/or refrigerator display weather station receiving device so that the user is given an immediate indication that the user's relative or friend has posted on the user's MySpace or FaceBook page.

In addition, task lists are displayed on the weather receiving device 300. For example, a user may speak a command to the device such as calendar, weather, task list, phone list, special contacts or other devices to the receiver 300. These commands are based on a subset of commands, thus, the voice recognition can be speaker independent and highly accurate. Thus, a user without even touching the device can have a battery powered device sitting on a refrigerator wirelessly connected to the user's other devices calendaring systems email and the user can get immediate input from those devices. For example, a housewife cooking in the kitchen can look over at the calendar and say a command requesting the calendar today's events read and the calendar will read off the day's events for the housewife. In addition, the device can be voice activated such that calendar, task list or other devices are automatically displayed and/or read to the user.

In addition, an improvement to many home automation devices is to include a appendage that extends above the face plate or to the top or bottom of the face plate concealing an antenna. In these embodiments, the antenna is not located in the box behind the face plate. The antenna may be configured to look like an ornamental object attached to the faceplate and/or part of the faceplate. For example, it may look like a face plate and/or a secondary device switch or other device extending to or from the face plate e.g., a fanciful design. Alternatively, the antenna may be located outside the box and snapped onto the outside of the box and slipped between the box and the drywall. For example a drywall knife could be used to cut the drywall back away from the box a fraction of an inch and an antenna could be slipped in on the outside of the box and clipped to the box and wired to the electronic device.

Figure 19:
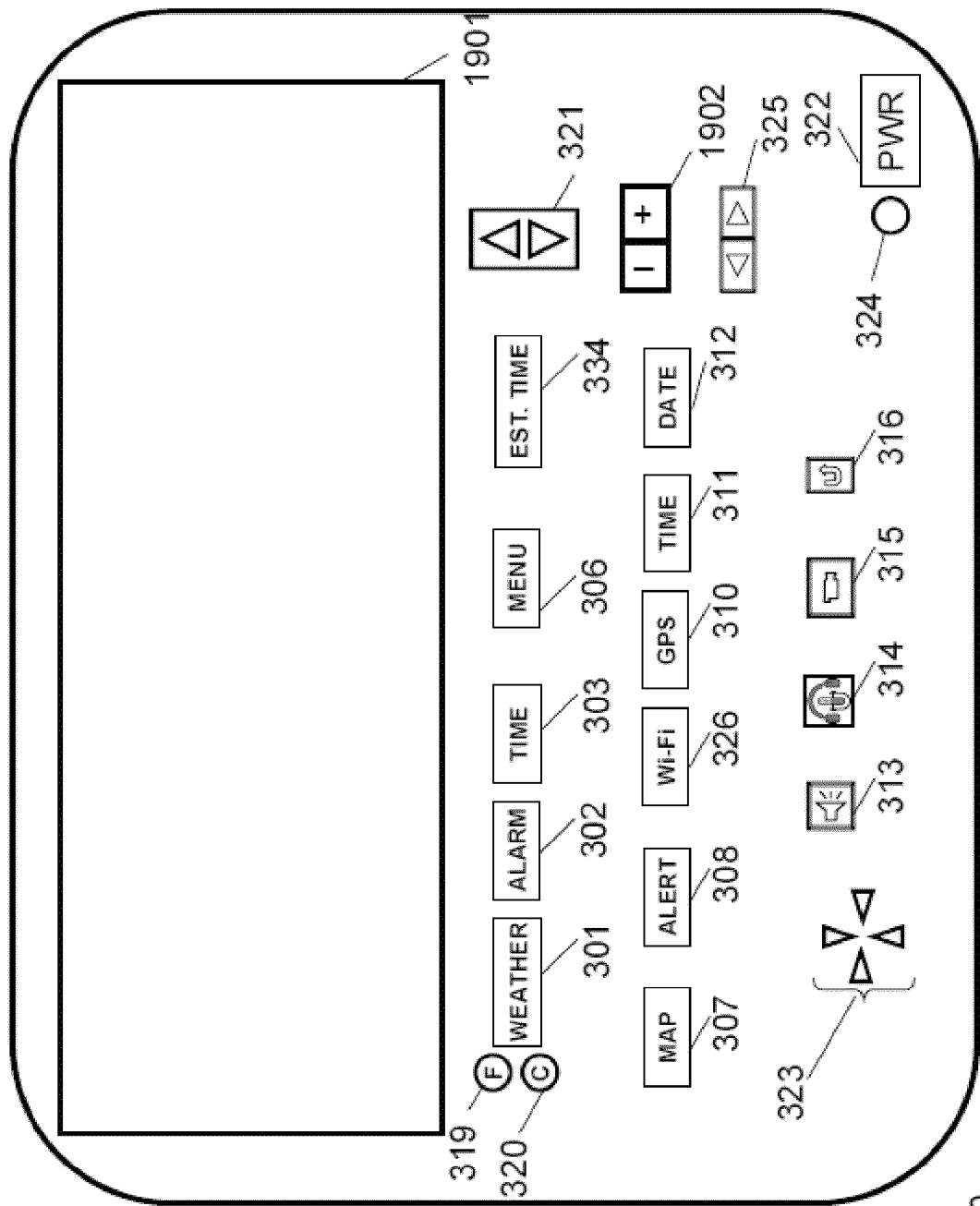
FIGS. 19a-c and 20 show an exemplary weather monitoring arrangement which may be configured to include notification of weather alerts within a defined geographic area.
Figure 19:
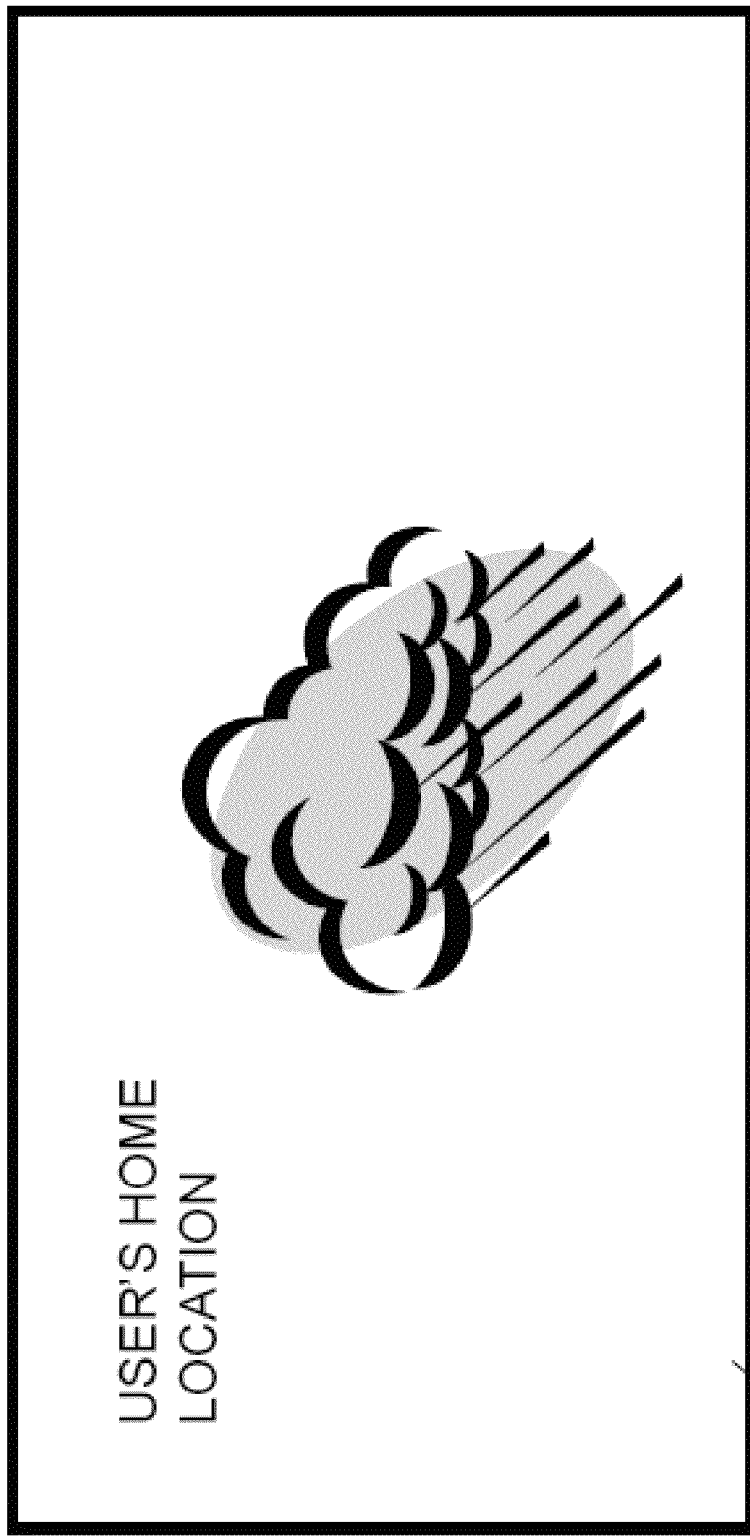
Figure 19:
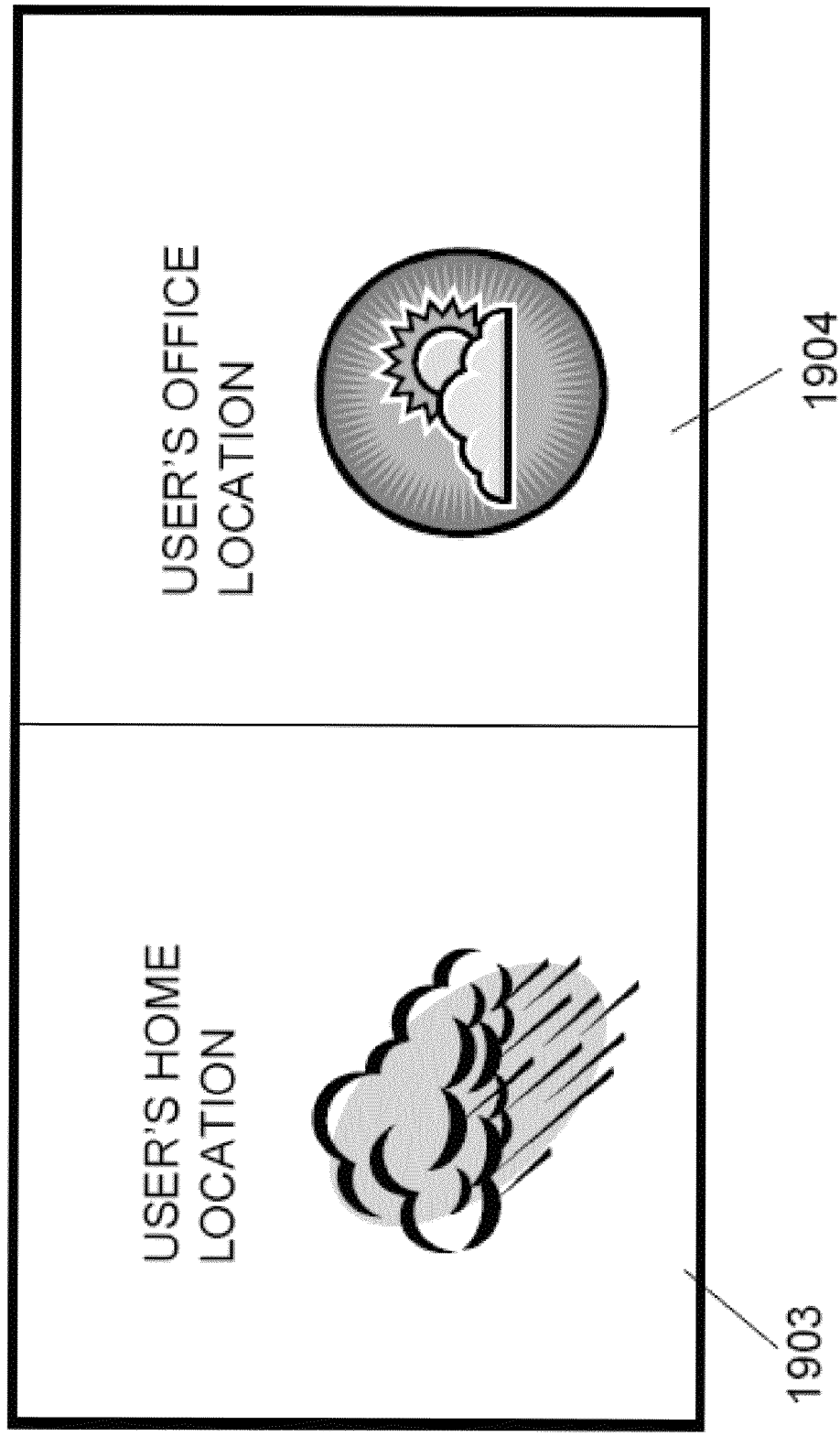
Figure 20:
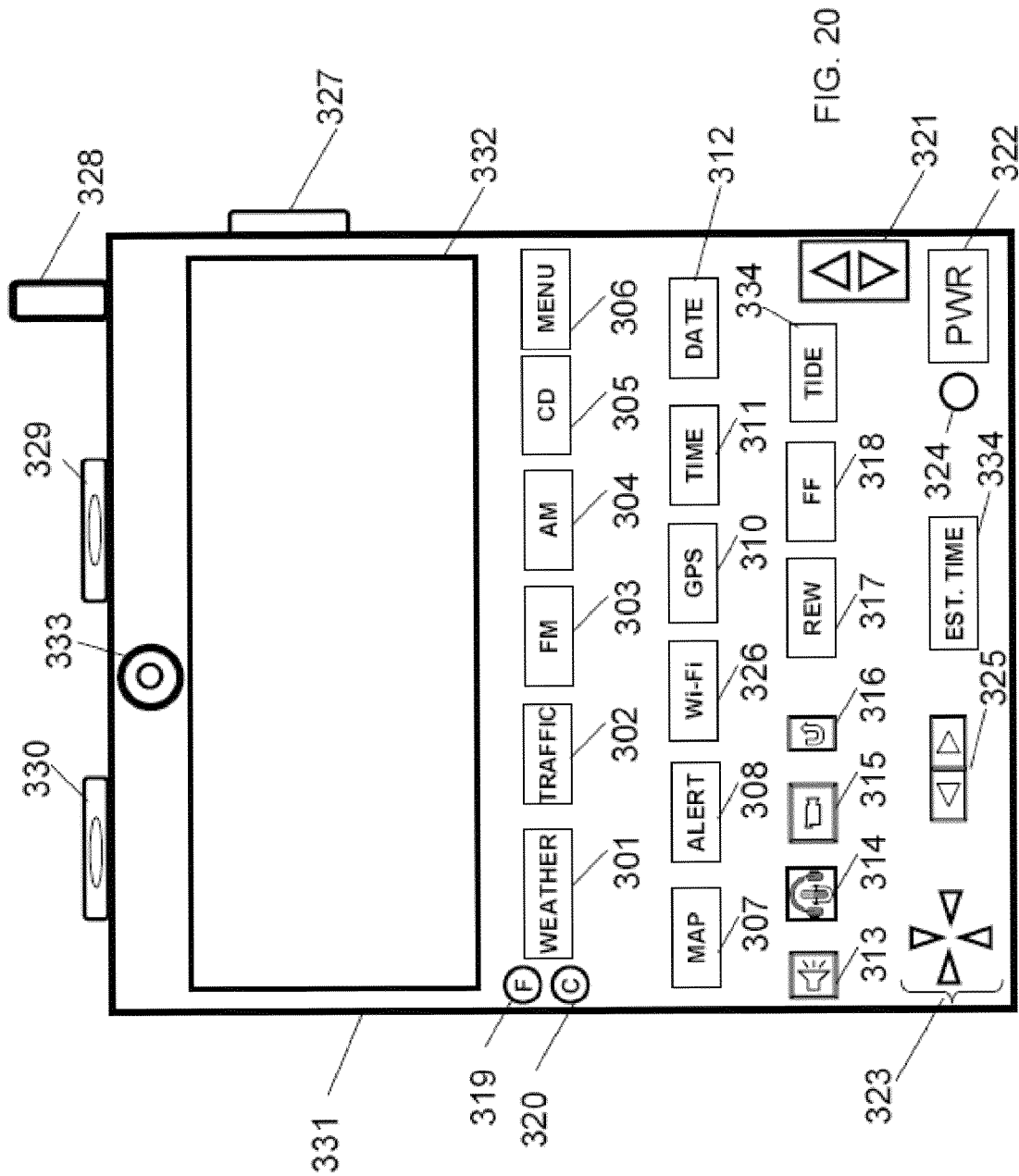

FIG. 19(a) shows an exemplary illustration of a projector alarm clock for projecting images of weather conditions, based on a user's interest.

FIG. 19(b) shows an exemplary illustration of a display of a projector alarm clock projecting image on the ceiling and/or wall of a user's home.

FIG. 19(c) shows an exemplary illustration of a split screen display of a projector alarm clock projecting the images of a user's home location and the user's office location.

The receiver system 300 is configured to receive an estimated time of arrival of weather conditions, such as rain, storm, tornado, and hurricane for a user's location of interest. Such information may be sent to a user's receiver device for example, cell phone, PDA, computer, watch, or iPod, and can be sent through means such as email, text, audio, or video via media such as the internet or voice over IP. The estimated time of arrival can be set up to display automatically or by depressing the estimated time of arrival button 334. This estimated time may also be accessed through the menu options by depressing the menu button.

In another embodiment, a receiver 300 may be incorporated into the projection alarm clock 1900 illustrated in FIG. 19(a), which may be located in a user's home 1400, for example. The projection alarm clock 1900 is able to receive weather alert information such as weather conditions for wind, rain, storm, tornado, or hurricane as well as the weather's estimated time of arrival and display such information on its display screen 1901 and/or on a wall/ceiling of the user's home. The estimated time of arrival can be set up to display automatically or by depressing the estimated time of arrival button 1903. The projector alarm clock 1900 may also receive the weather information via other media such as the Internet. The user sets up the projection alarm clock 1900 to receive and/or display weather data for a single or multiple locations of interest to the user.

The projection alarm clock 1900 may be configured to project on its display 1901, a picture or video images of the weather as it approaches a user's location of interest. This may be done through using a counting down time estimate together with a decreasing distance between the weather condition and the user's home. The picture, video, time of arrival or other weather information received by the projection alarm clock 1900 may be updated as the weather makes it way to the location of interest to the user. For example, the display 1901 of FIG. 19(b) shows a weather image approaching a user's home. The estimated time of arrival may be continuously adjusted as the system approaches the user's home. The projector alarm clock may be set up to split its screen 1901 into multiple portions to project different weather content for a particular location or weather content for different locations. Other displays may be set up according to the user's interest. For example, the projector alarm clock 1900 can be configured to display an image weather data for the user's home on a portion of the display screen and an image weather of the user's office on another portion of the display screen 1901. For example, FIG. 19(c) shows the display 1901 split into two portions 1903 and 1904 projecting a weather image of the user's home location on the display portion 1903 and a weather image of the user's office location on the display portion 1904.

The present invention provides numerous unique advantages over present weather technology. No other weather station technology provides an affordable, inexpensive and reliable technology for the average consumer to get weather information when you want it, where you want it, how you want it. The present invention allows highly personalized weather reporting; it allows the user to select the information they want for the locations they want. It provides for small, attractive packages for the receiving systems, yet still permit battery operated, Internet-based wireless weather station devices. The devices can monitor weather in several locations (local and distant) at the same time. The devices provide instant weather reports by virtue of a touch of a button or function key. The devices also provide daily and multi-day weather forecasts. Special interest climate data and alerts may be flashed on the screen and/or audibly announced by the receiver.

In short, aspects of the present invention provide the world's most comprehensive (consumer) and affordable weather reporting system by offering personally tailored, complete weather information 24 hours per day, seven days a week, at no additional cost to the consumer. This innovation is truly weather when you want it, where you want it. It provides simple setup which may be driven by the Internet. The devices are not dependent of radio reception, battery powered local weather sensors, or the unreliable reception of long wave transmitters. Further, the user's PC need not be on for the device to function properly, giving an added impression of increased reliability and ease of use to the consumer. The device may be placed anywhere in the home and the receiver may operate even during a power outage. The low cost battery operated receivers in aspects of the invention allow a electronic interface device to be placed in every room, in the hall way, and by the coat closet. The design allows for very inexpensive display devices that enable everyone in the home to have one. Further, the specificity of the information allows e.g., 10,000-30,000 or more specific locations within a country providing pin-point weather reporting for the consumer's location. The displays provide either one day or extended day forecasts enabling the consumer to know the weather in advance and plan ahead when the user is getting dressed. This avoids the need to venture out into the cold to retrieve the paper before getting dressed. Further, the information is updated several times a day to always provide the most up-to-date weather data. This also provides an enhanced user experience since the consumer learns to rely upon and trust the weather information provided. Exemplary embodiments of the present invention provide the user to pinpoint his/her weather location information within a particular state, county, city and/or zip code/zip plus four code. Further, the user may select such locations as:
- a. Spectator Sports Venues
  - i. Professional and College Sports
  - ii. Professional Golf, Men's & Women's
  - iii. Soccer
  - iv. NASCAR
  - v. Baseball Fields
  - vi. Football Fields
- b. Participant Sports
  - i. Golf
  - ii. Tennis
- c. National and State Parks
- d. Zoo's
- e. National Weather Service Reporting Stations
- f. Tide Reports
- g. Boat Harbors
- h. Airports (with TAF reporting)

In addition, the receiver provides for special reports such as solunar forecasts, air quality information, pollen count information, UV index information, sun rise, sun set, and sunlight hours. Additionally, the information may be presented via a display or via text to speech conversion to "speak" the most recent weather forecasts. For example, an audio weather forecaster unit, such as the weather station interface units depicted in FIGS. 36 and 37 may include stereo speakers to announce periodic weather updates and/or personalized audio greetings. For instance, the alarm clock functions of the weather station device may be configured to play audio greeting to the user at the designated alarm time such as the following: "Hello John. It is 12:34 PM on June 10th. It will be partly sunny with a high of 80° F. and a low of 69° F. Winds SW at 5 to 10 mph. 10% chance of precipitation. The four day forecast indicates . . . "

Additional data may be provides such as horoscopes. Still further messages may be personalized via the Internet to provide birthday greetings, anniversary reminder greetings and reminders, calendar reminders and/or announcements, weather alerts, and other data including sports scores and domestic and foreign stock market reports. One gateway box can provide all of this information to multiple receivers located throughout the home.

As discussed above, users may access any of their various weather display devices remotely, for example, via the Internet using a web browser or other software application to communicate with the user's home gateway. Thus, in certain embodiments, any of the illustrative user interfaces shown in FIGS. 5b-5e may be displayed either directly on a user's weather display device or on a remote computer display screen. Similarly, the user interfaces and functionality described above for configuring a user's weather display devices can be accessed remotely, thus allowing users to set up, configure, and re-program any of their devices from work, while on vacation, or from any terminal with remote (e.g., Internet) access. In some examples, the user interfaces displayed remotely may be different than the corresponding user interfaces displayed on the weather devices, as a result of the different display characteristics (e.g., monitor size, shape, resolution, and color scheme) of the displaying terminal in comparison to the display characteristics of the weather device.

Figure 39:
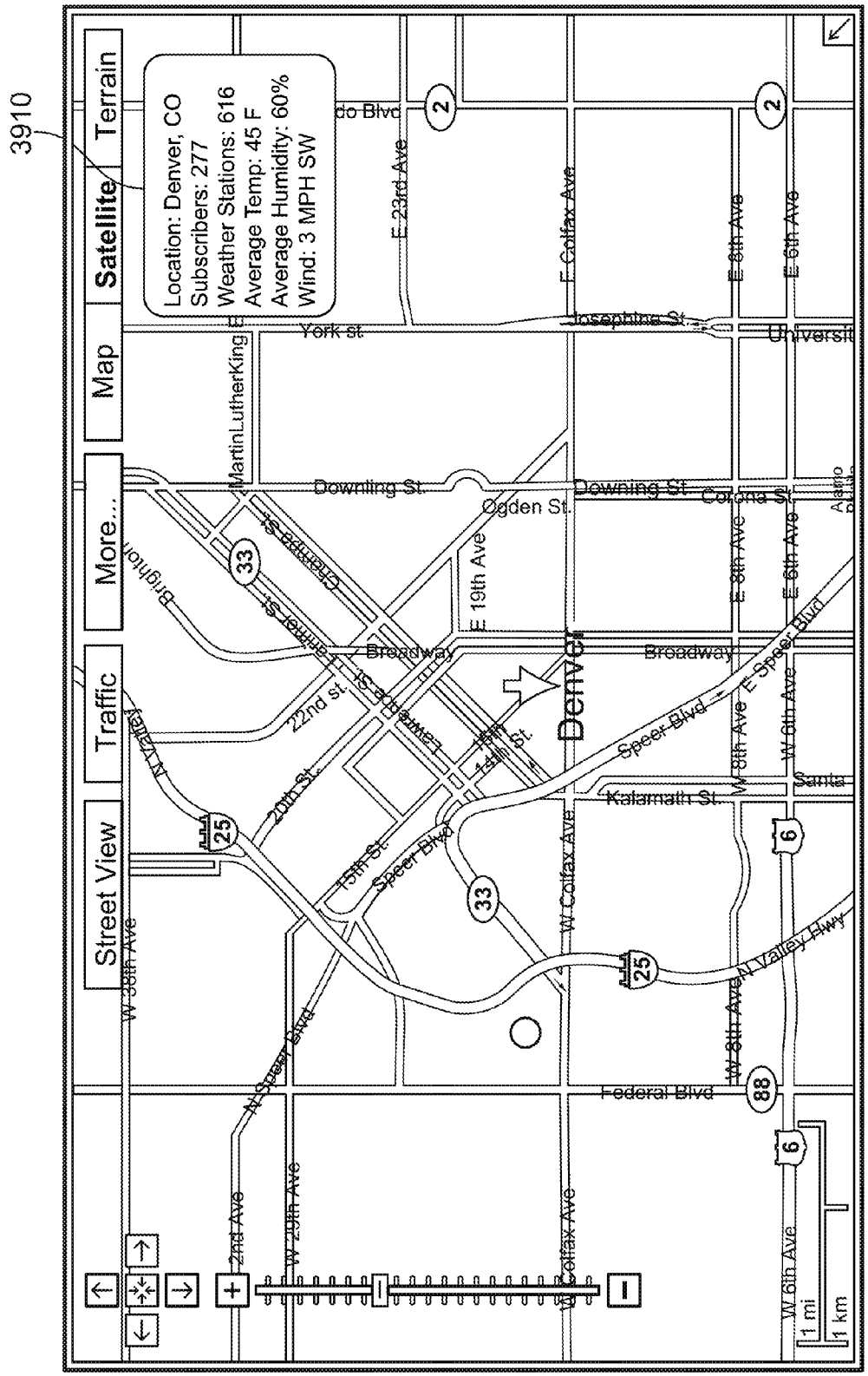
FIGS. 39-41 are images depicting illustrative user interfaces based on underlying mapping software and features, and data based on the geographic region selected and/or a selected subscriber.
Figure 40:
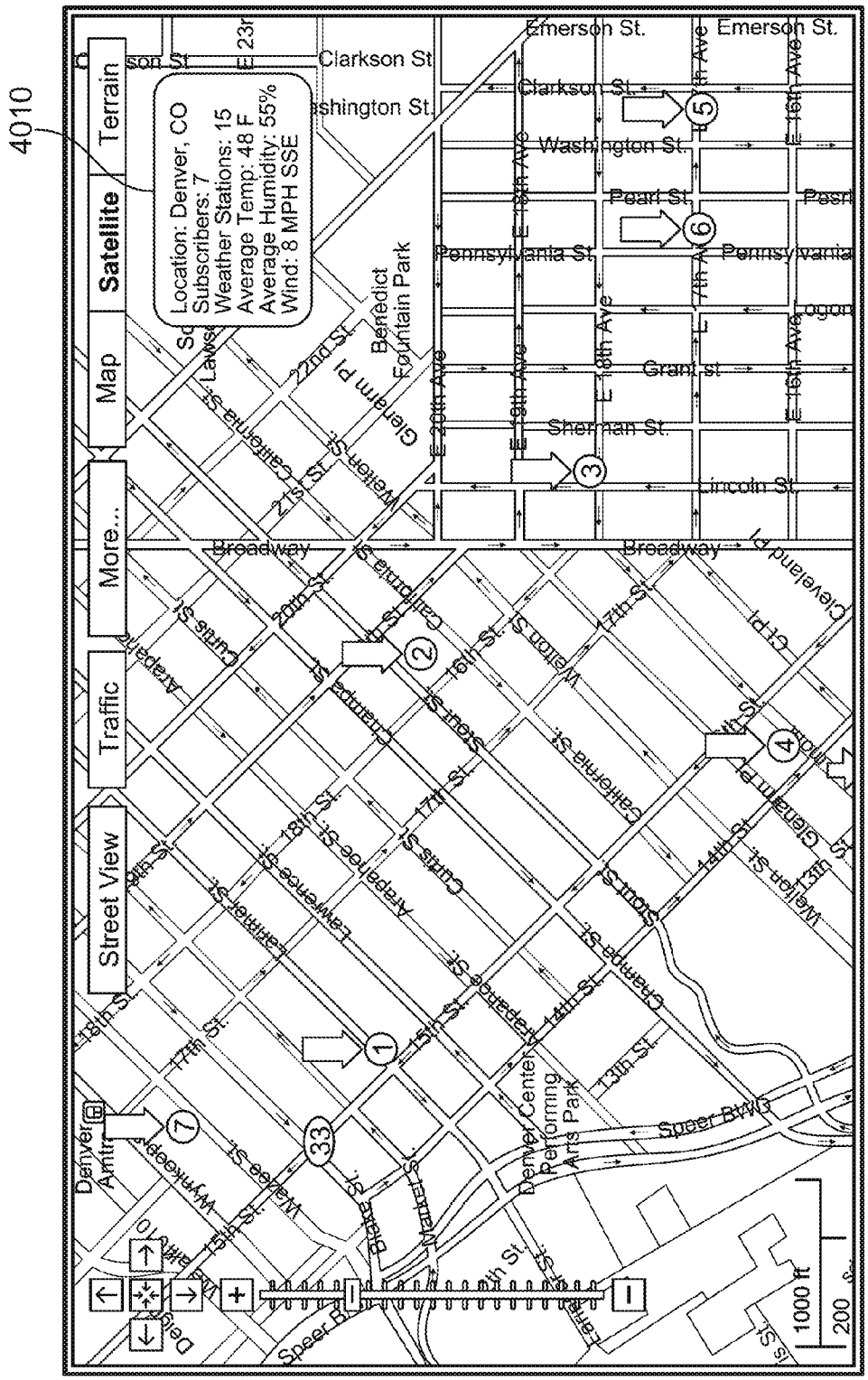
Figure 41:
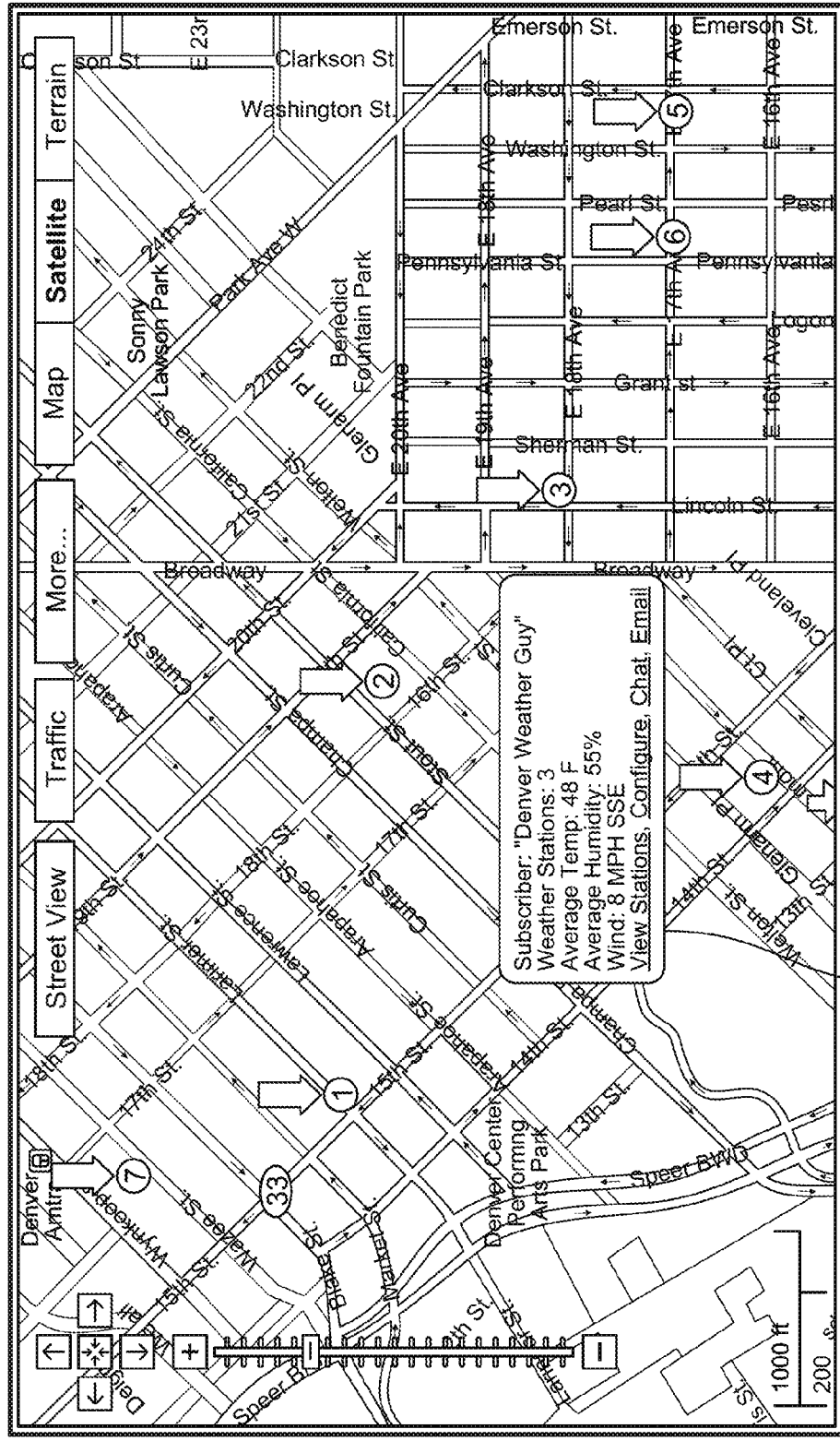

Examples of additional features available on the weather display system are described in reference to FIGS. 39-41. As shown in these illustrative screenshots, certain embodiments of the weather display system may be integrated with underlying digital map software (e.g., powered by Google Maps®/Google Earth®) to allow users to view geographic regions and to identify and communicate with other system subscribers in a certain region. In these examples, subscribers may communicate (via their weather display devices or via a remote terminal) with a central database server which receives and stores subscriber information from many different weather display devices and subscribers. For example, a centralized database may store subscriber names, locations, the number of weather devices the subscribers have, the most status and weather data received from the device, the IP address and/or login credentials of the subscriber's gateway, and subscriber contact information such as email addresses and or instant messaging identifiers. Thus, users may connect to the central server not only to view summary weather data over different time and geographic regions, but also to identify and connect and interact with other weather system subscribers and their devices.

In the example of FIG. 39, the subscriber is using the map functionality of the weather system to view a residential area near Denver, Colo. In this example, after selecting the displayed region, a data summary box 3910 will appear in one corner of the map to show a compilation of subscriber and weather data for the visible area. As shown in FIG. 39, the system may automatically display the total number of weather system subscribers and active (online) weather display devices in the selected region, along with the average temperature, humidity, wind, and/or other summary weather data. The data may be calculated automatically at the central server using all of the active weather stations in the selected region. The weather system may also leverage the different features of the underlying mapping software (e.g., Google Maps®). Thus, in this example, the user may be able to zoom-in or zoom-out, causing the data summary box 3910 to automatically refresh the displayed data to match the updated geographic region displayed on the screen. Similarly, the map feature may permit online users to change to a zip code view, city view, county view, etc., or any other view configuration supported by the underlying mapping software. Additionally, weather data (e.g., satellite data) may be received by the server and superimposed over the map requested by the user.

Referring now to FIG. 40, the subscriber has used the map feature to zoom into a smaller geographic region, causing an automatic update in the summary and compilation data shown in box 4010. Additionally, in this example, the weather system central server has made a determination that the selected region is small enough to display an icon and number for each subscriber in the area. In FIG. 41, the user has activation a subscriber information window 4110 by selected (e.g., clicking) on the individual subscriber icon/number "4" from FIG. 40. In this example, the subscriber information window contains the subscriber name, device data and weather data received from the subscriber's device, along with several links to allow the user to communicate with the selected subscriber and/or the subscriber's devices (e.g., view stations, configure stations, email, or send an instant message). Thus, if the clicks on the "Email" or "Chat" links, the weather system may initiate an email or instant messenger application with the selected subscriber's information to allow the user to communicate with that subscriber. In certain examples user's may have the option to disable their own "Email" and/or "Chat" links so that their personal information (e.g., email address or instant messaging identifier) is not accessible to other subscribers. Additionally, in this example, after selecting the "View Stations" link to see, the user may be presented a home device map similar to the illustrative screen shown in FIG. 14. This link may also be used to retrieve data from any accessible weather display device (i.e., devices not permissioned by the owner subscriber as hidden, or marked as private, etc.), or to configure/reprogram data one of the weather display devices (similarly, owners subscribers may set permission on all or some of their devices to allow/disallow remote configuration by third-parties.

The present invention has been described in terms of preferred and exemplary embodiments thereof. Numerous other embodiments, modifications and variations within the scope and spirit of the appended claims will occur to persons of ordinary skill in the art from a review of this disclosure. For example, while a single microprocessor is shown in the accompanying drawings, one or more microprocessors may be utilized. Further, any type of microprocessor may be utilized and are interchangeable including computers, microcontrollers, ASICs, FPGAs, and other computing devices.

We claim:

1. A method comprising:
   determining a first location associated with a weather data receiving device;
   retrieving a first time code corresponding to the determined first location associated with the weather data receiving device;
   receiving, at the weather data receiving device, a transmission of time synchronized weather data through a tower access, said transmission comprising header information;
   retrieving a second time code from the header information of the time synchronized weather data transmission;
   calculating, by the weather data receiving device, an activation time offset based on a difference between the first time code and the second time code;
   determining a transmission time for the time synchronized weather data transmission;
   determining an activation time for a receiver of the weather data receiving device based on the determined transmission time and the activation time offset;
   activating the receiver of the weather data receiving device at the determined activation time to receive weather data from the transmission of time synchronized weather data; and
   displaying weather data corresponding to the determined first location associated with the weather data receiving device.

2. The method of claim 1, further comprising:
   averaging or summarizing, at the weather data receiving device, data from one or more sensor devices at multiple different locations over a geographic region determined by the header information of the time synchronized weather data transmission.

3. The method of claim 1, further comprising:
   receiving a user selection of a first weather sensor location, and displaying weather sensor data corresponding to that first sensor location.

4. The method of claim 1, further comprising:
   periodically monitoring the transmission of time synchronized weather data at predetermined intervals for weather emergency alert data;
   detecting a weather emergency alert time code at a first predetermined interval for weather emergency alert data;
   determining that the weather emergency alert time code corresponds to the determined first location associated with the weather data receiving device;
   activating the receiver at a time corresponding to the weather emergency alert time code; and
   receiving weather emergency data for the determined first location associated with the weather data receiving device.

5. The method of claim 1, further comprising:
   determining that the weather data receiving device has moved to a second location;
   retrieving an updated first time code corresponding to the determined second location of the weather data receiving device;
   activating the receiver of the weather data receiving device at a second determined activation time based on the updated first time code corresponding to the determined second location of the weather data receiving device; and
   displaying updated weather data corresponding to the second location of the weather data receiving device.

6. The method of claim 1, wherein retrieving the first time code corresponding to the determined first location comprises accessing a time code table stored at the weather data receiving device.

7. A system for receiving data from a tower cell comprising:
   a processor;
   a receiver system; and
   memory comprising computer readable instructions that, when executed by the processor, cause the system to:
   determine a first location associated with the system;
   determine a first time code corresponding to the determined first location associated with the system;
   receive time synchronized data transmitted through a pager/WiMax/802.x access, wherein the time synchronized data includes header information;
   retrieve a second time code from the header information in the time synchronized data;
   calculate an activation time offset based on a difference between the first time code and the second time code;
   determine a transmission time for the time synchronized data;
   determine activation intervals for the receiver system based on the determined transmission time for the time synchronized data and the activation time offset;
   activate the receiver system at the determined activation intervals to receive data corresponding to the determined first location; and
   display data corresponding to the determined first location.

8. The system of claim 7, wherein the receiver system is further configured to display data averaging or summarizing data from each of one or more sensor devices at multiple different locations over a geographic region determined by the header information of the time synchronized data transmission.

9. The system of claim 7, wherein the receiver system is further configured to receive a user selection of a first sensor location and to display sensor data corresponding to that first sensor location.

10. The system of claim 7, the memory comprising further computer readable instructions that, when executed by the processor, cause the system to:
    periodically monitor the transmission of time synchronized data at predetermined intervals for emergency alert data;
    detect an emergency alert time code at a first predetermined interval for emergency alert data;
    determine that the emergency alert time code corresponds to the determined first location associated with the system;

activate the receiver system at a time corresponding to the emergency alert time code; and receive emergency data for the determined first location associated with the system.

11. The system of claim 7, the memory comprising further computer readable instructions that, when executed by the processor, cause the system to:

determine that the receiver system has moved to a second location;

retrieve an updated first time code corresponding to the determined second location of the receiver system;

activate the receiver system at a second determined activation time based on the updated first time code corresponding to the determined second location of the receiver system; and display updated data corresponding to the second location of the receiver system.

12. The system of claim 7, wherein determining the first time code corresponding to the determined first location comprises accessing a time code table stored in the memory of the system.

13. A system for receiving data from a tower cell comprising:

a processor;

a receiver system; and memory comprising computer readable instructions that, when executed, cause the processor to:

receive transmitted data information from a transmitter;

retrieve a first time code from the transmitted data;

determine a transmission time for the transmitted data;

store geographic location information at the receiver system;

determine a second time code corresponding to the geographic location information stored at the receiver system;

calculate an activation time offset based on a difference between the first time code and the second time code;

determine activation intervals for the receiver system based on the determined transmission time for the transmitted data and the activation time offset; and activate the receiver system at the determined activation intervals to receive data associated with the stored geographic location;

wherein the receiver system is configured to receive and display data for multiple different locations over a geographic region determined by header information in the transmission.

14. The system of claim 13, the memory comprising further computer readable instructions that, when executed, cause the processor to:

display data averaging or summarizing data from one or more sensor devices at the different locations over the geographic region.

15. The system of claim 13, the memory comprising further computer readable instructions that, when executed, cause the processor to:

receive a user selection of a first sensor location; and display sensor data corresponding to that first sensor location.

* * * * *